(12) United States Patent
Gusev

(10) Patent No.: US 10,472,995 B2
(45) Date of Patent: Nov. 12, 2019

(54) FREE PISTON DEVICE

(71) Applicant: UNIVERSITEIT GENT, Ghent (BE)

(72) Inventor: Sergei Gusev, Kortrijk (BE)

(73) Assignee: UNIVERSITEIT GENT, Ghent (BE)

( * ) Notice: Subject to any disclaimer, the term of this patent is extended or adjusted under 35 U.S.C. 154(b) by 159 days.

(21) Appl. No.: 15/580,960

(22) PCT Filed: Jun. 9, 2016

(86) PCT No.: PCT/EP2016/063223
§ 371 (c)(1),
(2) Date: Dec. 8, 2017

(87) PCT Pub. No.: WO2016/198554
PCT Pub. Date: Dec. 15, 2016

(65) Prior Publication Data
US 2018/0179918 A1    Jun. 28, 2018

(30) Foreign Application Priority Data
Jun. 9, 2015    (EP) .................................... 15171265

(51) Int. Cl.
*F01K 23/06*    (2006.01)
*F01K 7/00*    (2006.01)
(Continued)

(52) U.S. Cl.
CPC ............ *F01K 23/065* (2013.01); *F01B 11/00* (2013.01); *F01B 11/001* (2013.01);
(Continued)

(58) Field of Classification Search
CPC . F02G 1/0435; F02G 1/02; F02G 1/06; F01K 27/00; F01K 23/065; F01K 23/10;
(Continued)

(56) References Cited

U.S. PATENT DOCUMENTS 8,640,659 B2    2/2014  Daouk
9,353,681 B2    5/2016  Daouk
(Continued)

FOREIGN PATENT DOCUMENTS

FR    2928693 A1    9/2009
GB     656421 A    8/1951
(Continued)

OTHER PUBLICATIONS

Extended European Search Report from EP Application No. EP 15171265, dated Nov. 17, 2015.
(Continued)

*Primary Examiner* — Mark A Laurenzi
*Assistant Examiner* — Mickey H France
(74) *Attorney, Agent, or Firm* — Workman Nydegger

(57) ABSTRACT

A free piston device, comprises a housing with a cylindrical inner wall having a first wall opening and a second wall opening; a cylindrical piston movable in axial direction and rotatable around its longitudinal axis; the piston comprising a first skirt forming a first chamber, said first skirt having at least a first opening in the form of a hole through the wall of the skirt for allowing passage of a fluid directly into or out of said chamber; control means for controlling axial and angular movement of said piston; sensing means for providing signals related to the axial position and/or the angular position of the piston; a digital control unit for rotating the piston around its longitudinal axis in synchronism with its axial movement.

16 Claims, 32 Drawing Sheets

(51) Int. Cl.
| | |
|---|---|
| *F01K 23/10* | (2006.01) |
| *F01K 25/08* | (2006.01) |
| *F01B 11/00* | (2006.01) |
| *H02K 21/22* | (2006.01) |
| *H02K 41/03* | (2006.01) |
| *H02K 7/18* | (2006.01) |
| *F01B 25/00* | (2006.01) |
| *F01B 31/12* | (2006.01) |
| *F01B 31/14* | (2006.01) |
| *F04B 31/00* | (2006.01) |

(52) U.S. Cl.
CPC .......... *F01B 11/007* (2013.01); *F01B 25/00* (2013.01); *F01B 31/12* (2013.01); *F01B 31/14* (2013.01); *F01K 7/00* (2013.01); *F01K 23/10* (2013.01); *F01K 25/08* (2013.01); *F04B 31/00* (2013.01); *H02K 7/1884* (2013.01); *H02K 21/222* (2013.01); *H02K 41/031* (2013.01); *F04B 2203/04* (2013.01); *H02K 2201/18* (2013.01)

(58) Field of Classification Search
CPC ........ F01B 11/007; F01B 31/14; F01B 31/12; F01B 25/00; H02K 7/1884; H02K 41/031; F04B 31/00; F04B 2203/04; F02B 71/00; F02B 71/02; F02B 71/04
USPC .... 60/516, 517, 520, 651, 670–681; 310/15; 62/6; 290/1 R, 1 A; 92/195, 208, 214
See application file for complete search history.

(56) References Cited

U.S. PATENT DOCUMENTS

| | | | |
|---|---|---|---|
| 2009/0165461 A1* | 7/2009 | Klassen | F03G 6/00 60/682 |
| 2011/0036330 A1 | 2/2011 | Daouk | |
| 2014/0130780 A1 | 5/2014 | Daouk | |

FOREIGN PATENT DOCUMENTS

| | | |
|---|---|---|
| JP | 2007107475 A | 4/2007 |
| WO | 2008154730 A1 | 12/2008 |

OTHER PUBLICATIONS

International Search Report and Written Opinion from PCT Application No. PCT/EP2016/063223, dated Oct. 7, 2016.

* cited by examiner

Left chamber:
-fluid intake

Right chamber:
fluid discharge

Inlet port closed

Right chamber:
fluid discharge

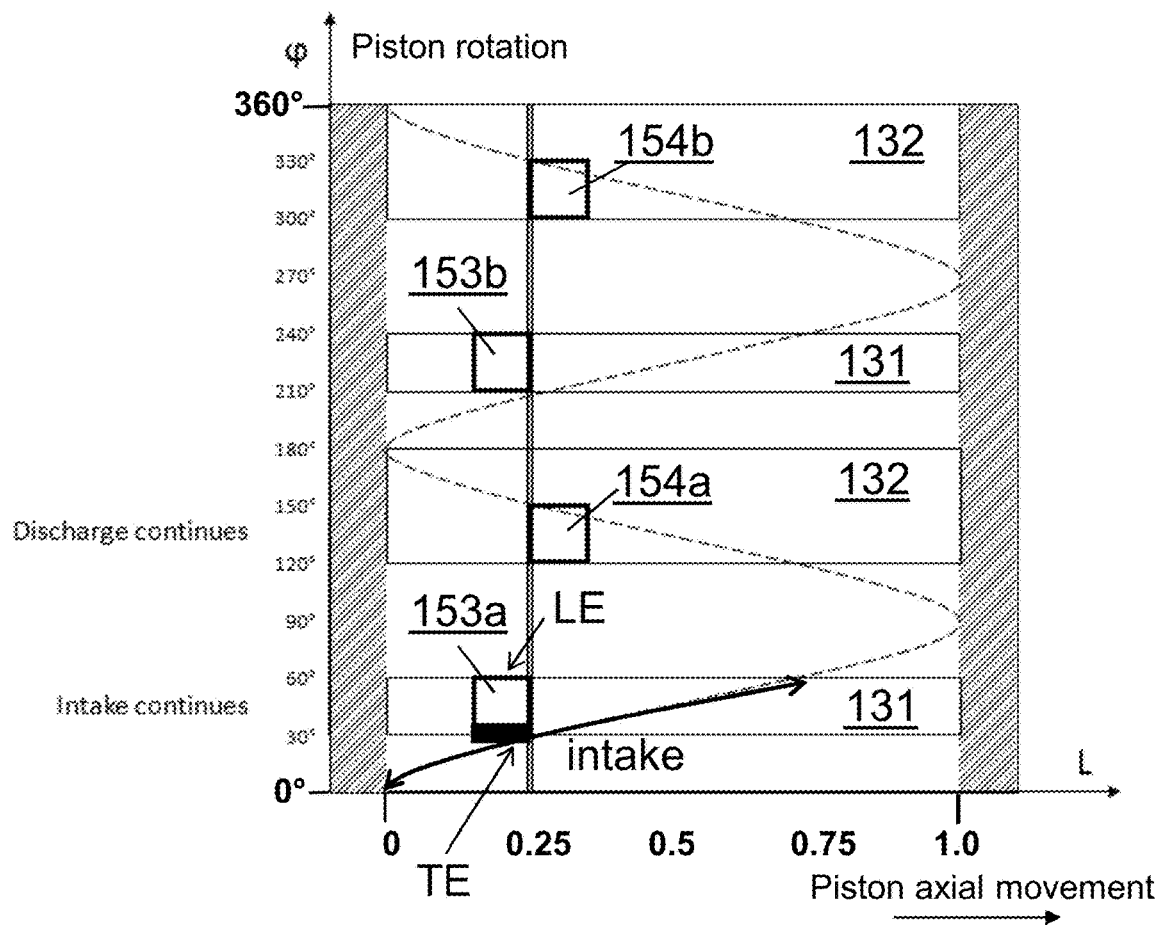
chamber1: connected to inlet, fluid entering chamber1
chamber2: connected to outlet, fluid leaving chamber2
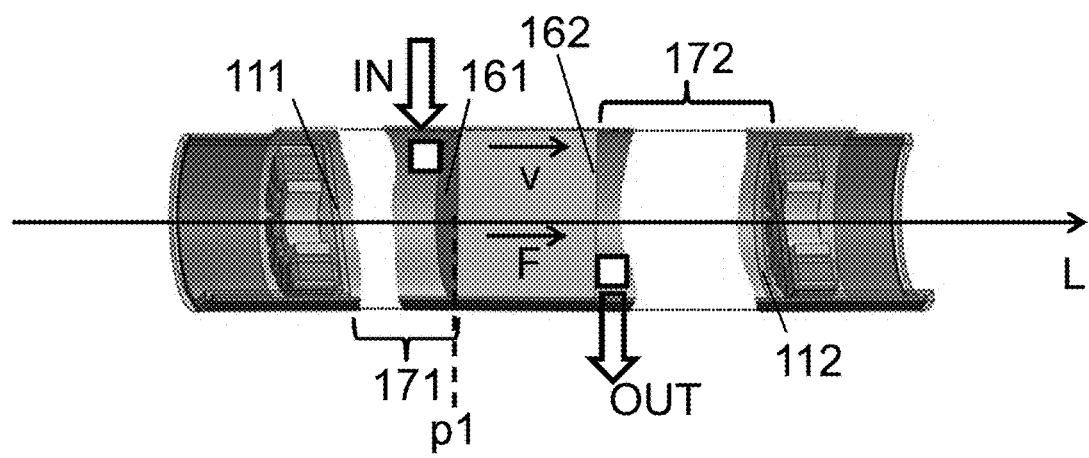
FIG 5

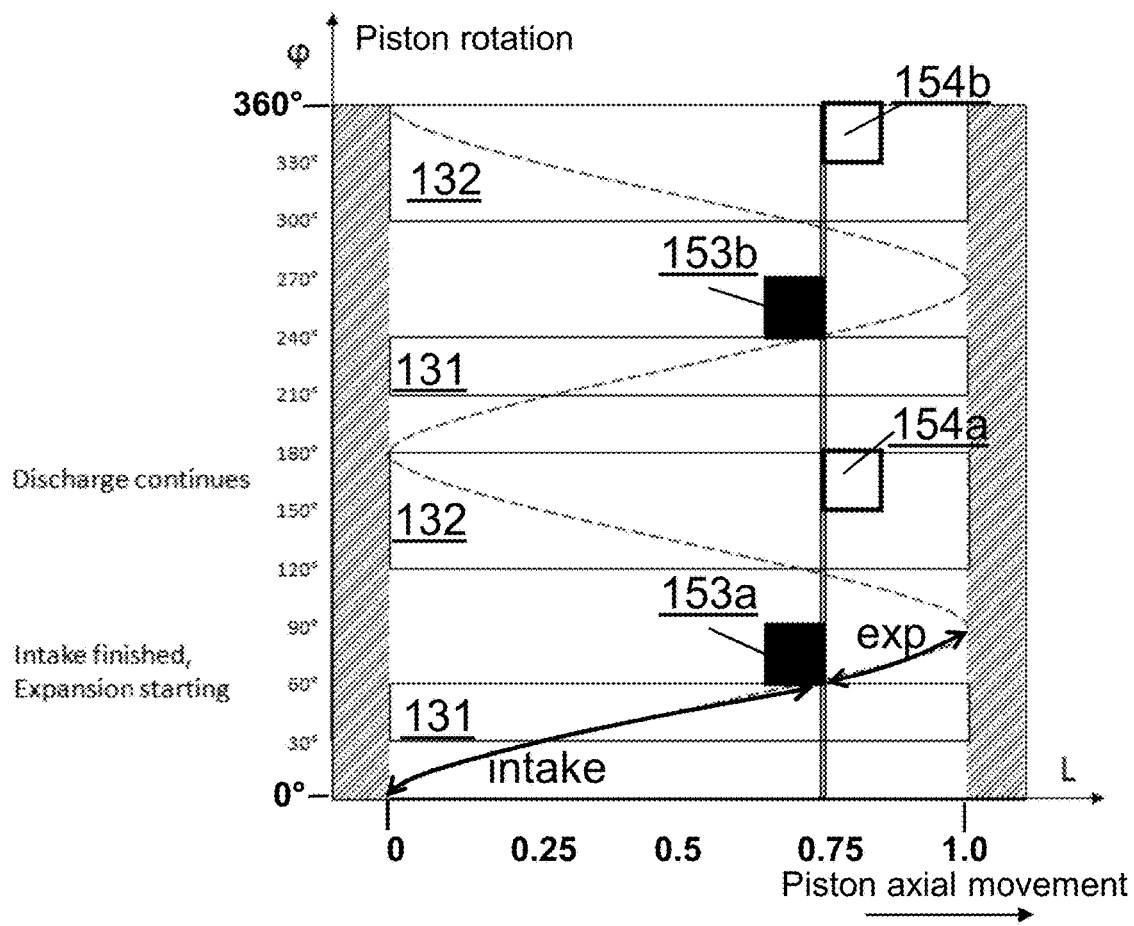
chamber1: closed from inlet, fluid expanding
chamber2: still connected to outlet (low counter-pressure)
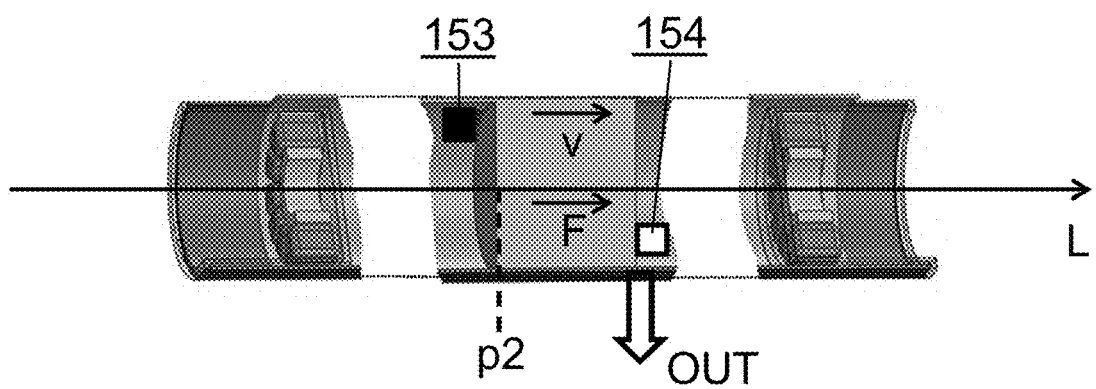
FIG 6

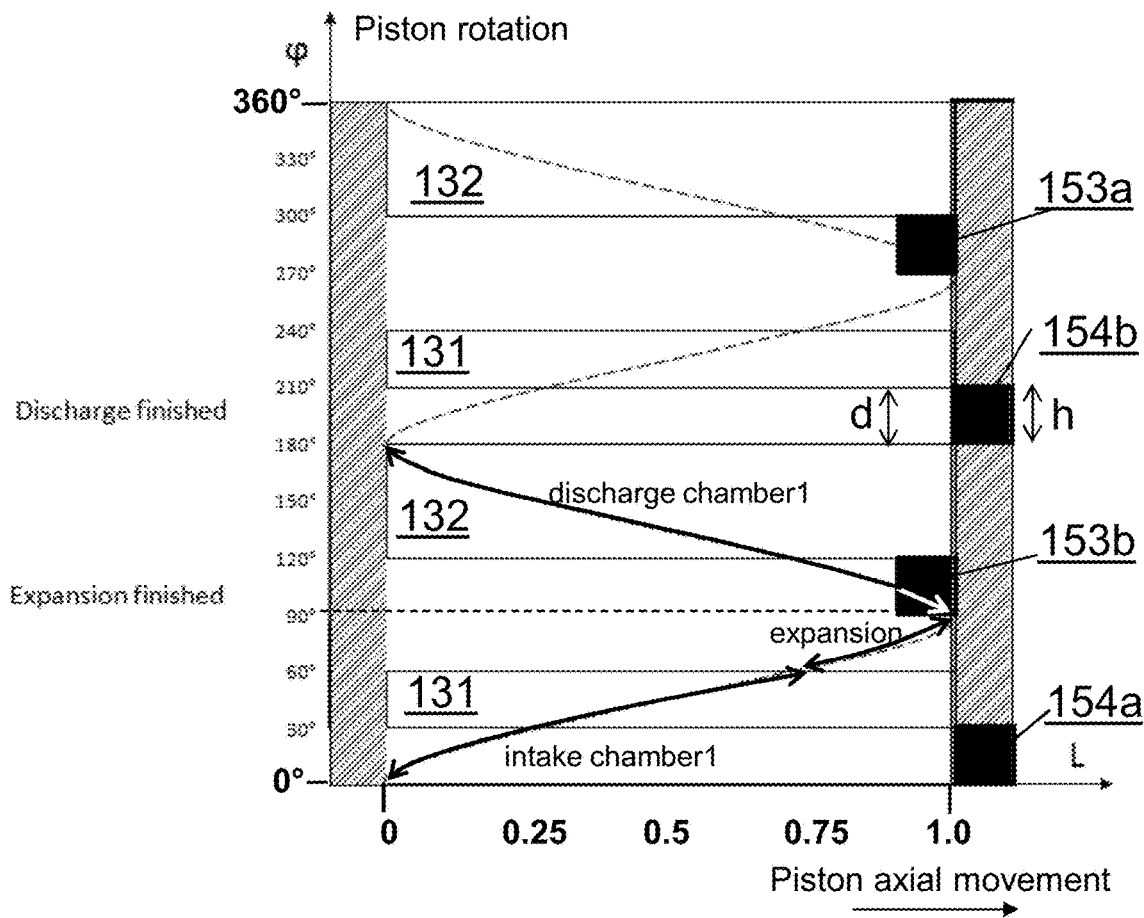
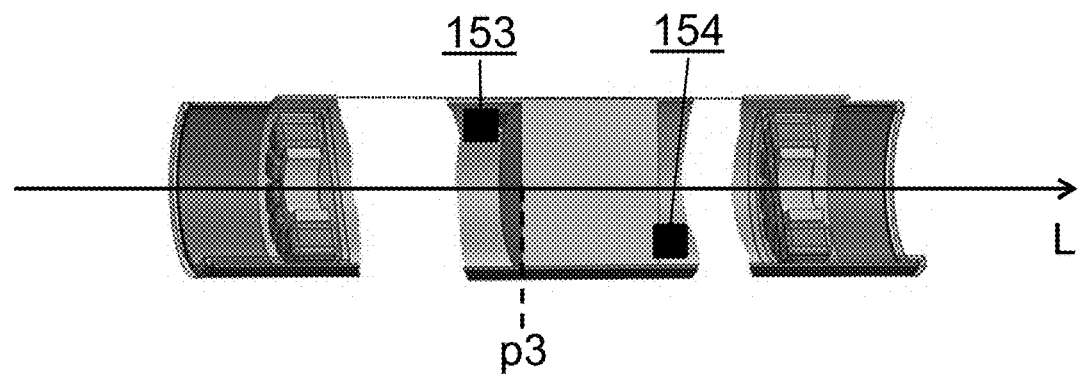
FIG 7

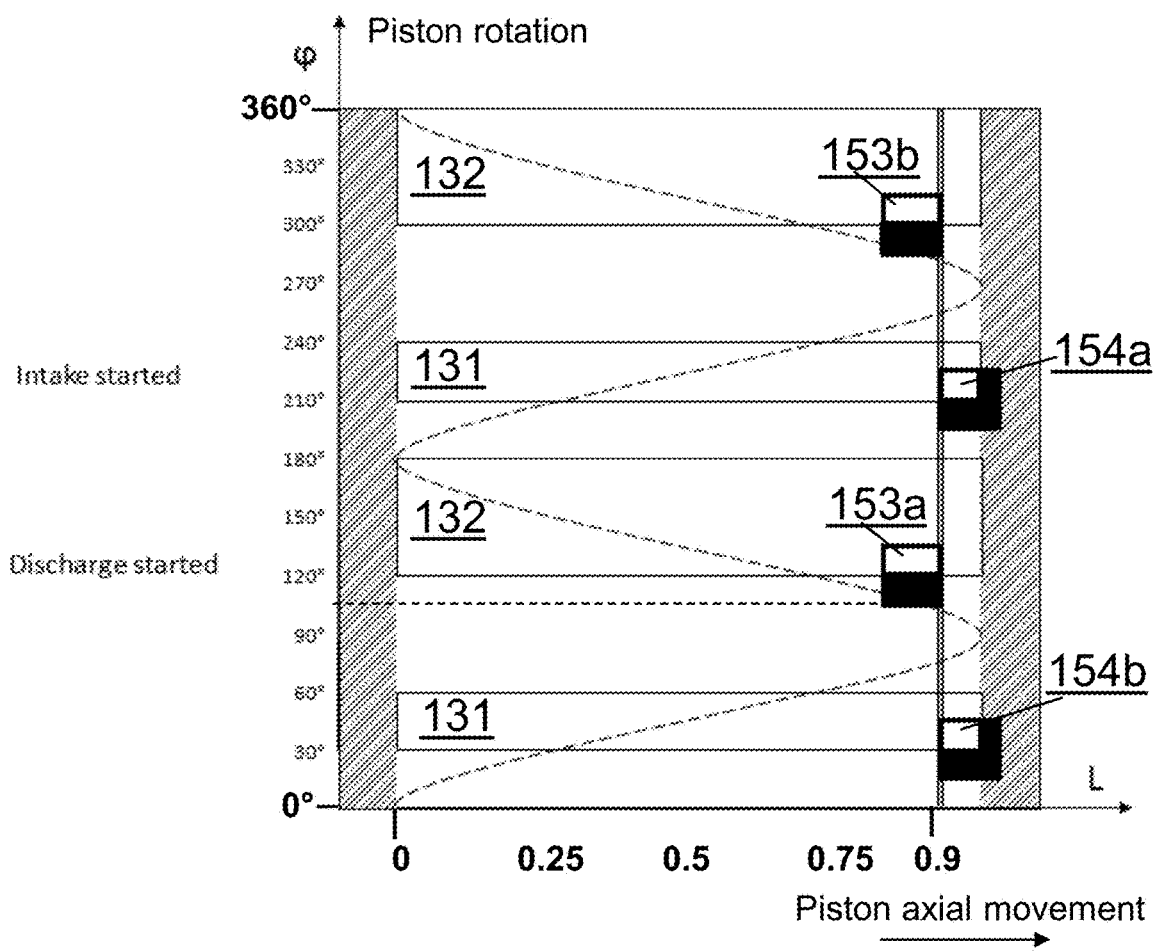
chamber1: connected to outlet
chamber2: connected to inlet
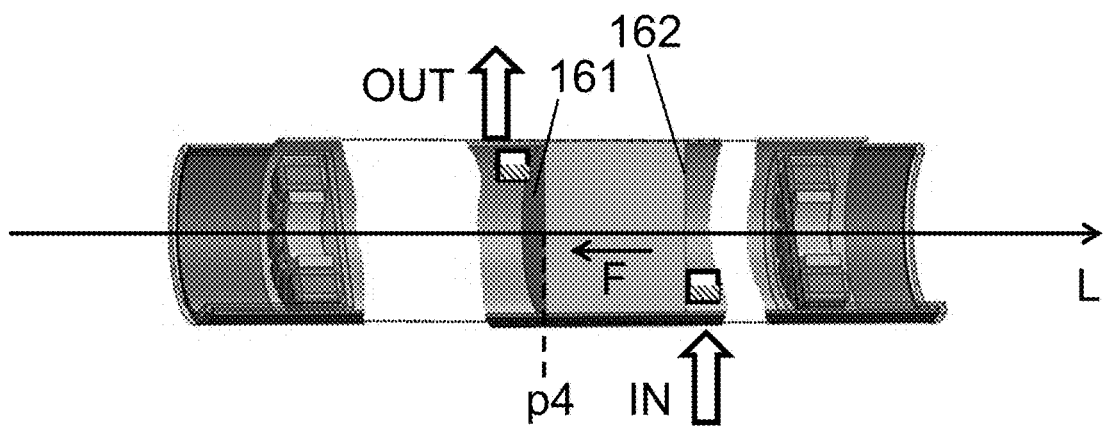
FIG 8

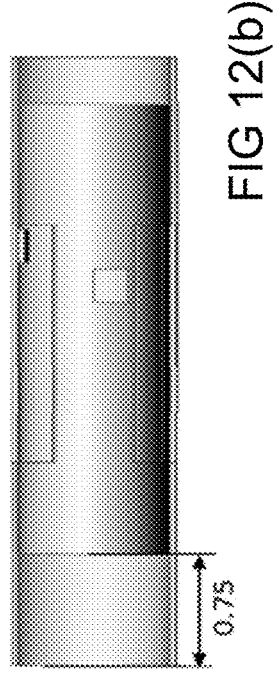
FIG 12(b)
Relative displacement = $L/L_{max}$
0.75
Inlet port closes at 60°
VR = 1/0.75 = 1.333
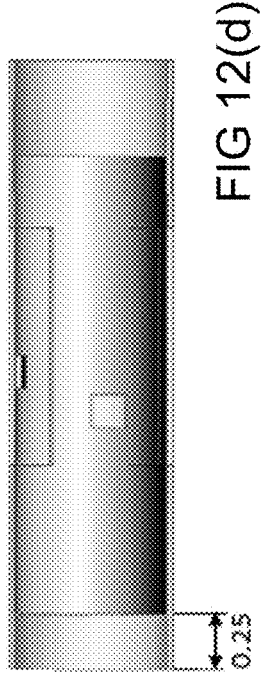
FIG 12(d)
0.25
VR = 1/0.25 = 4
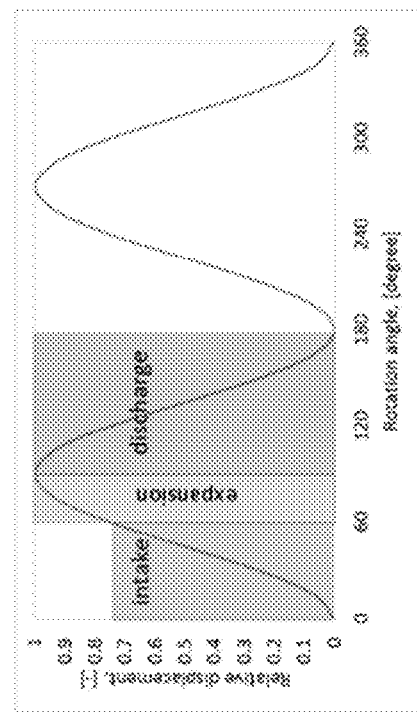
Linear motion assumed a sinusoidal function of time
Reference case: rotation speed is constant
FIG 12(a)
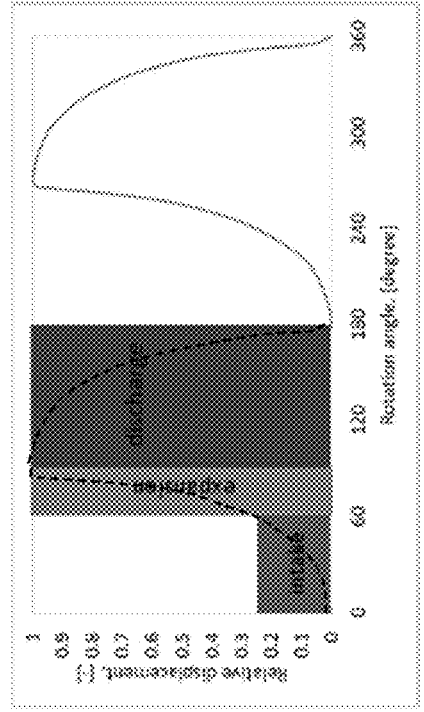
Improvement: rotation speed is variable
FIG 12(c)
FIG 12

The working fluid expands/compresses in two working chambers formed by coils and piston skirts.

The shape of the openings is optimised for VR ≥ 4, the intake finishes at L = 0.25, the rotational speed is constant

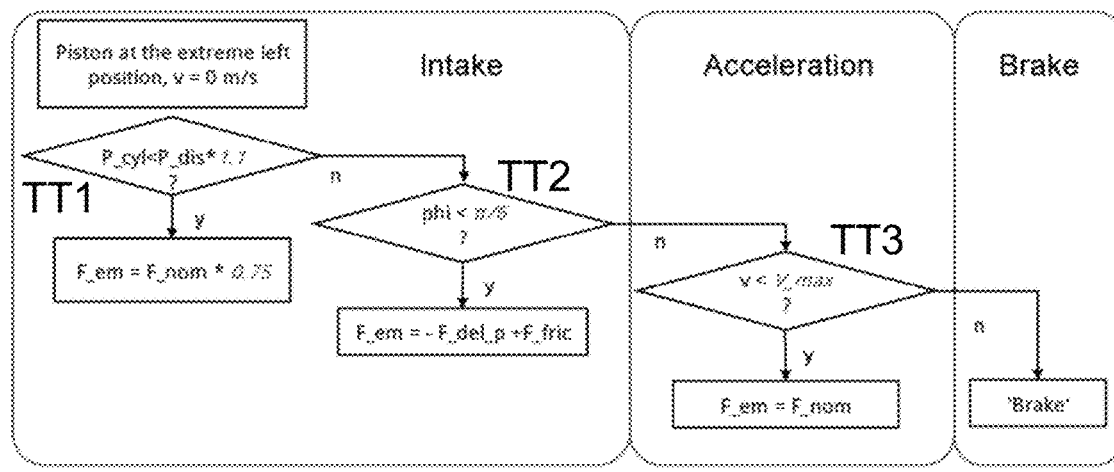
FIG 27
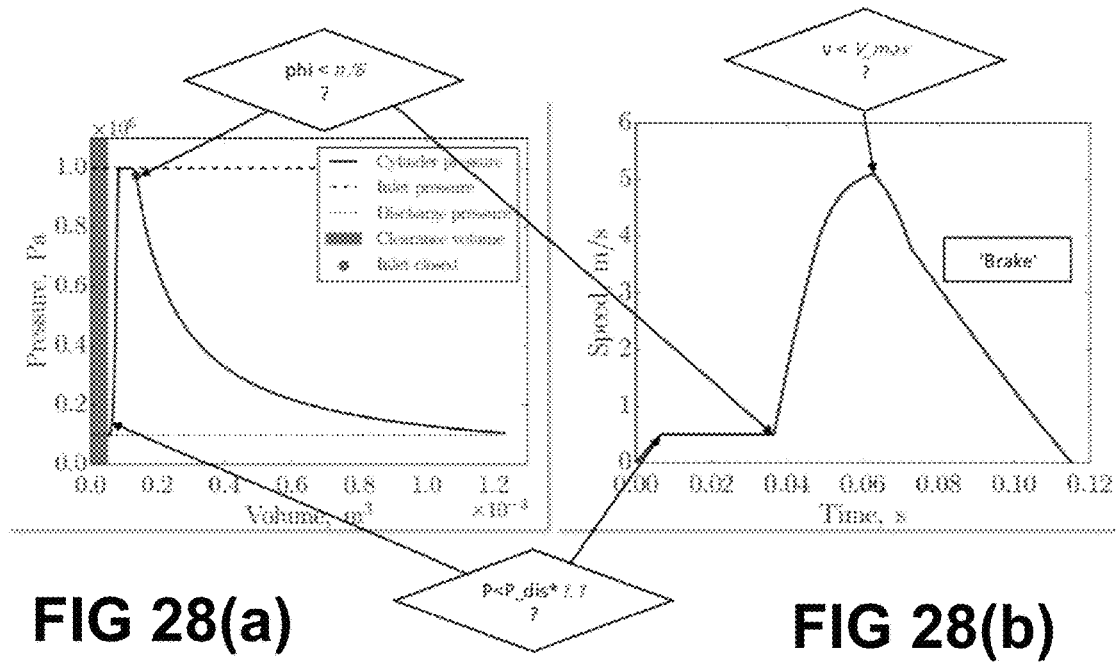
FIG 28(a)  FIG 28(b)

FREE PISTON DEVICE

FIELD OF THE INVENTION

The present invention relates to the field of free piston devices, such as free piston expanders and free piston compressors, and to the use of such a free piston expander inter alia in an Organic Rankine Cycle (ORC) for waste heat recovery.

BACKGROUND OF THE INVENTION

Waste heat recovery has become very important in the last decennia. The Organic Rankine Cycle (ORC) is the most popular technology to transform waste heat into mechanical work or electricity. While large and medium scale installations are widely available on the market for various (fixed) temperature and power levels, small scale ORC's are still in a pre-commercial phase, probably because of a relatively high specific price. To make small scale ORC's more technically and commercially attractive, the price needs to be reduced and/or the performance has to be increased, or other technical advantages need to be provided.

FIG. 1 shows a block-diagram of an ORC installation, known in the art. The functioning of such an installation, and in particular the thermodynamic aspects thereof are well known in the art, and hence need not be described in detail herein. The present invention focuses on two components of such an installation: the expander (2) and the generator (3), and proposes a particular architecture for these devices.

WO2008154730A1 discloses an energy transfer machine and method for producing power or cooling from low grade heat sources. In FIG. 38 of the present invention, which is a replica of FIG. 11 of said international patent application, an energy transfer machine 1000 is shown comprising a piston 1150 which spins around its axis while reciprocating. The device 1000 has two chambers 1171, 1172, two separate inlet ports 1132A, 1132B and two separate output ports 1131A, 1131B. In the position shown in FIG. 38, fluid present in the chamber 1171 leaves the device via outlet port 1131A by flowing through a "flow conduit" 1199A being a groove formed in an outer wall surface of said piston. After rotation of the piston, the groove comes in fluid connection with the inlet port 1132A, and fluid enters the chamber 1171 via the same groove.

Although many types of expanders are known in the art, there is still room for alternatives and/or for improvement. Expanders and compressors are seen as the inverse of each other, some of the challenges encountered for expanders are also faced in the design of compressors.

SUMMARY OF THE INVENTION

It is an object of embodiments of the present invention to provide a good free piston device, in particular a good free piston expander and a good free piston compressor.

It is an object of embodiments of the present invention to provide a free piston device having a compact architecture.

It is an object of embodiments of the present invention to provide a free piston device having less moving parts, for example having only one moving part.

It is an object of particular embodiments of the present invention to provide a free piston device, which can convert thermodynamic energy in electricity, or vice versa.

It is an object of particular embodiments of the present invention to provide a free piston expander with an embedded electrical generator.

It is an object of particular embodiments of the present invention to provide a free piston device having a reduced amount of "dead volume".

It is an object of particular embodiments of the present invention to provide a free piston device capable of being operated with a variable volumetric ratio.

These objectives are accomplished by devices according to embodiments of the present invention.

According to a first aspect, the present invention provides a free piston device, comprising: a housing having a cylindrical inner wall defining a cylindrical cavity, the cylindrical inner wall having a first wall opening connectable to a first channel and a second wall opening connectable to a second channel; a cylindrical piston arranged in said cylindrical cavity and being movable in axial direction and being rotatable around its longitudinal axis; the piston comprising a central element, and a first skirt having a cylindrical wall defining a first cylindrical space closed at one end by a first face of said central element, the first face and at least part of the cylindrical wall of the first skirt and a transverse wall section of an element mounted inside the housing or a transverse wall section being part of the housing, said transverse wall section being positioned inside the cylindrical space of the first skirt, forming a first chamber inside said first skirt, said first skirt having at least a first skirt opening in the form of a first hole through the cylindrical wall of the first skirt for allowing passage of a fluid directly into or out of said first chamber; first control means for controlling movement of said piston in axial direction along its longitudinal axis; second control means for controlling movement of the piston in angular direction around its longitudinal axis; sensing means adapted for providing a first signal related to the axial position and a second signal related to the angular position of the piston relative to the housing; a digital control unit for controlling the first and/or the second control means for rotating the piston around its longitudinal axis and/or for moving the piston along its longitudinal axis, based on at least the first and the second signal, in a manner wherein the axial movement is synchronized with the longitudinal movement such that the first skirt opening is in fluid connection with the first wall opening at a first moment in time when the piston is in a first axial position, and such that the first skirt opening is in fluid connection with the second wall opening at a second moment in time when the piston is in a second axial position different from the first axial position.

With "directly" is meant in particular "without having to pass through a channel formed between said hole and said chamber".

It is an advantage of embodiments of a free piston device according to the present invention that the only moveable part is the piston itself, whereby the opening in the cylindrical wall of the piston itself functions selectively as "inlet valve" and "outlet valve" of the first chamber. In this way mechanical parts other than the piston itself are avoided, both inside the piston and in the housing, thus strongly reducing the risk of defects.

It seems not to be widely recognized or fully appreciated in the prior art that the rotation of the piston around its axis is a yet unused degree of freedom, which can advantageously be used to remove movable valves, at the "cost" of additional control. However, in recent years the decreased cost and increased performance of digital control, moreover in the form of programmable digital microprocessors or DSP's (digital signal processors) or even programmable hardware (such as PLD's, FPGA's, etc) has made it possible to perform complex algorithms at a relatively low price.

It is an advantage of embodiments of a free piston device according to the present invention that the required geometry of both the housing and the piston is extremely simple to produce, without complicated parts, reducing the component cost, and assembly cost.

It is an advantage of embodiments of the present invention that the timing of the opening and closing of the (virtual) valves can be controlled (1) at the design-stage, by choosing a suitable geometry (e.g. shape and size of the skirts and wall openings), and a suitable relative position of the skirt openings and the wall openings, but can also be controlled (or at least fine-tuned) during operation (2) by appropriately rotating the piston around its longitudinal axis and/or appropriately moving the piston along its longitudinal axis, in other words, by adapting at least one of said angular velocity or axial velocity.

It is an advantage of embodiments of the present invention that the time period during which the "inlet valve" is open (read: the time period during which the first skirt opening is in fluid connection with the first wall opening of the housing) can be different from the time period during which the "outlet valve" is open (read: the time period during which the first skirt opening is in fluid connection with the second wall opening of the housing). This can be achieved by choosing an appropriate geometry at the design-stage, but also by influencing the rotational movement and/or the longitudinal movement of the piston during operation.

It is an advantage that the performance of the free piston device (e.g. in terms of power conversion efficiency, or in terms of output power) can be controlled by a digital control unit, which can be programmed to control the device using a suitable algorithm.

In its simplest implementation, the control algorithm may simply drive the piston at a constant angular velocity. This embodiment is suitable for example for situations where the conditions (e.g. temperature and pressure) of the fluid in the inlet channel and outlet channel are substantially constant). This offers the advantage that the control algorithm can be relatively simple, and that (during steady state) no energy is required for increasing or decreasing the angular velocity and/or the axial velocity of the piston.

In another implementation, the control algorithm may be adapted for optimizing the expander efficiency, or for providing maximum power output, based on for example the temperature and/or pressure of the fluid at the first and second fluid channel, which may vary over time.

It is an advantage of a free piston device according to embodiments of the present invention that there is no (or only minimal) friction between the housing and the piston (because there are no moving parts other than the piston itself), and thus also minimal wear. This further reduces the requirements for maintenance and guarantees a long lifetime.

It is an advantage of a free piston device that it can be very compact, inter alia because it does not require a mechanical transmission system, such as e.g. a crank. This also makes the energy conversion more efficient, by reducing losses (mechanical, thermal, etc).

It is an advantage of a free piston device according to the present invention that it can be used in an Organic Rankine Cycle, and thus does not require fresh air and fuel. But the device is not limited to ORC applications, and in fact can be used in any thermodynamic cycle using compression or expansion.

It is an advantage of a free piston device according to the present invention that it does not have moving parts protruding through the housing, and thus can be part of a hermetically closed system. This offers the advantage that the working fluid can be completely reused in a closed circuit, and cannot escape to the environment. This also allows the use of certain fluids which may be considered "dangerous".

Alternatively, the free piston device according to the present invention may also be used in a system where the first channel is for example an exhaust gas at a pressure higher than the ambient, produced by a combustion process inside or outside the device, and the second channel is connected to the free atmosphere. In such a situation, the working fluid would not be reused in a closed circuit.

It is an advantage of embodiments of the present invention that the digital control logic can be implemented as a programmable processor, or as programmable hardware, or as a combination of both.

The free piston device of the present invention is ideally suited for constructing a free piston expander, or a free piston compressor, for example.

The control means may comprise driving means (e.g. a motor, e.g. a linear motor) and/or braking means (e.g. said linear motor when driven to counteract the piston movement).

It is an advantage that the "transversal wall" is located inside the skirt, because this allows the "minimum volume" of the chamber to be very small.

In an embodiment, the sensing means further comprises a first pressure sensor arranged for measuring a pressure inside the first chamber; and the digital control unit is further adapted for controlling the first and/or second control means by also taking into account a signal obtained from the first pressure sensor.

It is an advantage of embodiments wherein the pressure is measured that the control algorithm executed by the control unit can take into the pressure inside the working chamber. This may allow for an even more accurate control of the piston movements. The first pressure sensor can for example be mounted on said transverse wall section of said element.

In an embodiment, the first and second control means comprise at least one electromagnetic rotor assembly mounted to the piston and at least one electromagnetic stator assembly mounted to the housing.

It is an advantage of embodiments of the present invention that a stator and rotor-assembly can directly convert mechanical energy into electrical energy, or vice versa, without the intermediate of a crank, a flywheel, etc.

It is an advantage of the electromagnetic assembly that it allows to transfer energy (power) in a contactless manner, so that wear and maintenance is reduced to a minimum, and lifetime is increased.

It is an advantage that the electromagnetic assembly may be used during startup, to move the piston axially, and that the same electromagnetic assembly can be used to rotate the piston around its longitudinal axis, using appropriate drive signals.

It is an advantage of particular embodiments that the electromagnetic rotor and stator assembly can even be used as the axial and angular position sensing means, but that is not absolutely required, and other sensing means can also be used.

The rotor assembly and stator assembly may (at least partly) be organized as a linear motor or linear generator, and/or may (at least partly) be organized as a BLDC motor, and/or may (at least partly) be organized in a checkerboard pattern, or combinations hereof.

In a particular embodiment, a first stator and rotor assembly is arranged at one end of the piston, and configured to act as a BLDC motor, and a second stator and rotor assembly is arranged at the opposite end of the piston, and is configured to act as a Linear motor.

In an embodiment, the free piston device is a free piston expander; the first channel is configured for providing a fluid having a first pressure to the first chamber; the free piston device is adapted for allowing the fluid in the first chamber to expand during a first time period, by allowing the piston to move away from the first transverse wall section, thereby increasing the volume in the first chamber; the second channel is configured for receiving a fluid having a second pressure lower than the first pressure, from the first chamber; the rotor assembly and stator assembly being configured for functioning as a linear generator for converting the axial movement of the piston due to the fluid expansion into electrical power.

The free piston device can be a free piston expander or a free piston compressor. This embodiment is directed to the free piston expander.

In an embodiment, the element comprises the transverse wall section is an element mounted inside the housing.

The "element" inside the housing may be a stator assembly, but does not necessarily needs to be a stator assembly.

In an embodiment, the element is the stator assembly, having an outer diameter corresponding to an inner diameter of the cylindrical wall of the first skirt.

This embodiment is illustrated in FIG. 24.

In an embodiment, the piston further comprises a second skirt having a cylindrical wall defining a second cylindrical space closed at one end by a second face of the central element, the second face of said central element and at least part of the cylindrical wall of the second skirt and a second transverse wall section of an element mounted inside the housing or a transverse wall section being part of the housing, said second transverse wall section being positioned inside the cylindrical space of the second skirt, forming a second chamber inside said second skirt, said second skirt having at least a first skirt opening in the form of a second hole through the cylindrical wall of the second skirt for allowing passage of a fluid directly into or out of said second chamber; the digital control unit is adapted for controlling the first and/or the second control means for rotating the piston around its longitudinal axis and/or for moving the piston along its longitudinal axis, based on at least the first and the second signal, in a manner wherein the axial movement is synchronized with the longitudinal movement * such that the first skirt opening is in fluid connection with the first wall opening of the housing and the second skirt opening is in fluid connection with the second wall opening of the housing at a first moment in time when the piston is in a first axial position, * and such that the first skirt opening is in fluid connection with the second wall opening of the housing and the second skirt opening is in fluid connection with the first wall opening of the housing at a second moment in time when the piston is in a second axial position different from the first axial position.

It is an advantage of this embodiment over many prior art devices that the same wall inlet opening can be used for both chambers, and the same wall outlet opening can be used for both chambers.

In a variant of this embodiment, the housing of the free piston device has two separate inlet openings, one for each skirt, but only one (common) outlet opening. The separate inlet openings may be located near the outer ends of the housing, the common outlet opening would be located near the center of the housing.

In an embodiment, the free piston device further comprises a means for moving the piston in an axial direction towards the first transverse wall section, said means comprising at least one of the following components: a gas spring, a mechanical spring.

Such a piston is thus adapted for making a reciprocal movement, whereby during one half of the reciprocating period, thermodynamic energy from the fluid is converted into mechanical energy of the piston, which is partly stored in the spring, and partly converted into electrical energy. In the second half of the period, the stored part is used to push the piston back to its original position.

It is an advantage of this embodiment (over an embodiment having two chambers) that it is less complex to design, and requires less processing power for controlling its angular movement, because for each reciprocating period, only two timing values need to be controlled (as compared to four in case of a piston with two chambers, see further). However, this embodiment has the disadvantage that the flow rate (of a working fluid) is only half of the flow rate of an expander with two chambers (and otherwise same dimensions), and thus also the output power will be half (for the same fluid conditions).

In an embodiment, the piston further comprises a second skirt having a cylindrical wall closed at one end by said center element, a second face of the center element and at least part of the cylindrical wall of the second skirt and a second transverse wall section of a second element mounted inside the housing or a second transverse wall section being part of the housing, said second transverse wall section being positioned inside the cylindrical space of the second skirt, forming a second chamber inside the second skirt, said second skirt having at least a first opening in the form of a first hole through the cylindrical wall of the second skirt for allowing passage of a fluid directly into or out of said second chamber; the free piston device is adapted for allowing the fluid in the second chamber to expand during a second time period, by allowing the piston to move away from the second transverse wall section, thereby increasing the volume in the second chamber; the digital control unit being further configured for controlling the first and/or the second control means for rotating the piston around its longitudinal axis and/or for moving the piston along its longitudinal axis, based on at least the first and second signal and optionally also based on the signal from the first pressure sensor and/or the signal from the second pressure sensor, in a manner wherein the axial movement is synchronized with the longitudinal movement such that the opening of the second skirt is in fluid connection with the first wall opening at a third moment in time when the piston is in a third axial position, and such that the opening of the second skirt is in fluid connection with the second wall at a fourth moment in time when the piston is in a fourth axial position different from the third axial position.

Such a piston is thus adapted for making a reciprocal movement, whereby during both halves of the reciprocating period, thermodynamic energy from the fluid is converted into mechanical energy of the piston due to expansion of the fluid.

The third axial position may be the same as the second axial position, and the fourth axial position may be the same as the first axial position.

It is an advantage of embodiments where the piston has two chambers, that both halves of the reciprocating period can be used for actuating the piston because the piston is actively driven back to its initial position by the fluid in the second chamber.

It is an advantage that the flow rate of the fluid through the expander is twice the flow rate of an expander having only a single chamber. In other words, the power output of such an expander is typically about twice the power of an expander with a gas spring (all other parameters considered the same).

In an embodiment, the sensing means further comprises a second pressure sensor arranged for measuring a pressure in the second chamber, and the digital control unit being further adapted for controlling the first and/or second control means by also taking into account a signal obtained from the second pressure sensor.

This allows the control unit to take into account the actual pressure inside the chamber, which may allow more accurate control of the piston. The second pressure sensor can for example be mounted on said transverse wall section of said second element.

In an embodiment, the free piston device is a variable volumetric ratio expander; the momentary volumetric ratio is defined by the ratio of the maximum volume and the minimum volume of the first chamber over one reciprocating period, and the digital control unit is configured for controlling the first and second control means for selectively accelerating and/or decelerating the piston around its longitudinal axis and/or along its longitudinal axis for obtaining a predefined volumetric ratio, * by influencing a first timing at which the opening of the first skirt is in fluid connection with the first wall opening for intake of fluid from the first channel into the first chamber, * and by influencing a second timing at which the opening of the first skirt is in fluid connection with the second wall opening for removal of fluid from the first chamber into the second channel.

It is an advantage of embodiments of a free piston expander according to the present invention that it can advantageously be used in conjunction with a variable heat source, such as for example the exhaust gasses of a vehicle, such as a car or a truck or a bus, where the amount of waste heat depends on the load conditions, while still providing for example optimum or close-to-optimum efficiency. It is an advantage that the timing of the opening and closing of the (virtual) valves can be adjusted depending on the characteristics of the fluid in the first and second channel, and on the output characteristics.

In particular embodiments, the volumetric ratio is configurable in the range from 3.0 to 20, for example in the range from 3.0 to 10.0 or in the range from 5.0 to 15.0 or in the range of 10.0 to 15.0, or in the range of 15.0 to 20.0, but other ranges may also be possible.

In an embodiment, the control unit is further adapted for obtaining said predefined volumetric ratio * by phase shifting the second timing such that the opening of the first skirt is brought in fluid connection with the second wall opening for allowing the fluid in the first chamber to leave the first chamber before the volume of the first chamber reaches a momentary maximum volume.

In an embodiment, the free piston device is a free piston compressor, the second channel is configured for providing a fluid having a first pressure to the first chamber; the fluid in the first chamber is compressed during a first time period, by moving the piston towards the first transverse wall section, thereby decreasing the volume in the first chamber; the first channel is configured for receiving a fluid having a second pressure higher than the second pressure, from the first chamber; the rotor assembly and stator assembly are configured for functioning as a linear motor for converting electrical power into axial movement of the piston for compressing the fluid.

As mentioned above, the free piston device can be a free piston expander or a free piston compressor. In this embodiment the device is a free piston compressor.

According to a second aspect, the present invention provides the use of the free piston device according to the first aspect for converting waste heat of exhaust gases of a combustion engine into electrical power.

It is an advantage that such a device that it can be advantageously used in an organic Rankine cycle (ORC) for converting waste heat into useful electrical energy.

It is an advantage of such a device that the volumetric ratio can be adapted to the available amount of waste heat as to optimize the efficiency at which the waste heat can be converted.

Particular embodiments of the free piston device have the same or similar features as the embodiments of the free piston expander described above, after appropriate replacement of terms like: inlet by outlet, expansion by compression, higher pressure by lower pressure, etc.

According to a third aspect, the present invention provides a waste heat recovery system comprising a free piston expander according to the first aspect.

According to a fourth aspect, the present invention provides a method of controlling the free piston device according to the first aspect, comprising the step of: energizing the first control means for increasing an axial velocity of the piston during at least a fraction of the time period during which the first skirt opening is in fluid connection with the first wall opening; or energizing the second control means for decreasing an angular velocity of the piston during at least a fraction of the time period during which the first skirt opening is in fluid connection with the first wall opening; or energizing the first control means for increasing an axial velocity of the piston during at least a first fraction of the time period during which the first skirt opening is in fluid connection with the first wall opening and energizing the second control means for decreasing an angular velocity of the piston during at least a second fraction of the time period during which the first skirt opening is in fluid connection with the first wall opening.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 5 to FIG. 8 schematically illustrate an example of how the angular movement of the piston around its longitudinal axis can be synchronized with the axial movement of the piston inside the cylindrical housing, by means of four "snapshots" showing the relative position of the piston skirt openings relative to the position of the inlet and outlet opening of the housing.

FIG. 12(a) to FIG. 12(e) illustrates how control of the angular movement of the piston can be used to implement different volumetric ratios. FIGS. 12(a) and (b) illustrate how a constant angular velocity in combination with a sinusoidal axial movement implements a first (e.g. default) volumetric ratio. FIGS. 12(c) and (d) illustrate how angular acceleration and/or deceleration and/or axial acceleration and/or deceleration can be used to influence the time instances at which the (virtual) valves open and close, thereby changing the volumetric ratio. FIG. 12(e) shows the "intake zone", "expansion zone" and "discharge zone" as a function of the axial and angular position for the sinusoidal movement shown in FIG. 12(a).

FIG. 17 (bottom) shows the example of FIG. 17 (top) with a semi-transparent housing, but a non-transparent piston (for illustrative purposes).

FIG. 21 and FIG. 22 show a reference (sinusoidal) movement. FIG. 23 shows a controlled movement.

FIG. 25 to FIG. 28 show an example of a possible algorithm that can be used to control the angular and axial movement of the piston, in a manner suitable for generating electrical power.

FIG. 25 is a graphical representation of the angular versus axial movement of the piston, as indicated by the path followed by the inlet opening of the piston.

FIG. 26 shows an example of how the angular movement of the piston may be adjusted/influenced over time.

FIG. 27 shows a possible algorithm for obtaining the adjustment of FIG. 26.

FIG. 28(a) to FIG. 28(b) illustrates how the threshold values of the tests of FIG. 27 relate to the movement trajectory.

FIG. 29 shows an example of area of the inlet opening versus axial displacement.

FIG. 30 shows an example of axial displacement versus time.

FIG. 31 shows an example of mass flow of the working fluid versus axial displacement.

FIG. 32 shows an example of mass flow of the working fluid versus time.

FIG. 33 shows an example of angular position versus axial displacement.

FIG. 34 shows an example of angular position versus time.

FIG. 35 shows an example of a PV-diagram, showing pressure in the chamber versus volume of the chamber, but since the cross section is constant, this graph is also indicative for pressure in the chamber versus axial displacement.

FIG. 36 shows an example of axial speed versus axial position.

FIG. 37 shows an example of axial speed versus time.

Figure 1:
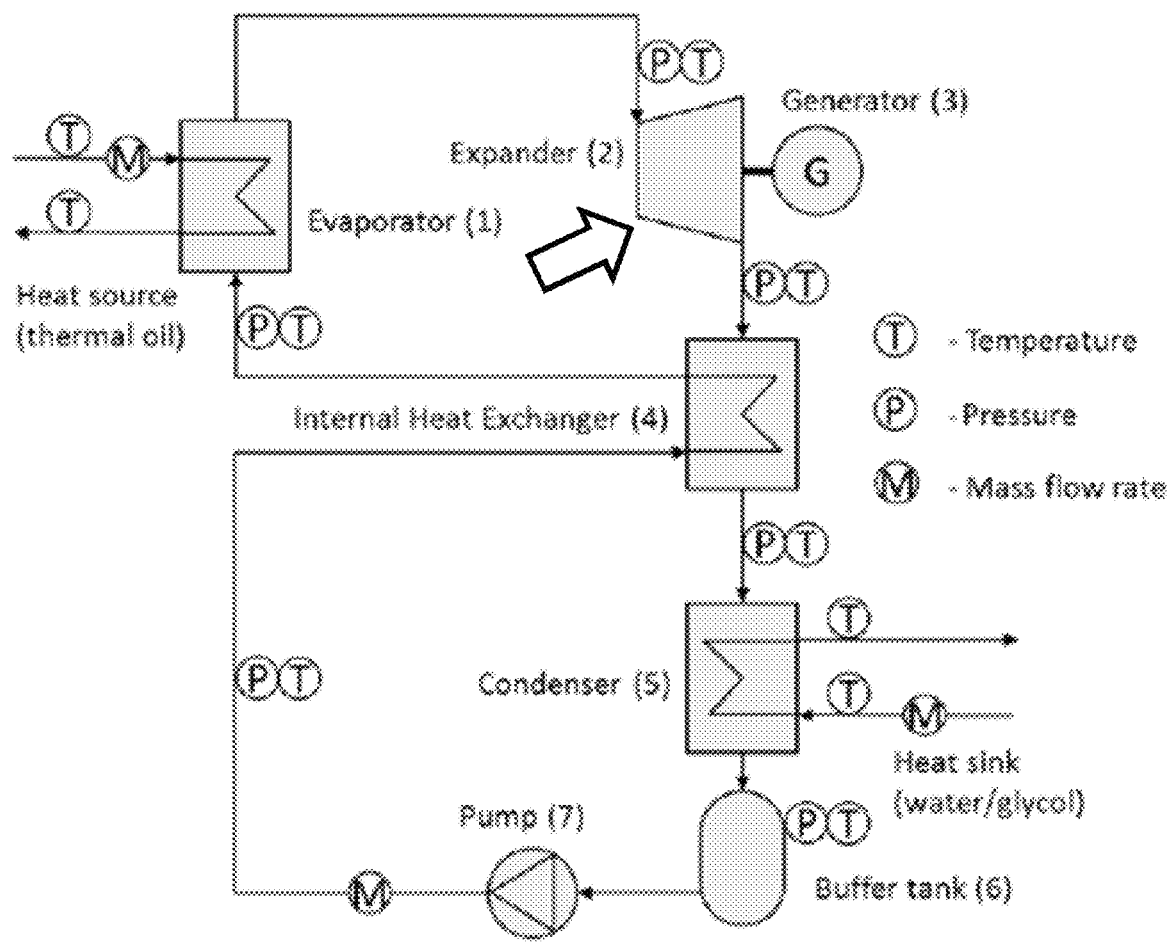
FIG. 1 shows a block-diagram of an Organic Rankine Cycle (ORC) installation, known in the art.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In this document, the terms "first chamber" and "first working chamber" are used as synonyms. Likewise, the "second chamber" means the "second working chamber".

FIG. 1 shows a block-diagram of an Organic Rankine Cycle (ORC) installation, known in the art. The purpose of such an installation is to convert heat energy into electrical or mechanical power, by making use of a suitable working fluid. The working of this cycle is well known in the art, and will therefore not be further described herein.

The inventors of the present invention were confronted with the problem of designing a compact expander device suitable for use in an ORC installation such as that of FIG. 1. They decided to use a free piston architecture because such devices are compact since they do not require a crank. Existing devices, known as "free-piston combustion engines", typically have one or more inlet valves for allowing a working fluid (e.g. fresh air and fuel) to enter a chamber, and one or more outlet valves for allowing the working fluid (e.g. exhaust gas) to exit the chamber.

However, the inventors also wanted to reduce the number of moving parts, in particular the inlet and outlet valves, and came to the insight that one degree of freedom is not used in such devices, namely: rotation of the device around its longitudinal axis. They came to the idea of exploiting this degree of freedom to remove the moving parts, in particular to remove the inlet valve(s) and outlet valve(s) known in existing devices, by providing one or more openings in the piston skirts and in the housing, whereby the one or more skirt openings function as inlet valve(s) and outlet valve(s). This is one of the underlying ideas of the present invention.

Figure 2:
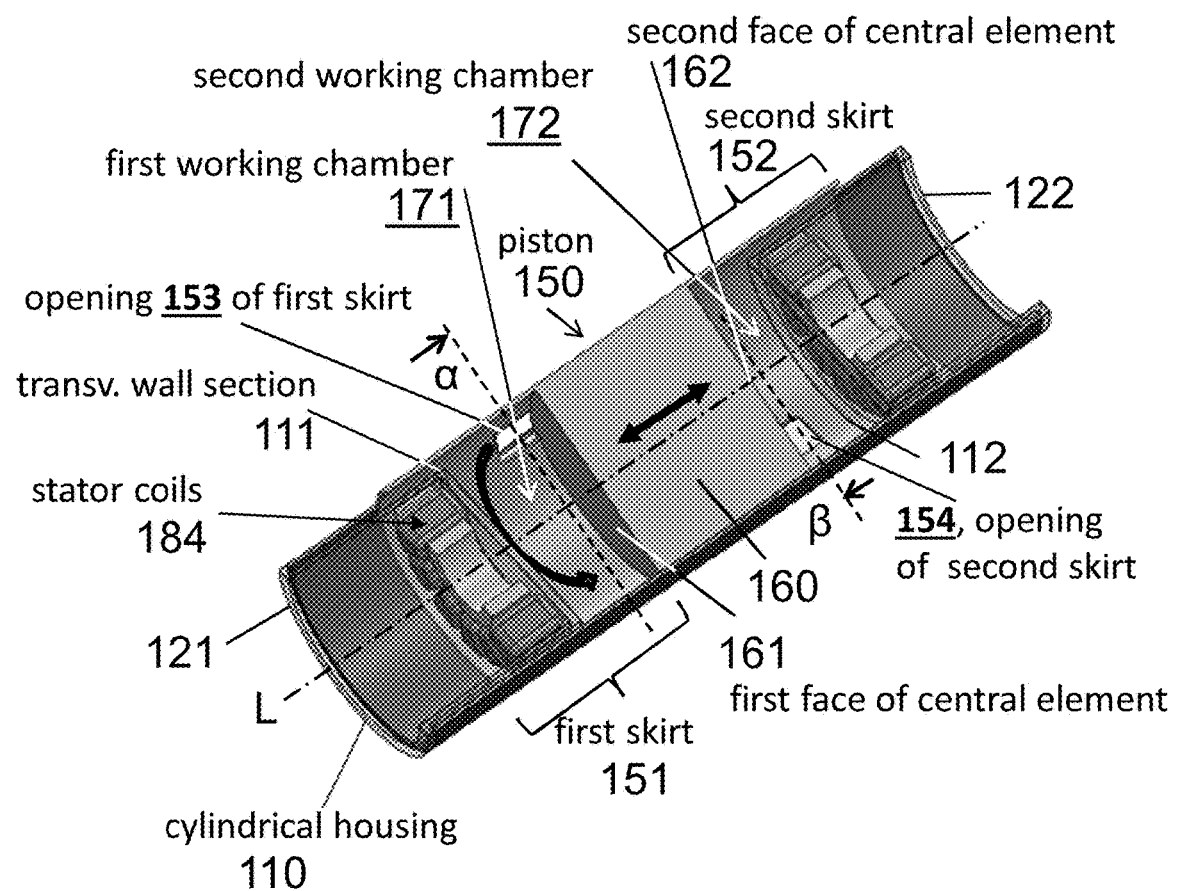
FIG. 2 shows a cut-away view of the main components of an exemplary free piston device according to the present invention.
Figure 18:
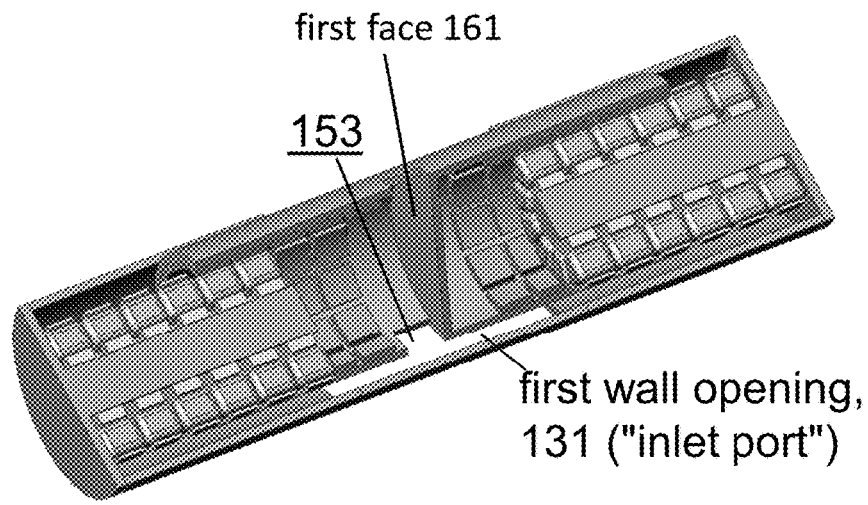
FIG. 18 to FIG. 20 are 3D-views of the half-cutaway device of FIG. 17 (top), after rotation of the piston part around its longitudinal axis, to better illustrate parts of an exemplary rotor and stator assembly.
Figure 19:
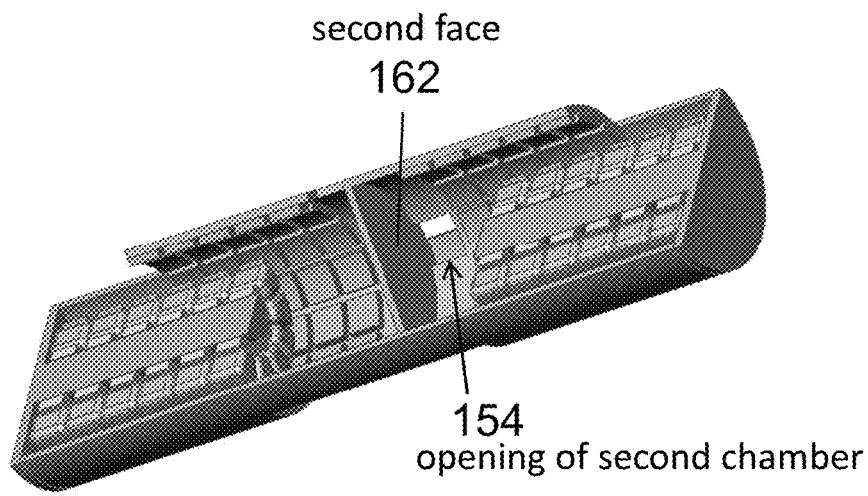
Figure 20:
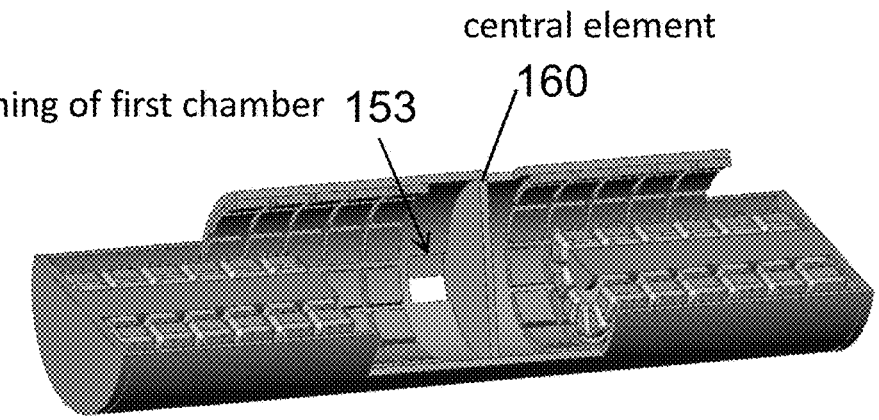

FIG. 2 shows a simplified representation of an example of the structure proposed by the inventors, to illustrate the most important elements, and the working principles of embodiments of a free piston device 100 according to the present invention. (The interested reader may already take a quick glance at FIG. 18 to FIG. 20 showing a similar device with more detail, as it may help to better understand the interrelation of the different parts).

Referring back to FIG. 2, the device 100 comprises a stationary cylindrical housing 110 (outer cylinder) with wall openings 131, 132 (not visible in FIG. 2, but see for example FIG. 3, FIG. 9) and a cylindrical piston 150 (inner cylinder) disposed therein. The outer diameter of the piston 150 is chosen in correspondence with the inner diameter of the cylindrical housing 110, taking into account minimal clearance, as is known in the art. Sealing rings (not shown) as known for example from combustion engines, may also be present. The piston 150 shown in FIG. 2 has a cylindrical shape with a central element 160 dividing the piston 150 in two parts, known as "skirts". The first skirt shifts over a first cylindrical element fixedly mounted to or being part of the housing, the second skirt shifts over a second cylindrical element fixedly mounted to or being part of the housing. The first element has a first transverse wall 111 located inside the cylindrical space of the first skirt, the second element has a second transverse wall 112 located inside the cylindrical space of the second skirt.

In the example shown in FIG. 2, the first element and the second element contain stator coils, and can therefore be considered as part of the stator assembly, but that is not absolutely required, and other cylindrical elements located inside the chamber (e.g. solid or hollow cylindrical elements) may also be used. The main purpose of the first and second surface is to reduce the amount of "dead volume", as will be explained further.

Figure 17:
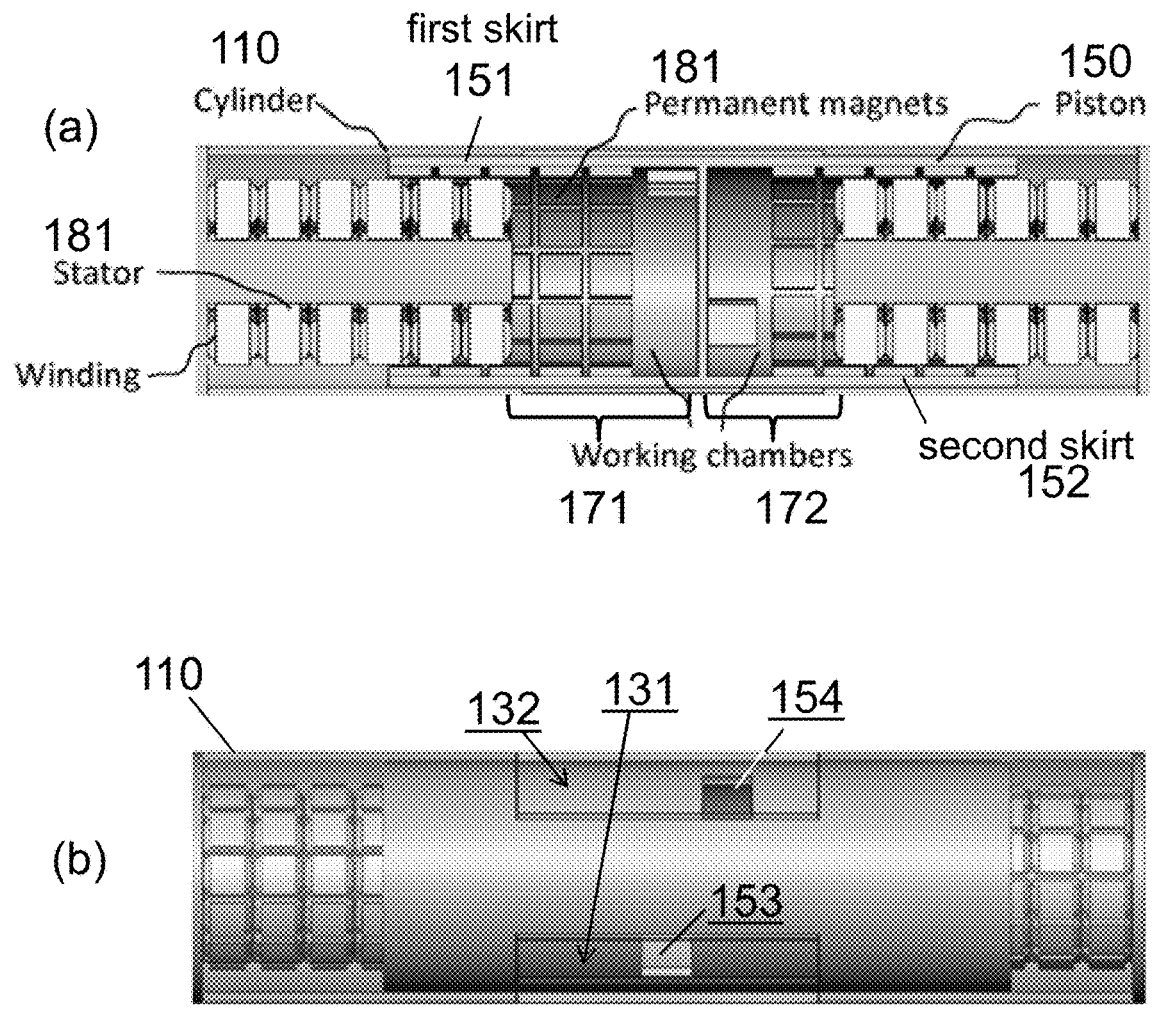
FIG. 17 (top) shows the example of FIG. 16 in side-view, after cutaway of half of the device in a plane through the longitudinal axis.

The piston 150 of FIG. 2 has two skirts: a first skirt 151 and a second skirt 152, located on opposite sides of a central element 160. FIG. 17 (top) shows a variant of the device of FIG. 2. Comparison of FIG. 2 and FIG. 17 (top) shows that the "thickness" of the central element 160 is not critical, and can be chosen, e.g. optimized depending on the application. This thickness influences the total length of the expander, but the working principles remain the same. The skilled person can choose an appropriate thickness depending on the envisioned pressure difference, piston diameter, and the material chosen. Choosing a relatively thin thickness (as in FIG. 17) offers the advantage of a more compact design and a lower mass of the piston (if desired).

Referring back to FIG. 2, the first skirt 151 encloses a first working chamber 171, which extends between a first face 161 of the central element 160 (which first face moves along with the piston 150 in axial direction) and a first transverse wall section 111 of a first cylinder (in the example containing the first stator coils) located in the housing (which is fixed). Likewise, the second skirt 152 encloses a second working chamber 172, which extends between a second face 162 of the central element 160 (which is movable along with the piston) and a second transverse wall section 112 of a second cylinder (in the example containing the second stator coils) located in the housing (which is fixed). When the piston 150 moves in axial direction to the right of FIG. 2, the volume of the first chamber 171 increases and the volume of the second chamber 172 decreases. When the piston 150 moves to the left of FIG. 2, the volume of the first chamber 171 decreases and the volume of the second chamber 172 increases.

The first skirt 151 contains at least one, for example two openings 153 in its cylindrical wall. The openings are through-opening or holes through the cylindrical wall of the skirts (i) for allowing passage of a working fluid directly into the first chamber 171 when the opening 153 is in fluid connection with an inlet opening 131 of the housing 110; in this situation the skirt opening 153 acts as an input valve (also referred to as "inlet valve"), in contrast to e.g. a shallow groove made on the outside of the piston cylindrical wall, which requires the fluid to make a 90° turn, and causes considerable friction due to the small cross sectional area, and thus causes pressure loss, which results in a lower overall efficiency;

(ii) for allowing passage of the working fluid directly out of the first chamber 171 when the opening 153 is in fluid connection with an outlet opening 132 of the housing 110; in this situation the skirt opening 153 acts as an output valve (also referred to as "outlet valve"), for the same reasons as stated under (i);

(iii) for closing the first chamber 171 when the fluid is expanding (free piston expander) or being compressed (free piston compressor) in the first chamber. This occurs when the opening 153 is not in fluid connection with any of the inlet opening and outlet opening of the housing, but facing an inner wall section of the cylindrical housing 110.

The first chamber 171 (or first skirt 151) may comprise two openings 153 (at 180° angular distance from each other) for simultaneously functioning as two inlet valves, or simultaneously functioning as two outlet valves, and the housing may comprise two first openings 131 (at 180° angular distance from each other) and two outlet openings 132 (at 180° angular distance from each other). Likewise, the second chamber 172 may comprise one or two openings 154 (only one is visible in FIG. 2, but two are shown in FIG. 3).

As mentioned above, the piston 150 is movable in an axial direction, and the skirt openings 153, 154 function as (virtual) valves. It is an advantage however that they are part of the piston itself, rather than small separate parts, which are actively opened and closed by some additional mechanism. This makes the production easier, reduces assembly cost and maintenance cost, and reduces the risk of part failures.

In what follows, the invention will be further described for a piston expander device, but the invention is not limited thereto, and also applies to a piston compressor device as can be used for example in a refrigeration installation or a heat pump, the main difference being that, in case of an expander, a working fluid enters a piston chamber at a given temperature and pressure, the fluid expands causing the piston to move and deliver electrical energy, and the fluid leaves the piston chamber at a decreased pressure (and often decreased temperature, although this is not absolutely required). In this case the pressure of the fluid at the inlet channel is higher than the pressure of the fluid at the outlet channel. In contrast, in a compressor, a working fluid enters the piston chamber at a given temperature and pressure, the piston is moved by external energy (e.g. electrical energy) causing the working fluid in the chamber to be compressed, and the working fluid leaves the chamber at an increased pressure (and often increased temperature, although that is not absolutely required). In this case the pressure of the fluid at the inlet channel is lower than the pressure of the fluid at the outlet channel. The device of the present invention can be used either as a free piston expander or as a free piston compressor, depending on the application.

According to an important aspect of the present invention, the piston 150 is movable in angular direction around its longitudinal axis L. In principle the angular movement is independent from the axial movement (in contrast to for example the movement of a screw in a threaded opening), but in practice the axial movement and angular movement need to be synchronized, as will be explained further.

Figure 3A:
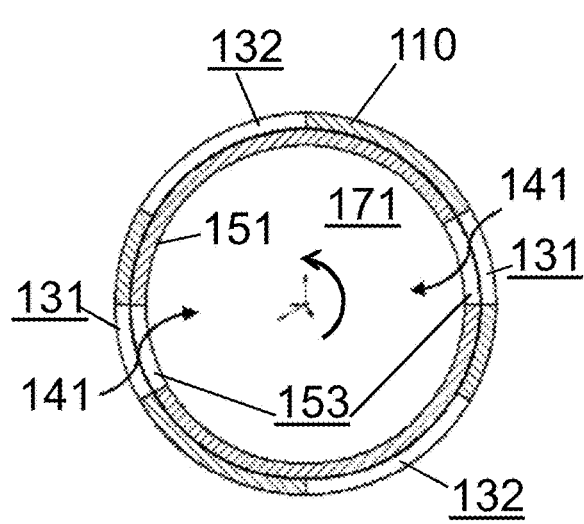
FIG. 3(a) and FIG. 3(b) show a cross sectional view of the device of FIG. 2 in the left and right chamber respectively, in a plane perpendicular to the longitudinal axis, at a particular moment in time.
Figure 3B:
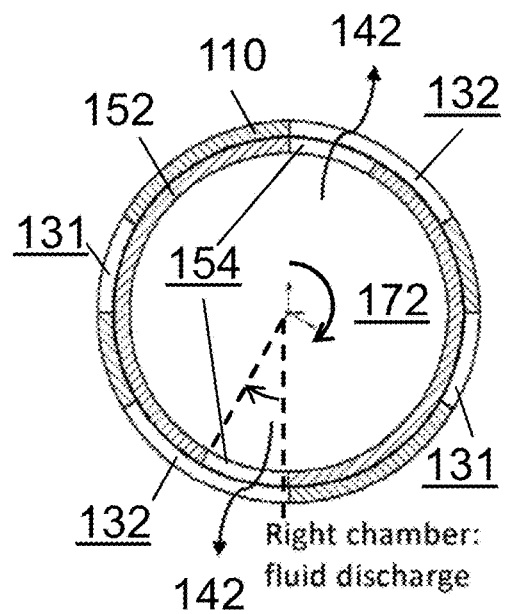

FIG. 3(a) shows a cross section of the piston 150 of FIG. 2 in a plane α perpendicular to the pistons longitudinal axis L, and passing through the two openings 153a, 153b of the first skirt 151 (or first chamber 171), as seen from the viewing angle indicated by the arrow; and FIG. 3(b) shows a cross section of the piston 150 of FIG. 2 in a plane β perpendicular to the pistons longitudinal axis L, and passing through the two openings 154a, 154b of the second skirt 152 (or second chamber 172), as seen from the viewing angle indicated by the arrow, when the piston 150 is in a first (axial and angular) position relative to the housing 110.

In the piston position of FIG. 3, (considered as an angular position with angular offset 30°, as indicated by the dotted lines):

the openings 153 of the first skirt 151 are "facing" or "overlapping with" the first wall openings 131 of the housing 110, so that during use, the first chamber 171 is in fluid connection with a first channel 141 (inlet channel at higher pressure), not explicitly shown, but connected or connectable to the first wall openings 131;

and the openings 154 of the second skirt 152 are "facing" or "overlapping with" the second wall openings 132 of the housing 110, so that the second chamber 172 is in fluid connection with a second channel 142 (outlet channel at lower pressure), not explicitly shown, but connected or connectable to the second wall openings 132.

It is noted that the terms "higher pressure" and "lower pressure" are used to indicate that (for an expander application) the pressure of the inlet channel is higher than the pressure of the outlet channel, during use.

Thus FIG. 3 shows the piston 150 in a particular angular position whereby the first chamber 171 is in fluid connection with an inlet port 131 of the housing 110 for allowing a working fluid to enter the first chamber 171, while at the same time the second chamber 172 is in fluid connection with an output port 132 of the housing for allowing fluid to escape from the second chamber 172. In other words, in this angular position, the skirt opening 153 acts as an inlet valve which is open in FIG. 3(*a*), and the skirt opening 154 acts as an outlet valve which is open in FIG. 3(*b*).

Figure 4A:
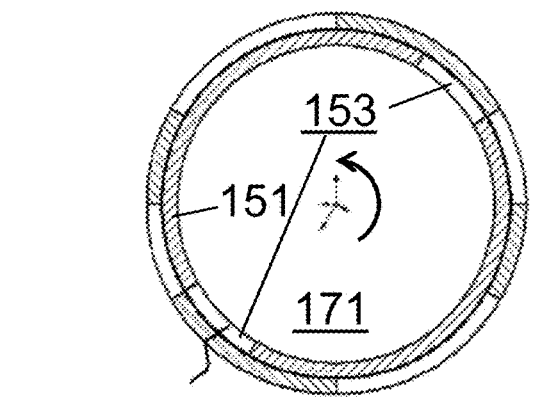
FIG. 4(a) and FIG. 4(b) show a cross sectional view of the device of FIG. 2 in the left and right chamber respectively, in a plane perpendicular to the longitudinal axis, at another moment in time.
Figure 4B:
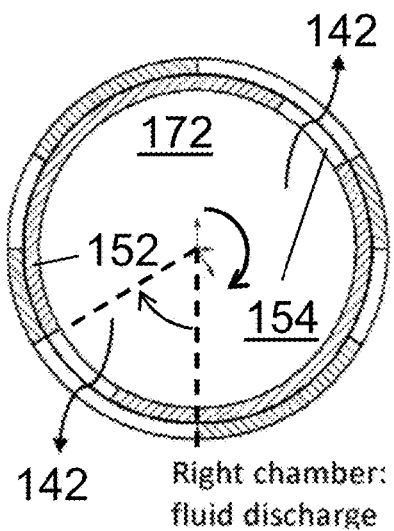
Figure 9A:
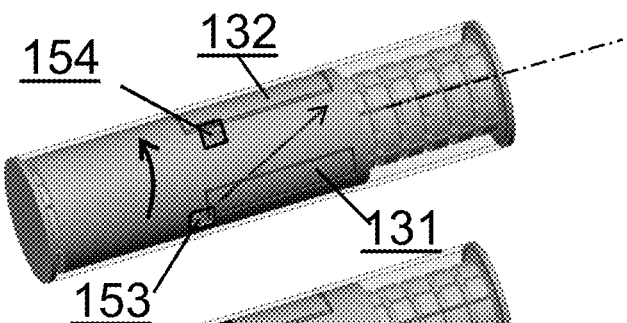
FIG. 9(a) to FIG. 9(g) shows seven different (axial and radial) positions of the piston in the housing. In these figures, the housing is shown partly transparent for illustrative purposes.
Figure 9B:
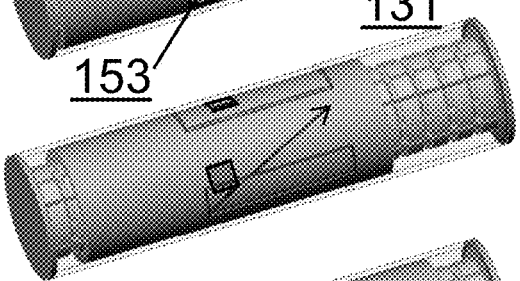
Figure 9C:
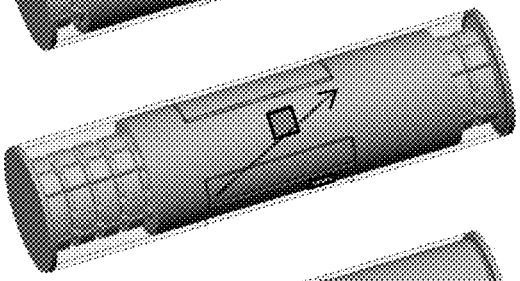
Figure 9D:
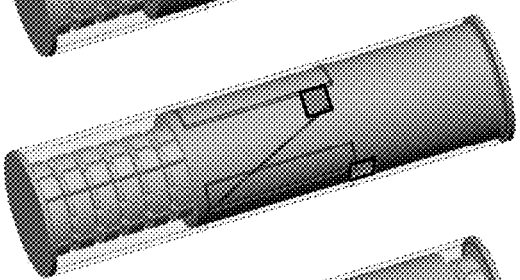
Figure 9E:
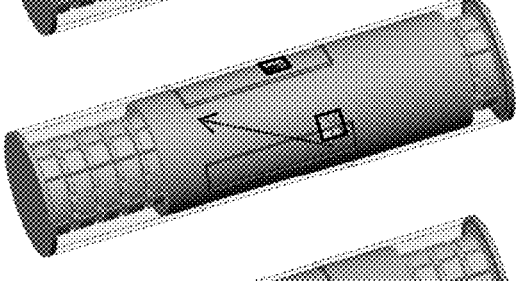
Figure 9F:
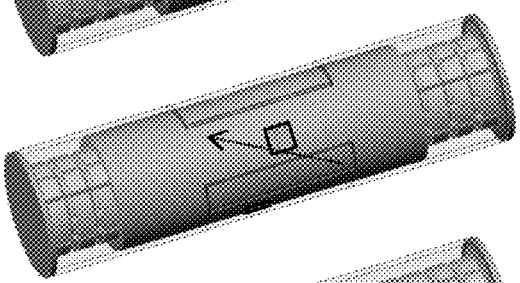
Figure 9G:
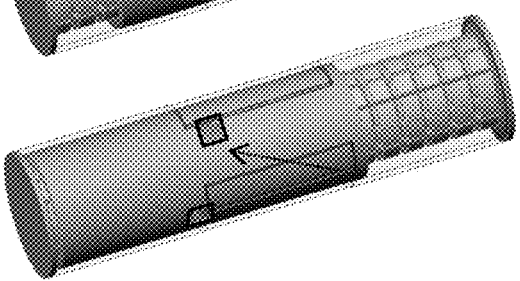
Figure 10A:
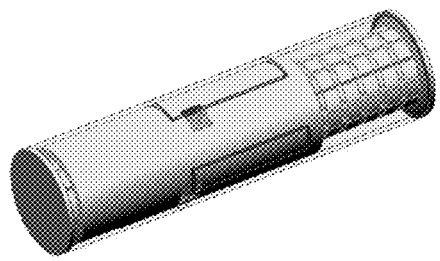
FIG. 10(a) to FIG. 10(f) shows six different positions of the piston in the housing. In these figures, the housing is shown partly transparent for illustrative purposes.
Figure 10B:
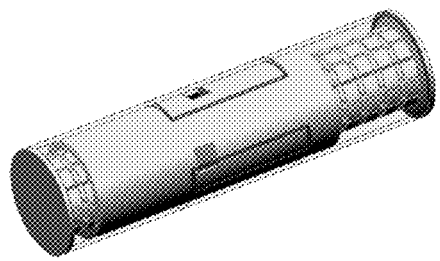
Figure 10C:
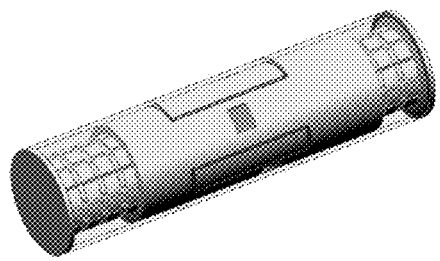
Figure 10D:
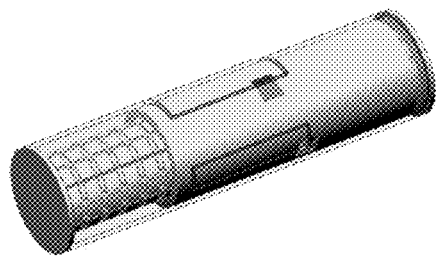
Figure 10E:
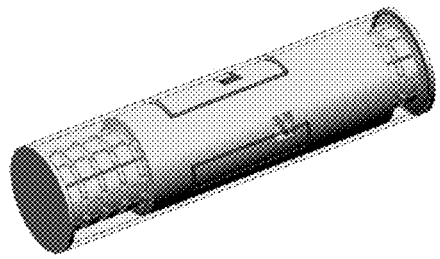
Figure 10F:
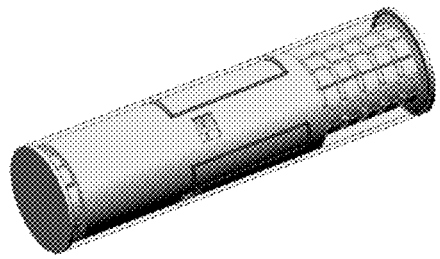
Figure 11A:
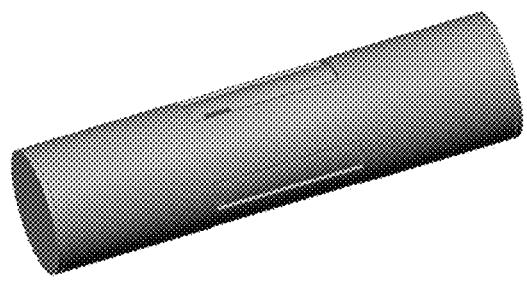
FIG. 11 (a) to FIG. 11(f) shows six different positions of the piston in the housing. In these figures, the housing is shown non-transparent for illustrative purposes.
Figure 11B:
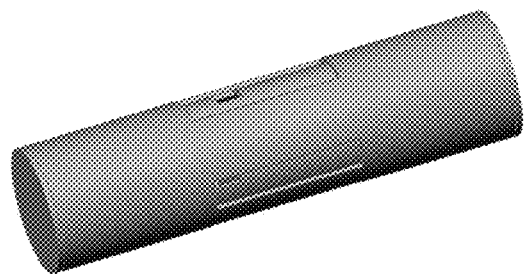
Figure 11C:
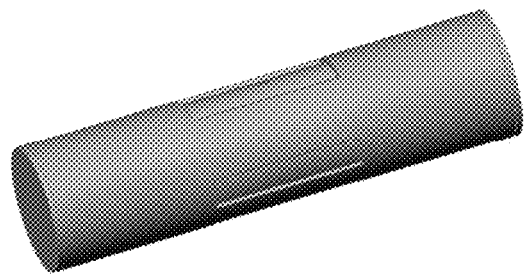
Figure 11D:
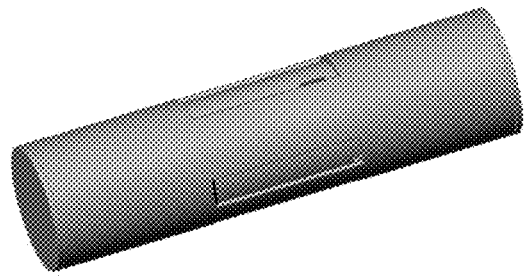
Figure 11E:
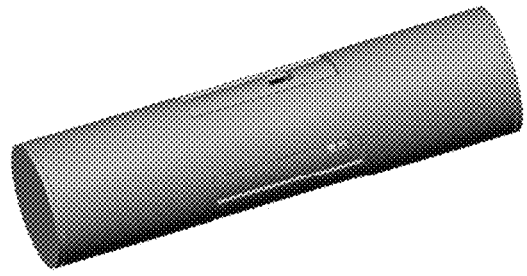
Figure 11F:
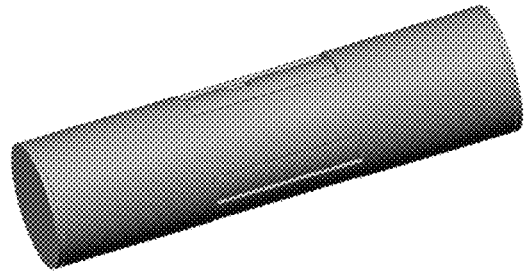

Some time later, as shown in FIG. 4, the piston has rotated over about 30°, and the openings 153 of the first skirt 151 are facing a closed wall section of the housing 110, hence the first chamber 171 is now "closed", while the openings 154 of the second chamber 172 are still in fluid connection with the second wall openings 132 of the housing (which are deliberately chosen larger than the first wall openings 131), hence the second chamber 172 is still "in fluid connection" with the outlet channel 142. In other words, FIG. 4 shows a position of the piston 150 whereby the "virtual inlet valve" of the first chamber 171 is closed, and the "virtual outlet valve" of the second chamber is still open.

Although not shown, it will be clear from FIG. 3 and FIG. 4 that, as the piston rotates around its longitudinal axis, the skirt opening of each chamber will sequentially:

(i) overlap with the inlet opening of the housing (chamber connected with inlet channel), for fluid intake;

(ii) face the housing wall (chamber closed), for expansion;

(iii) overlap with the outlet opening of the housing (chamber connected to outlet channel), for fluid discharge;

(iv) face the housing wall (chamber closed), to avoid the creation of a passage from the inlet channel to the outlet channel.

The size and shape and position of the skirt openings 153, 154 and of the openings 131, 132 of the housing is preferably chosen such that there is no "short circuit" possible between the inlet channel and the outlet channel via the first or second working chamber.

Preferably the size and shape and position of the skirt openings and of the openings of the housing is chosen such that the chamber is closed in state (iv) only during a minimum amount of time between the state (iii) of "fluid discharge" and (i) "fluid intake", as such the dead volume can be minimized.

FIG. 5 to FIG. 8 schematically illustrate an example of how the angular movement of the piston around its longitudinal axis can be synchronized with the axial movement of the piston 150 inside the cylindrical housing. It is noted that there is not a single unique path that needs to be followed exactly, but stated in simple terms (for the case of two chambers with two openings each): the above mentioned synchronization means that, after the piston has moved from the extreme left position to the extreme right position (or vice versa), it should have rotated over a predefined angular distance, e.g. equal to about 90° in case of two inlet ports (per skirt).

The lower part of each of FIG. 5 to FIG. 8 shows the axial position of the piston 150, relative to the housing 110, and a visual indication is given of whether the opening 153, 154 of the first and second skirt 151, 152 is in complete overlap (white)/partial overlap/no overlap (black) with one of the wall openings 131, 132 of the housing. (it is noted that the lower part is not correctly showing the angular position of the piston, for illustrative reasons).

The upper part of each of FIG. 5 to FIG. 8 shows the cylindrical wall of the housing 110 and of the skirts 151, 152 "unfolded" in a plane for better illustrating said full overlap/partial overlap/no overlap between the skirt openings 153, 154 and the wall openings 131, 132 of the housing 110. The rectangles 131, 132 illustrate the inlet opening (also referred to as "inlet port") and outlet opening (also referred to as "outlet port") of the housing respectively, the small squares illustrate the openings 153, 154 through the wall of the first and second skirt 151, 152.

The situation of FIG. 5 corresponds substantially to the situation shown in FIG. 3. As indicated, the piston is in a first axial position p1 (in the example at 25% or 0.25), indicated as the position of the first face 161, but other indications may also be used, such as for example the distance between the first face 161 and the transverse wall section 111); and an angular position φ1 (about 30°+k*180°) (considering the trailing edge "TE" of the skirt opening 153*a*, indicated in a thick black line for illustrative purposes). As shown in FIG. 5, the position of the opening 153 overlaps (completely) with the wall opening 131 (also referred to as "inlet port"), thus the first chamber 171 is in fluid connection with the inlet channel and the "inlet valve" is maximally open, hence fluid (e.g. with relatively high pressure) can enter the first chamber 171 via the openings 153. At the same time, the openings 154 of the second skirt 152 are in fluid connection with the second wall opening 132 (also referred to as "outlet port"), allowing the fluid in the second chamber (having a decreased pressure) to leave the second chamber 172 into the outlet channel (connected to the outlet port). As the pressure against the first face 161 of the central element 160, during operation, is larger than the pressure against the second face 162 of the central element 160, because the pressure in the first channel 141 (inlet channel) is larger than the pressure in the second channel 142 (outlet channel), a net axial force is exerted on the piston 150 directed to the right of FIG. 5, as indicated by symbol F and the arrow. As the piston moves slightly to the right, some more fluid can enter the first chamber 171 as long as the inlet valve is at least partly open, (referred to as "intake"), while fluid leaves the second chamber into the second channel 142 (referred to as "discharge"). As the piston moves to the right (axial movement) it also rotates around its axis (upwards in FIG. 5), so that the openings 153, 154 follow the trajectory indicated by the dotted line.

Some time later, the piston 150 will be in the situation depicted in FIG. 6. This situation corresponds to the situation shown in FIG. 4. As indicated, the piston 150 is in a second axial position p2 (in the example at 0.75 or 75%) and an angular position φ2 (60°+k*180°). As can be seen, the opening 153 of the first chamber 171 is "closed" (thus from this moment on, the fluid in the first chamber will expand until the opening 153*a* arrives at the outlet 132), while the opening 154 of the second chamber is still substantially open (thus the fluid in the second chamber 172 is still being discharged). During operating, as the pressure against the first face 161 of the central element 160 is larger than the pressure against the second face 162 of the central element, the force F exerted by the fluid on the piston 150 is directed to the right, causing the piston 150 to move further to the right, as indicated by the arrow.

Some time later, the piston 150 will be in the situation depicted in FIG. 7. As indicated, the piston 150 is in a third axial position p3 (in the example at 1.0) and in an angular position φ3 (90°+k*180°). As shown in FIG. 7, the opening 153 of the first chamber is still "closed" (but about to be opened), and the opening 154 of the second chamber is also closed (and about to be opened again). It is noted that, in practice, the size and/or shape of the skirt openings 154*b* (in the example the height "h") will be chosen smaller than the "distance" between the outlet port 132 and the inlet port 131 (in the example distance "d"), to avoid the above mentioned "short-circuit".

Some time later, the piston 150 will be in the situation depicted in FIG. 8. As indicated, the piston 150 is in a fourth axial position p4 (in the example about 0.9) and in an angular position φ4 (about 105°+k*180°), and is moving to the left. As can be seen from FIG. 8, the opening 153 of the first chamber now overlaps (about 50%) with the wall opening 132 (the "outlet port"), and the opening 154 of the second chamber (slightly) overlaps with the wall opening 131 (the "inlet port"). Fluid from the inlet channel 141 (high pressure) connected to the inlet port 131 will flow into the second chamber 172, and fluid will flow out of the first chamber 171 via the outlet port 132 towards the outlet channel 142 (low pressure). As the pressure exerted on the second face 162 is larger than the pressure on the first face 161, a net force F will push the piston 150 to the left.

Although not shown in subsequent drawings, it will be clear for the skilled reader that the piston 150 will now move to the left in a mirrored manner as the movement depicted in FIG. 5 to FIG. 7, thus the roles of the first and the second chamber have changed. In the example illustrated in FIG. 5 to FIG. 8, it was assumed that the piston 150 made a maximum axial movement, but in practice this will not always be the case, as will be described further. The purpose of FIG. 5 to FIG. 8 is primarily to illustrate the functioning of the (automatic) opening and closing of the (virtual) valves of the first and second skirt of the piston.

Looking back to the axial and angular movement illustrated in FIG. 5 to FIG. 8, it will be understood that, if the piston 150 is "suitably" rotated around its longitudinal axis (e.g. by control means, e.g. comprising magnets and coils), the piston 150 will—during operation—make a mechanical reciprocating movement caused by the pressure difference between the inlet port 131 (connected or connectable to a first channel 141) and the outlet port 132 (connected or connectable to a second channel 142). It will also be understood that the rotational movement needs to be "synchronized" somehow with the axial movement, in order to achieve proper timing of the opening and closing of the (virtual) valves in order to allow the piston 150 to make a reciprocating movement, e.g. with maximum power efficiency, or such that the output power delivered is maximized. In the example described above, where each chamber has two openings 153, 154, one "axial period" (back and forth) corresponds to an angular piston rotation of 180°. If each chamber 171, 172 would have only a single opening 153, 154, one "axial period" would correspond to an angular rotation of 360°. If each chamber would have 4 skirt openings, one period would correspond to 90°, etc.

FIG. 9 to FIG. 11 show several examples of this synchronized movement for the case where each piston chamber has two piston openings, by means of 3D-drawings.

FIG. 9(a) to FIG. 9(g) shows seven axial and corresponding angular positions of the piston in the housing. In these figures, the housing is shown partly transparent for illustrative purposes. The position of the housing is kept fixed. From FIG. 9(a) to FIG. 9(d) the piston 150 is moving to the right of FIG. 9. From FIG. 9(d) and FIG. 9(g) the piston 150 is moving to the left. In order to interpret the drawings, it can be assumed that the piston is moving at a constant angular velocity, although that is not absolutely necessary, as will be discussed further in relation to FIG. 13 to FIG. 15. In FIG. 9, the contour of the skirt openings 153, 154 are indicated in black line to make their positions clearly visible. Also added is the trajectory followed by the openings, to allow a better understanding by the reader. It is noted that the trajectory is shown as a straight line in the drawings, for illustrative purposes, but in practice this line may be curved.

FIG. 10(a) to FIG. 10(f) shows another series of six different positions of the piston in the housing. In these figures, the housing is also partly transparent, but the gray-scale is set more bright, for illustrative purposes.

FIG. 11(a) to FIG. 11(f) shows another series of six positions of the piston in the housing. In these figures, the housing is shown non-transparent for illustrative purposes. This drawing gives a more realistic view of what the housing looks like from the outside (assuming the inlet channel and outlet channel are not connected).

Figure 13:
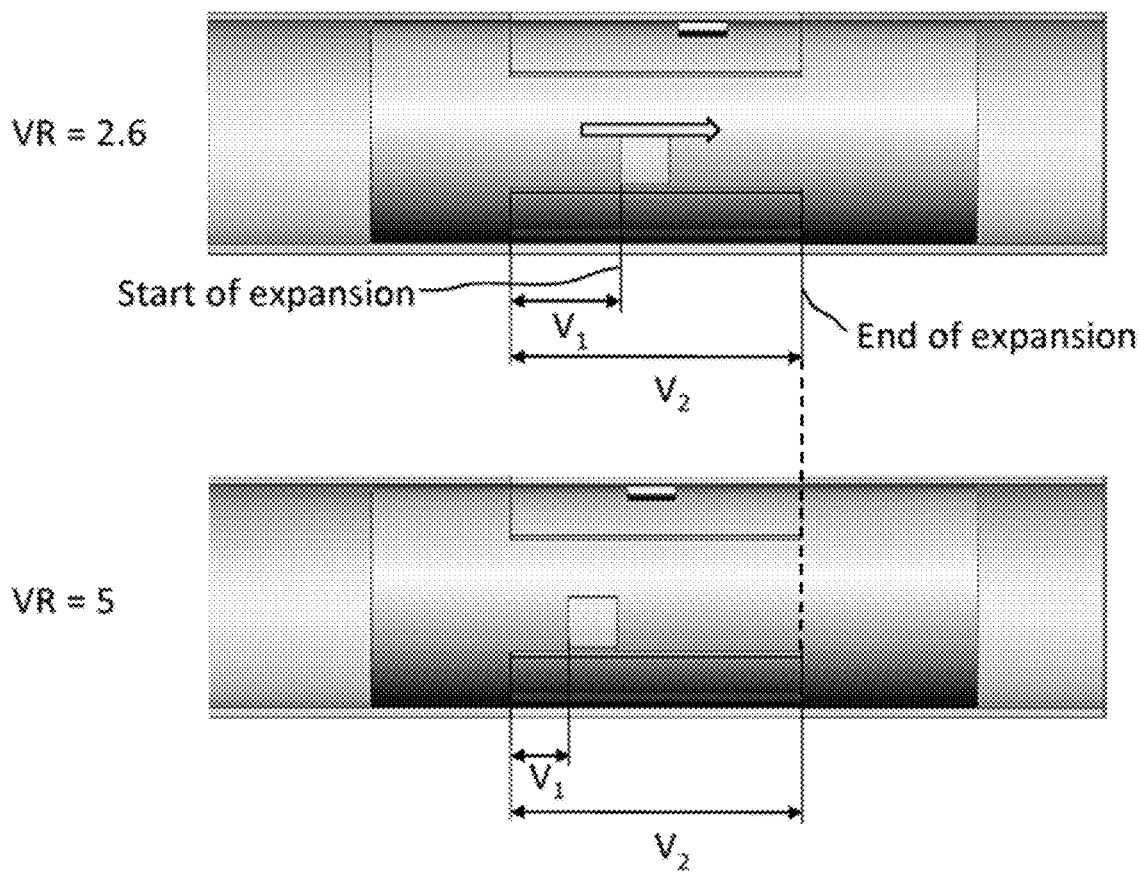
FIG. 13 illustrate how "volumetric ratio" is defined.

FIG. 13 will be used to illustrate how the free piston device 100 described above can also be used as a device with a configurable volumetric ratio. For an expander, the volumetric ratio "VR" is defined as the ratio between the volume of the chamber (V2 or Vmax) at the end of the expansion period (i.e. at the moment of opening the outlet, see FIG. 7) over the volume of the chamber (V1 or Vmin) at the start of the expansion period (i.e. at the moment of closing the inlet, see FIG. 6). FIG. 13 shows a situation whereby the volume V2 is constant and whereby the volume V1 is "controlled" by the moment of rotating the piston so as to close the inlet, but other control schemes may also be used.

FIG. 12 will be used to illustrate how control over the angular movement in relation to the axial movement of the free piston device 100 can be used to realize a device with a configurable volumetric ratio. The main advantage of using a configurable volumetric ratio is that the power efficiency can be optimized for different or varying conditions, such as a non-constant temperature and/or pressure of the inlet channel 141 and/or outlet channel 142. This is particularly interesting for heat recovery applications subject to dynamic load conditions, such as for example heat recuperation of exhaust gases from vehicles providing variable heat input to the ORC system in which the free piston expander can be used.

The sinusoidal curve of FIG. 12(a) illustrates a case (considered as reference movement) whereby the axial movement is assumed to be a substantially sinusoidal function of time, and whereby the angular velocity is assumed to be constant (in steady state operation). In the example, the period after which the axial movement repeats is 180°. Three zones are defined:

a first zone (φ in the range of 0° to 60°), referred to as "intake zone", where fluid is entering the (first or second) chamber. (the intake starts when the leading edge "LE" of the skirt opening 153 comes in contact with the inlet port 131, which occurs at Φ=0°, and finishes when the trailing edge "TE" of the skirt opening 153 leaves the opening 131 in the housing, which is at Φ=60° (see FIG. 6), so the intake zone is from 0° to 60°);

a second zone (φ in the range of 60° to 90°) referred to as "expansion zone", where the first chamber 171 is closed, and fluid in the first chamber is allowed to expand. The expansion finishes when the leading edge "LE" of the skirt opening 153 comes in fluid contact with the outlet port 132 (at Φ=90°). In the example of FIG. 7, at that same moment, the piston 150 reaches its extreme right position (relative displacement L=1), although a smaller displacement may also be used. The "expansion range" is illustrated by FIG. 6 to FIG. 7. It is noted that relative position=current position/ (extreme right position−extreme left position);

a third zone (φ in the range of 90° to 180°) referred to as "discharge zone", where the first chamber 171 is connected to the outlet channel 142 via the outlet port 132 of the housing. The discharge process starts when the leading edge "LE" of the skirt opening 153 reaches the outlet port (leading edge at 120°; trailing edge at Φ=90°) and continues until the trailing edge "TE" leaves the outlet port 132 (at Φ=180°). In the example shown, at the same time, the piston 150 reaches its extreme left position (relative displacement L=0). This is the end of one cycle. During the discharge, the pressure in the first chamber 171 is substantially equal to the pressure in the outlet channel 142, because the skirt opening 153 remains in fluid connection with the outlet port 132 while the piston 150 moves back. There is only minimal pressure difference because the fluid can pass directly via the through-opening or hole made in the wall of the skirt, and does not have to escape via a narrow or shallow groove.

In an embodiment, the pressure in the first chamber 171 reaches the pressure of the outlet channel 142 at the end of the expansion, starting from the pressure at the inlet channel 141, by "stopping" the intake at the right moment (read: by closing the inlet valve 153 at the right moment), which moment can e.g. be calculated based on the pressure and temperature of the inlet and the outlet channel 141, 142, and which "stopping" can be achieved by controlling the angular movement of the piston. To this end, the free piston device may further comprise a first pressure sensor and a first temperature sensor arranged in the inlet channel, and a second pressure sensor and a second temperature sensor arranged in the outlet channel, and the controller is connected to these pressure sensors and temperature sensors, and is adapted for reading corresponding signals from them, and is adapted with an algorithm that takes these values into account when controlling the angular and/or axial movement of the piston.

Since there are two openings in each skirt, the piston 150 of FIG. 2 (having two skirt openings) moves twice back and forth during one complete revolution of 360°. It is possible in principle to provide more than two openings in each skirt, e.g. four openings, and providing correspondingly four inlet openings and four outlet openings in the housing, which would reduce the angular distance even further, and would reduce friction losses, but would make the piston device more complex, and thus more difficult to produce.

For completeness, it is mentioned that in case of a piston compressor device, the cycle reverses, and the diagram has to be followed from top to bottom (360°->0°), hence the zones are altered: the first zone (from 180° to 90°) would be an "intake zone", the second zone (from 90° to) 60° would be a "compression zone", and the third zone (from 60° to 0°) would be a "discharge zone". The control over the VR remains largely the same or similar.

In the example shown in FIG. 12, and for the geometry of the housing selected for the drawings of FIG. 2 to FIG. 20, in particular the number and size and shape and relative position of the wall openings 131, 132, and the geometry of the piston 150, in particular the number and size and shape and relative position of the skirt openings 153, 154, this regime would result in a volumetric ratio of 1.333, as shown in FIG. 12(b). It is noted that a volumetric ratio of 1.33 may not be particularly interesting for practical applications, but is used to illustrate the working principles.

In some embodiments of the present invention, the volumetric ratio VR achieved by the device 100 during operation, can be modified to any desired value in a predefined range, by a controlled angular acceleration and deceleration of the piston 150, in order to influence the timing of the opening and closing of the virtual valves, or in other words, by influencing the angular velocity at which the skirt openings 153, 154 pass the inlet port 131 and/or the outlet port 132, and/or the closed area between them. In other words, instead of rotating the piston 150 at a constant angular speed around its longitudinal axis, but instead by deliberately slowing down, and/or speeding up the rotation, depending on the angular position of the piston, the timing at which the skirt openings 153, 154 are in fluid connection with the inlet and outlet port 131, 132, can be moved (slightly) forward and/or backwards in time.

It is noted that not only the angular speed can be modified in order to achieve an optimal timing. The axial speed of the piston, previously assumed sinusoidal, may also be adjusted. For example, for very high expansion ratios, the required angular acceleration may become difficult or even problematic. In this case, the axial speed of the piston in vicinity of the extreme positions (L=0 & L=1) can be influenced, e.g. reduced. This is an important advantage of a free-piston machine in comparison with a classic machine with a crankshaft mechanism, where the axial displacement is fixed.

In general, reducing the axial speed relative to the angular speed, (or increasing the angular speed relative to the axial speed) in vicinity of the extreme piston position leads to higher volumetric ratios VR.

FIG. 12 (c) shows the effect of a simulated example of such a modified angular speed. Actually not the speed, but the angular position (which is the time integral of the speed) is shown, and the corresponding angular zones are also indicated. In the example shown in FIG. 12(c), the piston 150 is accelerated and decelerated such that the relative portion of the first time zone ("intake") is reduced by letting the skirt opening move faster over the inlet port 131. In this way the virtual valves can be opened and/or closed sooner or later (in time, but also relative to the axial position), hence the volumetric ratio can be influenced. In the example of FIG. 12(d), in this manner a volumetric ratio of 4.00 may be obtained with the same device 100.

Figure 12E:
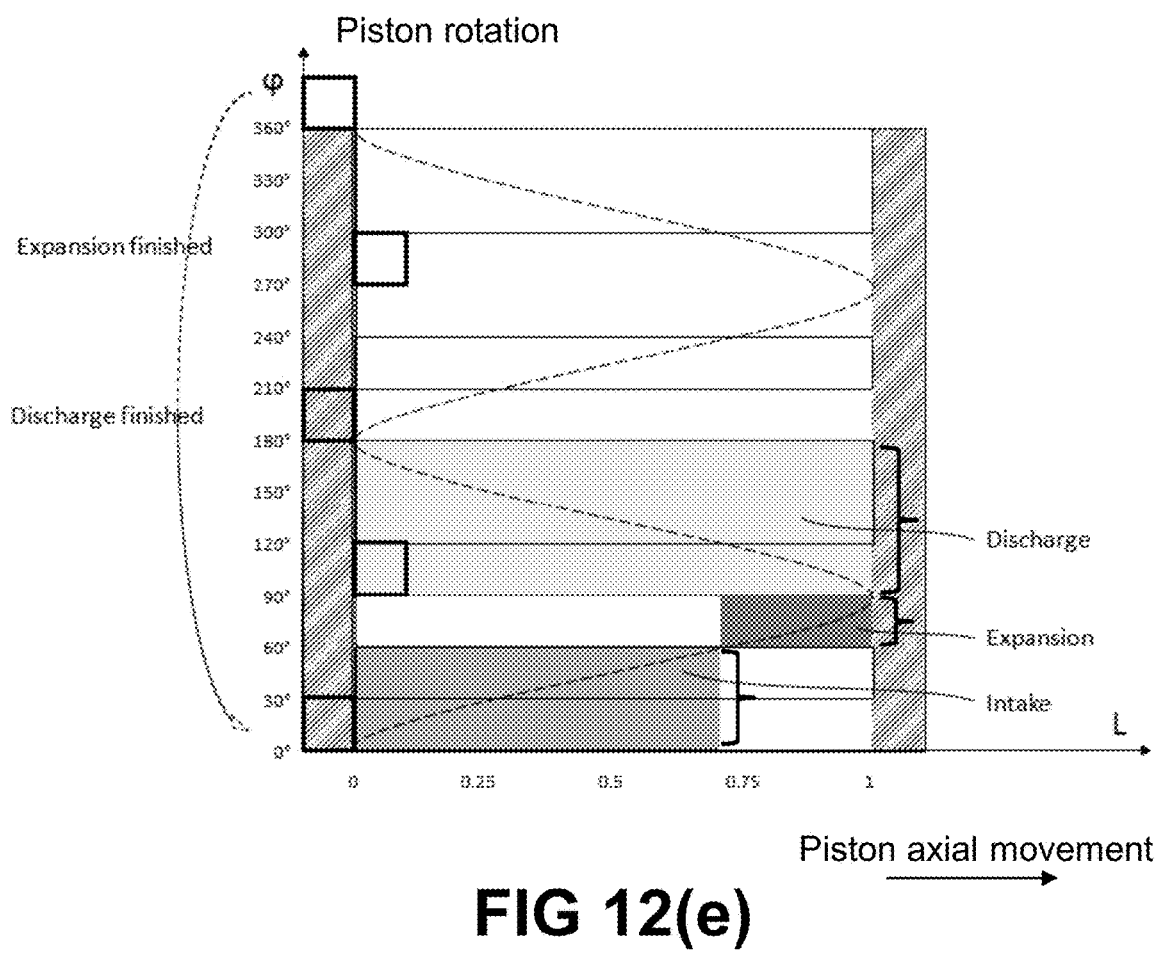

FIG. 12(e) shows the "intake zone", "expansion zone" and "discharge zone" as a function of the axial and angular position range for the sinusoidal movement of FIG. 12(a).

Referring back to FIG. 13, it will now be better understood how a variable volumetric ratio VR can be achieved. The first (upper) example of FIG. 13 illustrates a relatively late intake cut-off at the piston position of L=0.38 resulting in VR=1/L=2.6. The second (lower) example of FIG. 13 illustrates a faster intake cut-off at the piston position of L=0.2 resulting in VR=1/L=5.

FIG. 14(a) to FIG. 14(l) show "snapshots" of a combined axial and angular movement of the piston, when movement is controlled for obtaining a specific volumetric ratio VR, e.g. calculated on the basis of obtaining maximum efficiency of an ORC cycle for a given temperature and pressure at the inlet and outlet of the expander. For the controller of the expander device this VR value is considered to be "given".

Figure 14A:
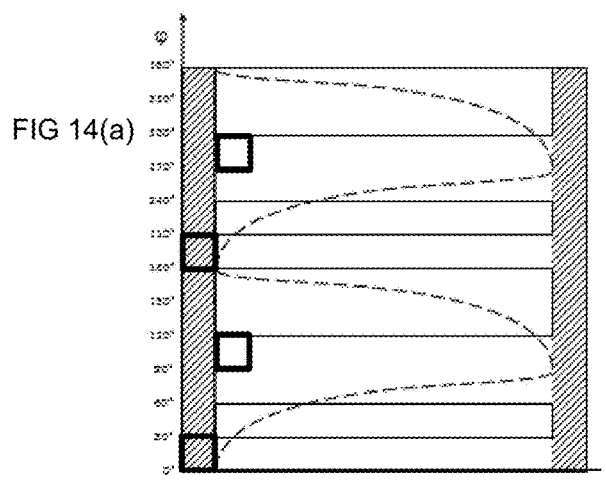
FIG. 14(a) to FIG. 14(l) show twelve "snapshots" of an example of a combined axial and angular movement of the piston, whereby movement is controlled for obtaining a specific volumetric ratio.
Figure 14B:
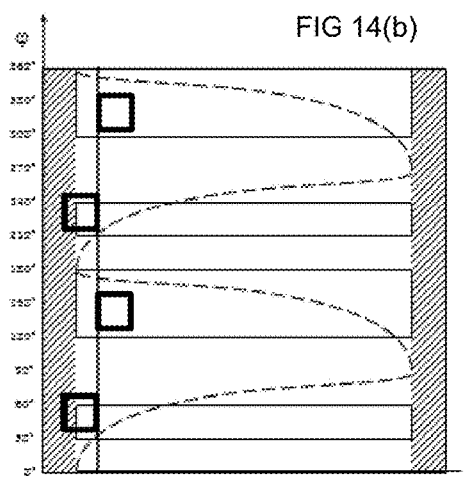
Figure 14C:
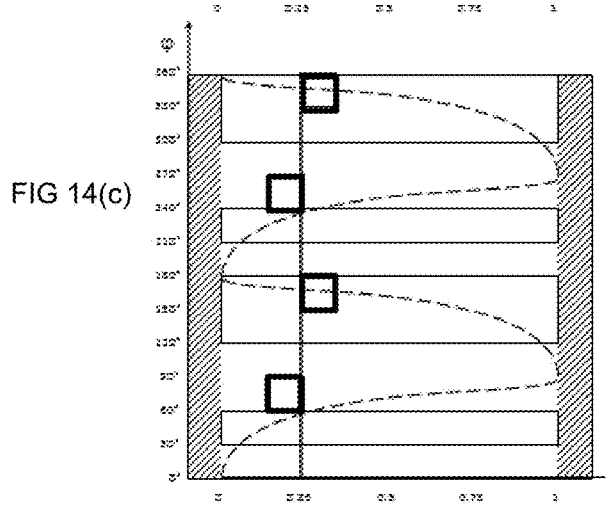
Figure 14D:
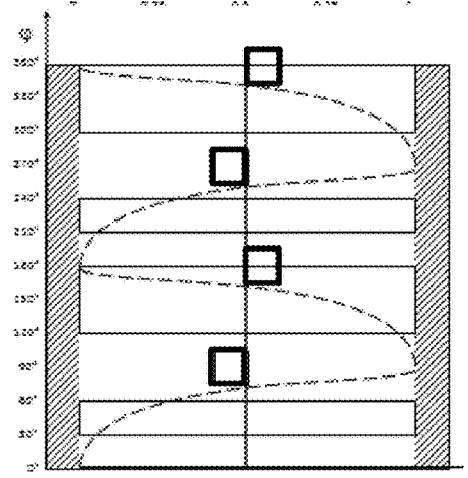
Figure 14E:
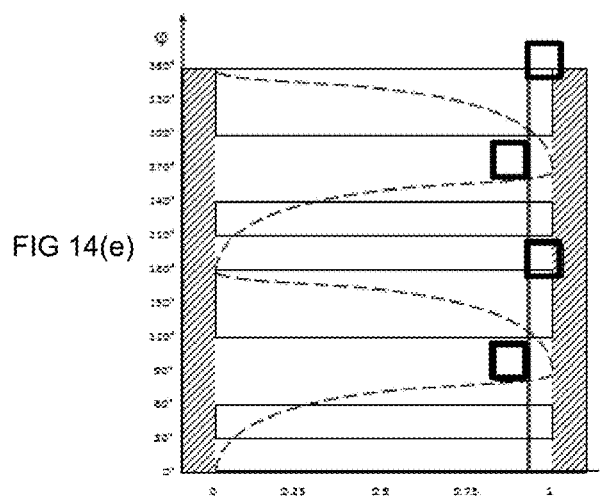
Figure 14F:
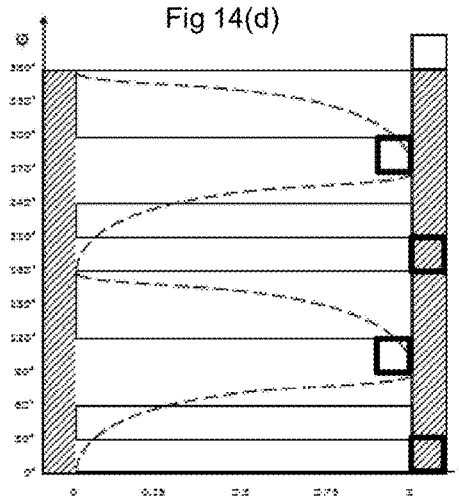
Figure 14G:
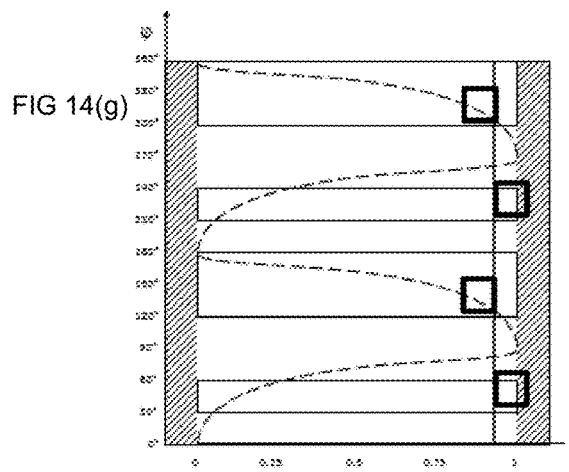

The snapshots in FIG. 14(a) to FIG. 14(l) are similar to those of FIG. 5 to FIG. 8, and are intended mainly to show the relative movement of the skirt openings versus the housing openings (inlet port and outlet port). In FIG. 14(a) the intake in first chamber 151 starts (after expansion), and the discharge of second chamber 152 starts (e.g. after negligible compression). In FIG. 14(b) the intake in first chamber 151 is ongoing, and the discharge of second chamber 152 is ongoing. In FIG. 14(c) the intake of first chamber has finished and expansion of the fluid in first chamber starts, while the discharge of the second chamber continues. Assuming that the intake finished at L=0.25, and that the piston is allowed to move to its right extreme position, it means VR=4. In FIG. 14(e) expansion of the first chamber continues and the discharge of the second chamber continues. In FIG. 14(f) expansion of the first chamber has finished, and the discharge of the second chamber has finished. In FIG. 14(g) discharge of the first chamber is ongoing, and the intake of the second chamber is ongoing.

Figure 14H:
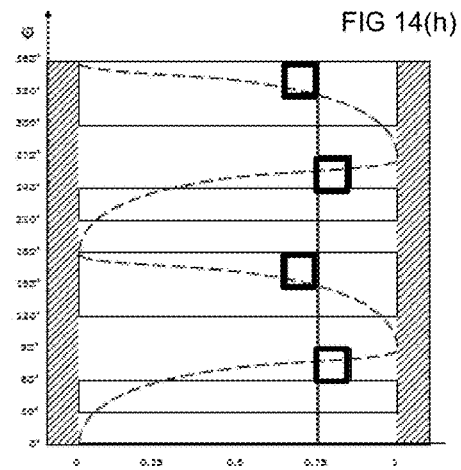
Figure 14I:
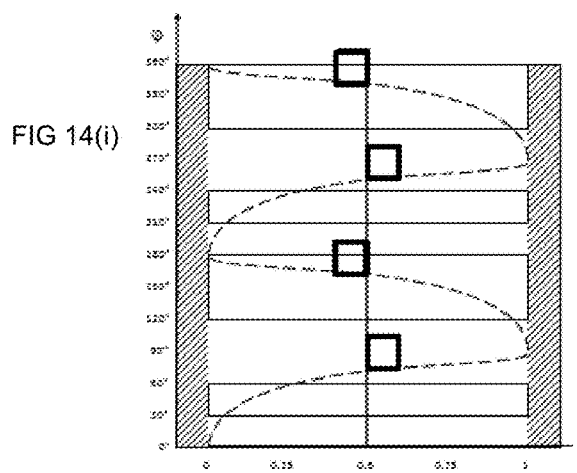
Figure 14J:
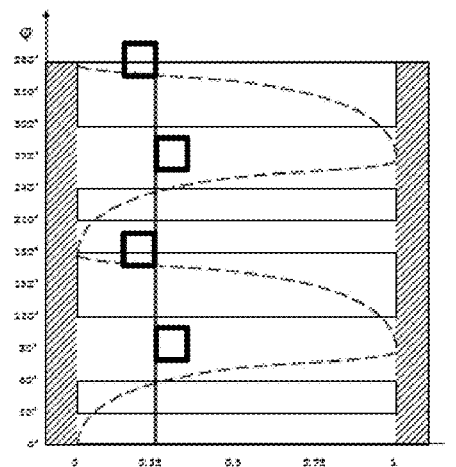
Figure 14K:
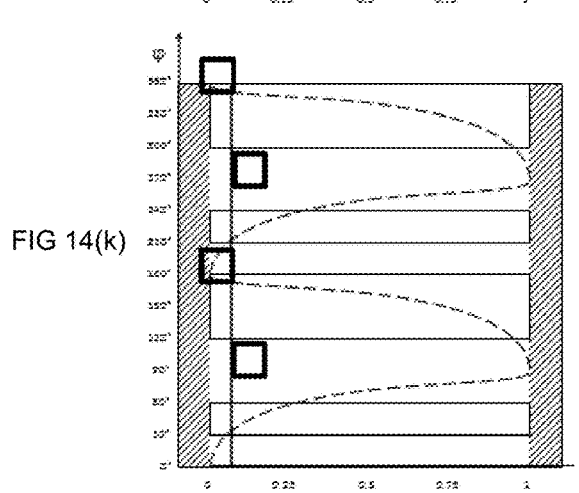
Figure 14L:
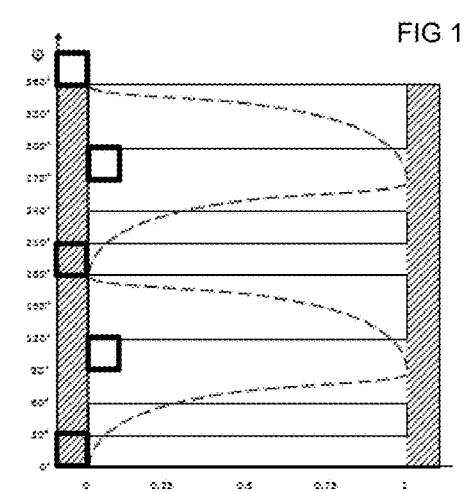

In FIG. 14(h) the discharge of the first chamber continues, and the intake of the second chamber has finished, and the expansion of the second chamber starts. In FIG. 14(i to k) the discharge of the first chamber continues, and the expansion of the second chamber continues. In FIG. 14(l) the discharge of the first chamber has finished, and the expansion of the second chamber has finished.

Figure 15:
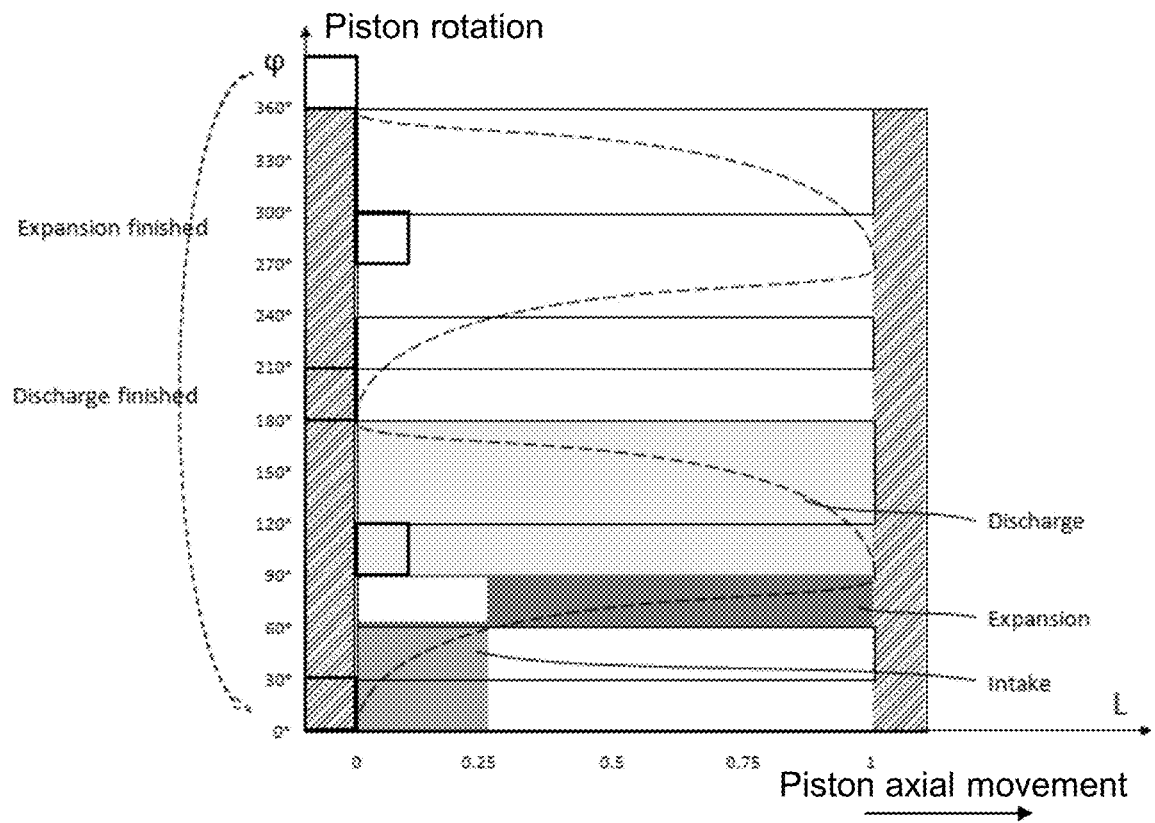
FIG. 15 shows the "intake zone", "expansion zone" and "discharge zone" as a function of the axial and angular position for the controlled movement of FIG. 14.

FIG. 15 shows the "intake zone", "expansion zone" and "discharge zone" as a function of the axial and angular position range for the controlled movement of FIG. 14. When comparing FIG. 15 with FIG. 12(e) it is clear that the axial distance in the "intake zone" is much smaller (and the axial distance in the "expansion zone" is much larger) for the controlled movement of FIG. 15 than it was for the sinusoidal movement of FIG. 12.

The purpose of an expander is to produce, e.g. induce electrical energy from the thermohydraulic energy available in the high pressure, high temperature fluids. By allowing the working fluid to expand (as described above) causing the piston to move (=mechanical energy), and by transforming the mechanical energy of the moving piston into electrical energy in a controlled way, the axial speed of the piston can be controlled, e.g. can be decreased to about zero at the end of the expansion zone.

The purpose of a compressor is to induce thermohydraulic energy from electrical energy by realizing a fluid of higher pressure and/or temperature. To this end, not only the angular movement, but also the axial movement of the piston needs to be controlled.

In preferred embodiments of the present invention, the angular movement control and axial movement control may be accomplished by means of a rotor assembly 181 comprising a plurality of permanent magnets 183 fixedly mounted to the piston 150 (e.g. to an inner wall thereof), and a stator assembly 182 comprising a plurality of windings 184 fixedly mounted to the housing 110. The windings 184 (or coils) and permanent magnets 183 may be arranged in any suitable manner, as is well known in the field of inter alia linear motors or generators. A layer or tubular element of non-ferromagnetic material may be applied over the magnets in order to mechanically protect them, and/or in order to provide mating diameters in case it is desired to make a bouncing chamber (this is further discussed in relation to FIG. 24). The induced axial movement (in case of an expander) of the rotor will cause an induced voltage at the stator coils and electrical energy can be tapped from the expander. Alternatively, in case of a compressor, applying suitable voltages and currents to the stator allows to axially move the piston and add thermodynamic energy to the fluid.

From the above, it should be clear that the angular movement of the piston 150 can be synchronized to the axial movement in a specific manner, for example according to some variable relation between angle "y" and position "p", if a free piston device with a given volumetric ratio is to be provided. And that the angular and axial movement need to be synchronized in a variable manner if a variable volumetric device is to be realized.

In order to control the angular movement, the rotor assembly and stator assembly for one of the skirts may be arranged in a manner known from BLDC motors. To this end the specific assembly of the magnets 183 and windings need to be different from those for a linear generator.

By applying suitable voltages and/or currents to the plurality of stator windings 184, the angular and axial position of the piston 150 can be controlled. It is recognized that angular acceleration and deceleration costs some energy, but it is expected that the required amount of energy can be kept under control, inter alia by choosing suitable dimensions and materials in order to keep the moment of inertia of the piston 150 sufficiently low. Circuits for providing suitable voltages or currents to said windings 184 are well known in the art, and may for example comprise a programmable micro-controller or programmable hardware devices (e.g. FPGA's) or customer specific ICs (ASICs), or digital signal processors (DSP), etc., in combination with a power stage, for example comprising a plurality of so called "half-bridges". Each half bridge may contain for example two transistors and two fly-back diodes. The transistors may be driven by suitable PWM signals generated by the micro-controller or DSP or hardware component. Such circuits are well known in the art of BLDC motors, and therefore need not be described in detail here.

The control loop for controlling the currents through the windings 184 may be a closed loop system. The closed-loop system may use an angular sensor and/or an axial sensor, for example an angular position sensor and/or an axial position sensor, but other sensors (e.g. accelerator or tachometer) from which the axial position and/or the angular position can be derived, directly or indirectly, may also be used. A first respectively second pressure sensor mounted in the first/second chamber, e.g. on the transversal wall of the first/second rotor, may also be used. A first respectively second temperature sensor mounted in the first/second chamber, e.g. on the transversal wall of the first/second rotor, may also be used. Such sensors are known in the art, and therefore need not be described in detail herein.

By applying suitable voltages and/or currents to the plurality of stator windings 184, the net amount of electrical energy provided by the expander can be optimized through optimization of the thermodynamic cycle e.g. by further controlling the counter force applied to the piston movement, or in any other way.

In particular embodiments it is contemplated that at least one of the axial sensor and angular sensor are omitted, and that the axial position and/or angular position are determined in a sensor-less manner, as is also well known from the field of BLDC motors, for example based on a back EMF voltage of an undriven winding.

In order to control the axial movement (e.g. in case of a compressor, or for start-up of an expander), or in order to convert the mechanical energy associated with the axial piston movement directly into electrical energy, the rotor assembly and stator assembly for one of the skirts may be arranged in a manner known from linear motors and/or from linear generators. Although the physical locations of the magnets and the windings may be the same as those shown in FIG. 16, the magnetization of the magnets, and of the windings may be different. More specifically, the magnets may be arranged in annular rings, whereby all the magnets on one ring have the same magnetization (e.g. central magnetic field pointing inwards), and all the magnets on the next ring would have opposite magnetization (e.g. central magnetic field pointing outwards). Using the colors of FIG. 16, it would mean that one ring would be black, and the adjacent ring would be white). Thus, by providing a device 100 with a first stator and rotor assembly organized in a manner similar to a BLDC motor, and a second stator and rotor assembly organized as a linear motor or generator, the axial piston movement can be converted into electrical energy (or vice versa for a compressor) while at the same time, the angular movement of the piston 150 can be driven in any desired manner, in particular to obtain a set volumetric ratio VR.

In particular embodiments it is contemplated that the rotor and stator assembly as well as the circuits required to drive or feed these with voltage and currents can the exact same for both the angular and axial movement. This may be accomplished by using a matrix stator, as depicted in FIG. 17 to FIG. 20, by arranging magnets in a checkerboard pattern.

Figure 16:
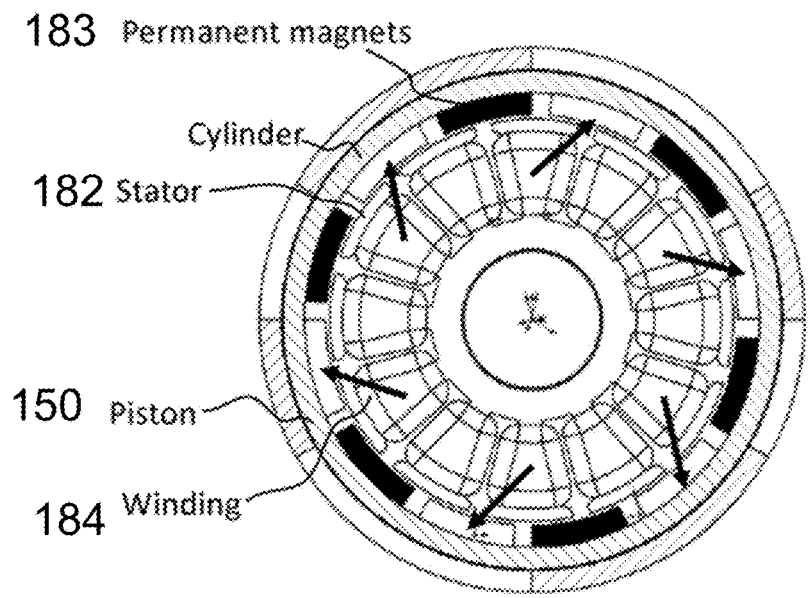
FIG. 16 shows in cross sectional view an example of a stator and rotor assembly as can be used in embodiments of a free piston device according to the present invention.

FIG. 17 (top) shows the example of FIG. 16 in side-view, after cutaway of half of the device 100 in a plane through the longitudinal axis L. FIG. 17 (top) shows an example of a stator assembly 182 having a plurality of windings, and a rotor assembly 181 having a plurality of permanent magnets 183. The permanent magnets are arranged on the inside wall of the first and second skirt 151, 152 of the piston 150. In order to avoid direct contact between the stator windings and the magnet surfaces, a protective layer, e.g. a ceramic layer may be applied over the stator windings (shown in FIG. 2). FIG. 17 (bottom) shows the example of FIG. 17 (top) with a semi-transparent housing, but a non-transparent piston (for illustrative purposes).

FIG. 18 to FIG. 20 are additional 3D-views of the half-cutaway device of FIG. 17 (top), after rotation of the piston part around its longitudinal axis, to better illustrate the angular movement of the piston 150 around its longitudinal axis, and how this may be achieved by the stator and rotor assembly as described above.

In the embodiments shown so far, the inlet opening and the outlet opening of the housing have a single rectangular shape, but the present invention is not limited thereto, and other shapes can also be used. It is also possible to provide multiple inlet ports instead of only one, as will be illustrated further.

Figure 21:
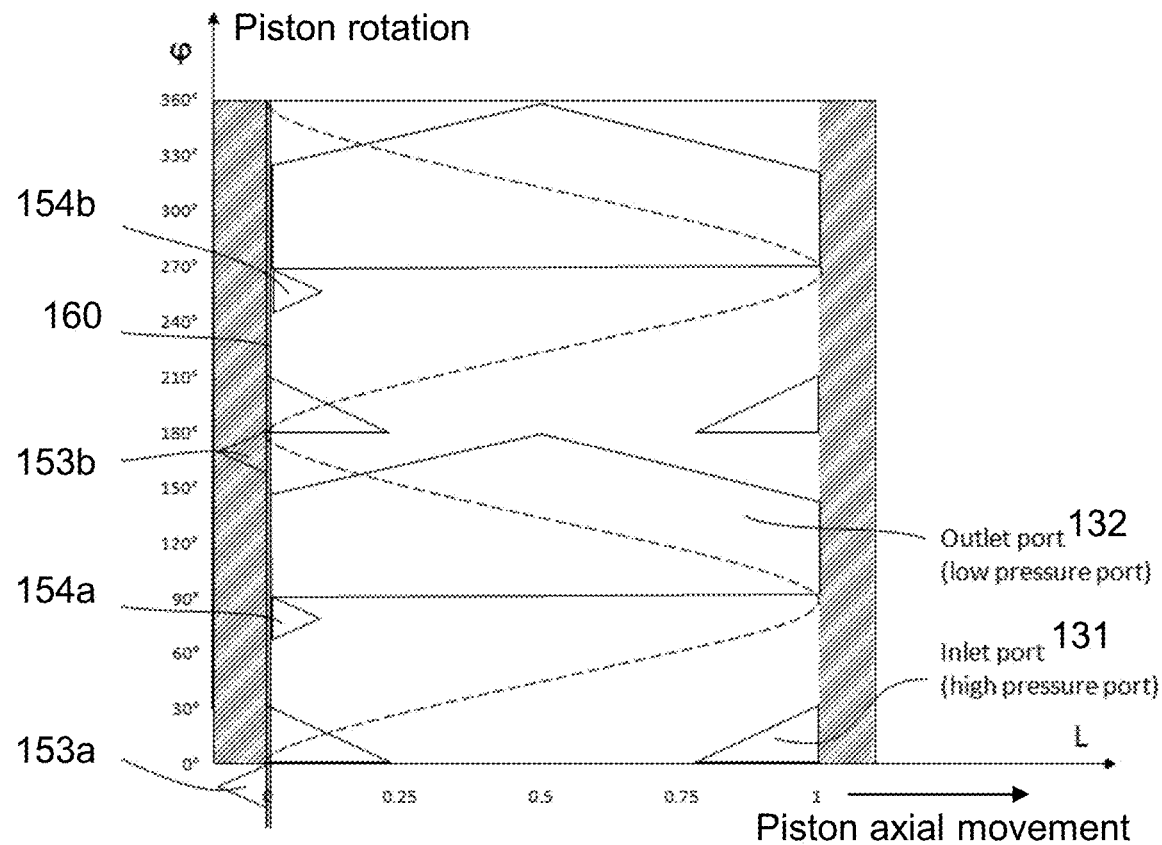
FIG. 21 to FIG. 23 show an example of another device according to the present invention, having a different geometry of the skirt openings and housing openings.
Figure 22:
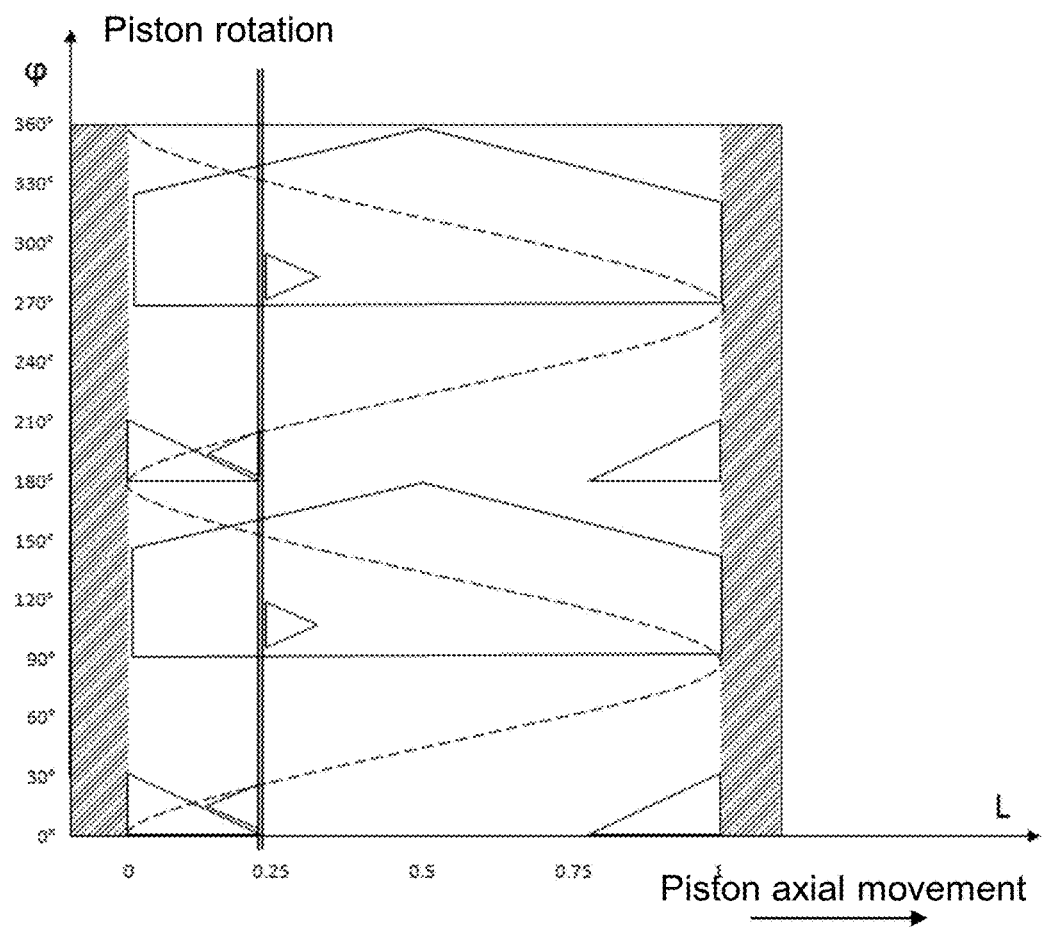
Figure 23:
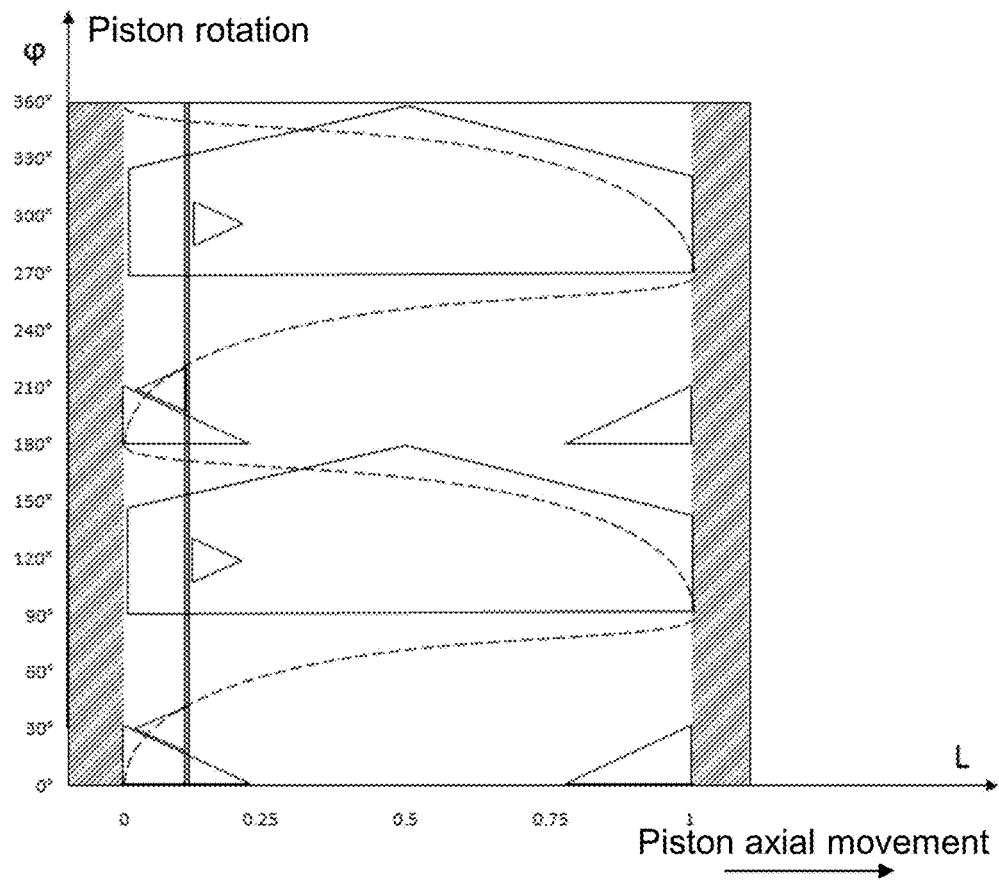

FIG. 21 to FIG. 23 show an example of another device according to the present invention, having a different geometry (size, shape, position) of the skirt openings 153, 154 and of the housing openings 131, 132. In particular, the device has two separate inlet openings, one for each skirt, and has only one (common) outlet opening. The two inlet openings are located at or near outer ends of the housing, the single, common outlet opening is located near the center of the housing. Since VR>=4.0 in most envisioned cases, the inlet port 131 can be optimized for VR-values larger than 4.0.

FIG. 21 and FIG. 22 show an example of the trajectory of the skirt opening relative to the openings of the housing (inlet and outlet port) for a substantially sinusoidal movement.

FIG. 23 shows the same device as in FIG. 21 and FIG. 22, optimized for VR>=4, but whereby the piston movement is actively controlled such that the intake finished at L=0.125, resulting in VR=8.

Figure 24:
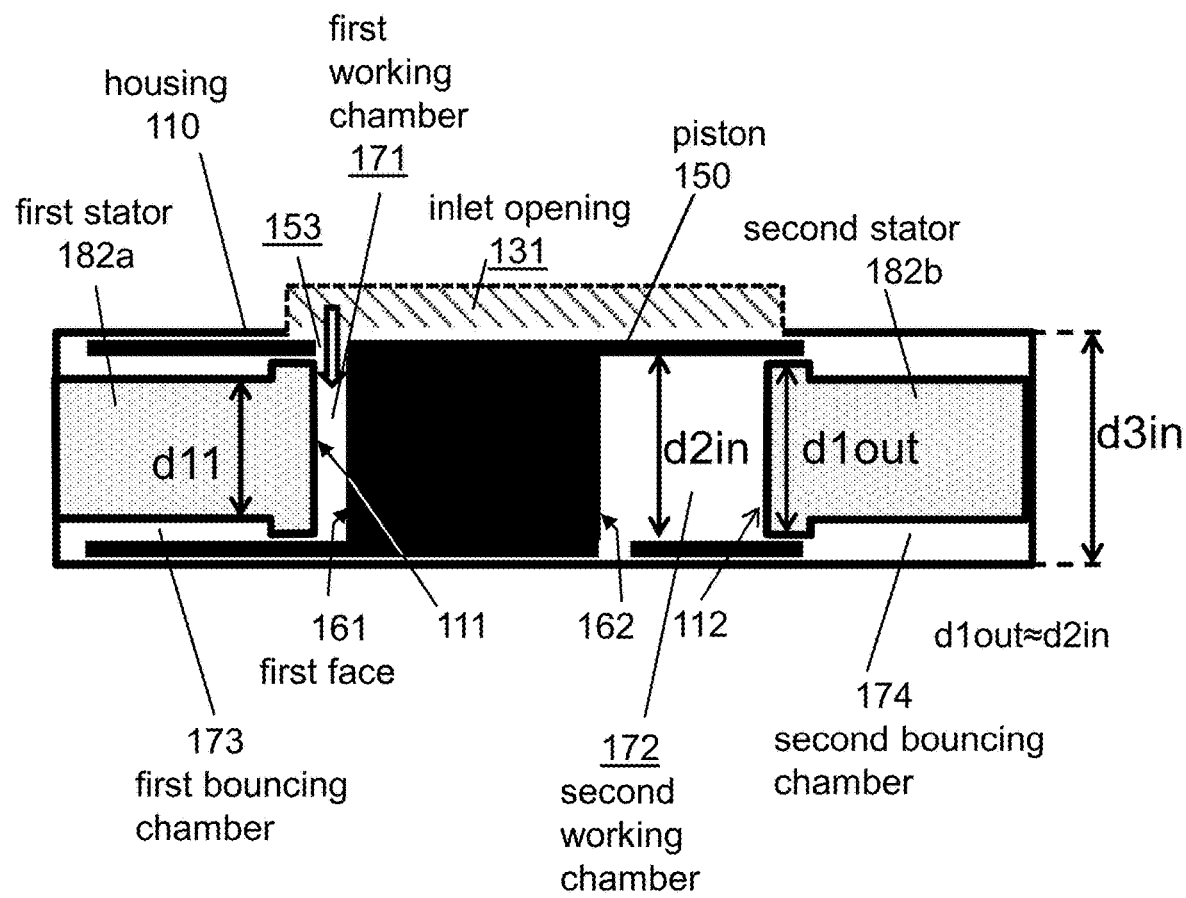
FIG. 24 shows an example of an expander according to the present invention having two working chambers and two bouncing chambers.

FIG. 24 shows an example of an expander according to the present invention having a first working chamber 171 and a first bouncing chamber 173 substantially fluidly separated from each other, but not 100% hermetically separated, and having a second working chamber 172 and a second bouncing chamber 174 substantially fluidly separated from each other, but not 100% hermetically separated.

As described above, the outer diameter of the cylindrical wall of the piston 150 is matched with the inner diameter "d3in" of the cylindrical housing 110 with a predefined, e.g. minimal clearance.

In the embodiment shown in FIG. 24, the stator coils may optionally be embedded in a cylindrical shape having an outer diameter "d1out" which is matched to the inner diameter "d2in" of each skirt with a predefined, e.g. minimal clearance, e.g. in the order of less than 1.5 mm, e.g. less than 1.0 mm, e.g. less than 0.5 mm, e.g. less than 0.25 mm), but the invention is not limited thereto, and the cylindrical shape can also be omitted, in which case there is preferably a minimum distance between said coils and magnets mounted against an inner wall of the skirt, e.g. in the order of less than 1.0 mm.

As can be seen, it is not required that the stator shape has a constant diameter over its entire length, and the diameter "d11" of the stator (near the transverse section of the housing) can be the same or can be smaller than the diameter "d1out".

Since the opening of the skirt is a local opening through the skirt wall (i.e. is not a slit or a groove extends to the circular end of the skirt), in this way two "bouncing chambers" can be created.

The working chamber 171 is in this example defined by the transverse wall of the stator 111, and the inner wall of the skirt, and a first face 161 of the central element. The first bouncing chamber 173 and the first working chamber 171 are not fluidly connected (apart from unavoidable leakage due to a minimal clearance distance to reduce friction). Likewise the second bouncing chamber 174 and the second working chamber 172 are not fluidly connected (apart from minor leakage).

As can be appreciated from FIG. 24, since the first stator 182a is located at least partly inside the first skirt 151, the size of the first working chamber 171 can be very small, irrespective of the size of the piston. This means the "dead zone" can be minimal. Ideally, there is no working fluid left in the first working chamber when the piston reaches the extreme left position (in FIG. 24).

As can also be seen, the fluid entering the first working chamber 171 via the opening 153 immediate arrives in the first working chamber 171 with minimal pressure loss, (without having to make a turn of 90° and without having to travel along a narrow and shallow groove or channel formed between an outer wall of the piston and an inner wall of the housing before arriving in the working chamber 171, which would inevitably lead to a considerable pressure loss, as is the case in some prior art). This furthermore allows that the thickness of the piston wall can be reduced, and the weight of the piston can be reduced, and thus less material is required.

It is noted in this respect that mass flow rate is a function of (inter alia) port area, pressure difference and flow resistance. The skilled person can simply choose the volume of the bouncing chambers by choosing an appropriate value diameter and/or length of the reduced diameter portion of the stator. Having bouncing chambers 173, 174 is however not required for the present invention, and the present invention can also work without bouncing chambers.

Although the main focus of the present invention is not the control algorithm, FIG. 25 to FIG. 28 show an example of a possible algorithm that can be used to control the angular and axial movement of the piston 150, in a manner suitable for generating electrical power, the present invention not being limited to this particular example. For ease of description, it is assumed that the opening has a square or rectangular shape, but the invention is not limited thereto.

As described above, the basic form of synchronization is that the piston rotates—on average-over 90° or 180° or 360° (depending on the amount of openings in each skirt) around its longitudinal axis when making one reciprocal movement (e.g. from left to right and back). But there are many possible paths to achieve this, although not all of these paths will produce the same (net) amount of energy. The following algorithm shows a possible (but not necessarily the best) way of following a suitable path or trajectory.

Figure 25:
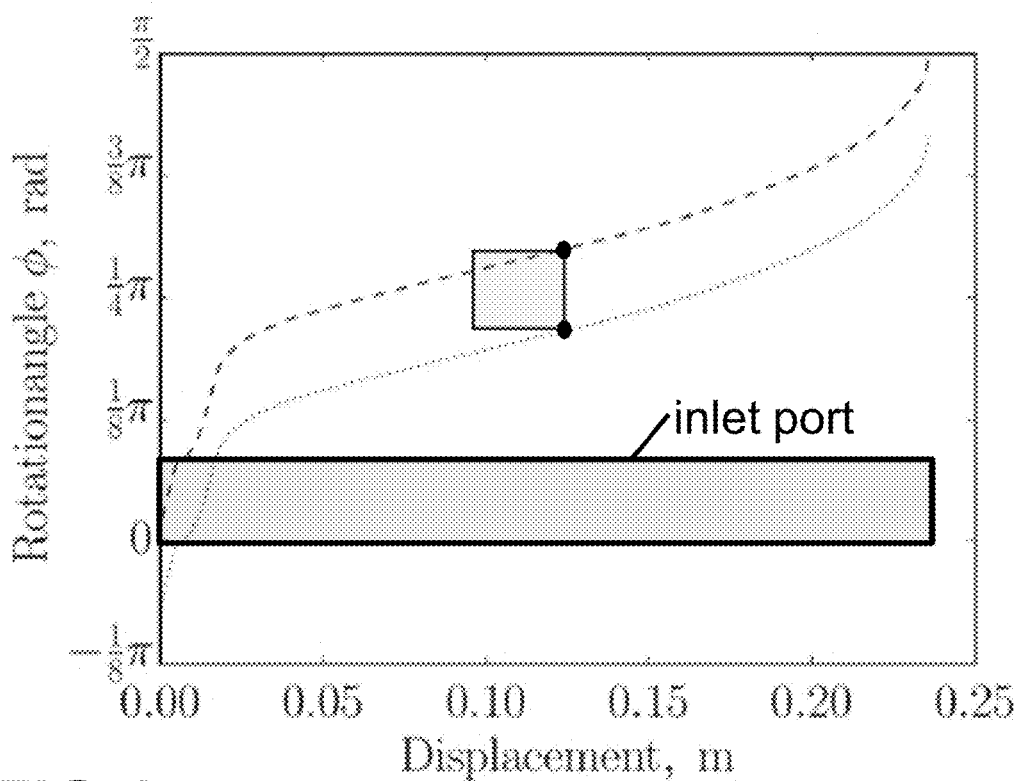

FIG. 25 is a graphical representation of the radial versus axial position (and thus movement) of the piston, as illustrated by the path followed by the inlet opening 153 of the piston 150. As stated above, a single inlet port is shown, but it would also be possible to provide two separate inlet ports, located near outer positions of the housing, one for each skirt.

A possible implementation is the following. Assume that the piston is in its leftmost axial position at time=0.00 s, and at angular position Φ=0°, and is rotating at a certain angular velocity (indicated by the slope of segment "a" in FIG. 26). Thus, at t=0.00 s, the inlet opening fully overlaps the (e.g. rectangular) inlet port (indicated in gray shading in FIG. 25).

The inventors have found that the radial and axial movement of the piston especially during the "intake period", i.e. the period during which the skirt opening 153 overlaps at least partly with the inlet port 131, is important or even decisive for the rest of the movement. If the angular movement is too high in relation to the axial movement, then the chamber will not be completely filled and the risk exist that opening the outlet port will occur at an under pressure. If the angular movement is too small in relation to the axial movement, then there is a risk the outlet port will open with an incompletely expanded fluid (it is still at overpressure) using the available pressure difference inefficiently.

It was found that it may be beneficial to provide electrical energy to the piston for increasing the axial speed of the piston during the "intake period", to get sufficient linear momentum (or impulse) and for allowing the fluid to expand during the rest of the trajectory. During the rest of the trajectory the piston will be appropriately be braked for generating electrical power. The bouncing chambers, when present, may help the braking at the end positions and assist in the provision of initial linear momentum, but do not allow accurate control of the braking and linear momentum. Especially in case of variable volumetric ratio, the piston stroke may be relatively small, and the bouncing chambers would have little or no significant effect, and electrical braking is dominant.

An important aspect of the algorithm is therefore to choose an appropriate timing and amplitude of the electrical power for adapting or adjusting the axial speed to a suitable value, not too fast, and not too slow, but about enough, such that after expansion of the fluid, it has ideally reached the pressure level of the outlet when the port towards this outlet is opened. If higher power output is required, it is possible to move the piston faster, but the power efficiency may decrease. These aspects per se are well known in the art, and need not be elaborated upon. The algorithm tries to drive the piston along (or close to) a path of net positive energy, preferably close to the "ideal path", but good results can also be expected to be achievable when following a sub-optimal trajectory.

Figure 26:
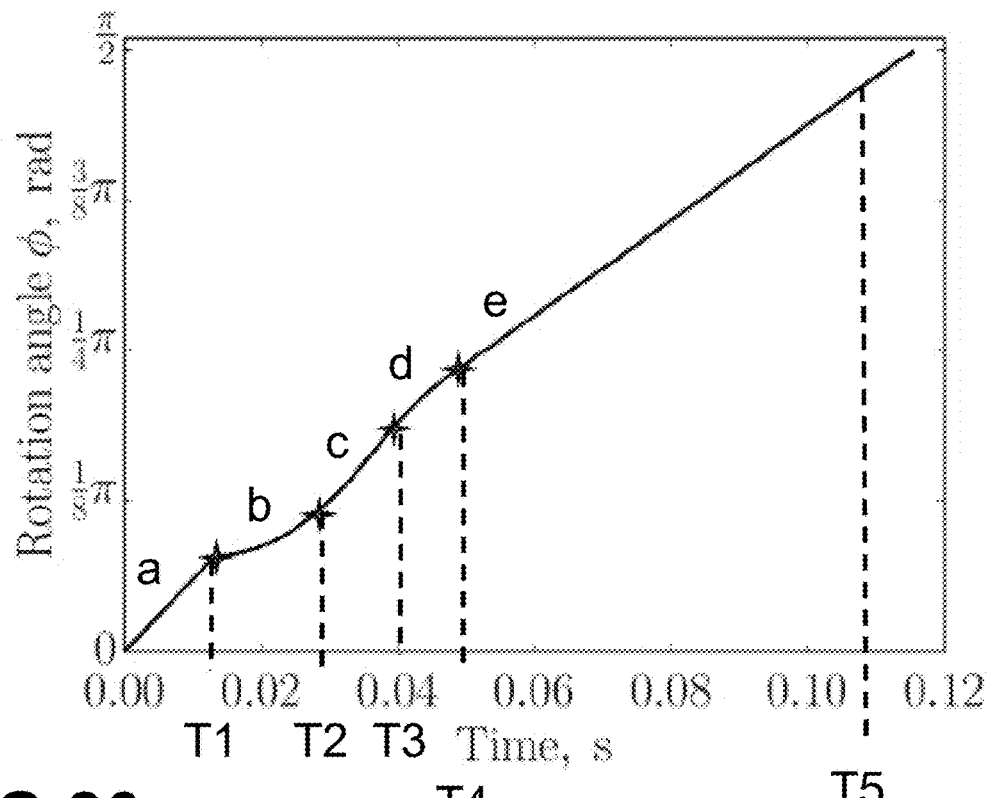
Figure 29:
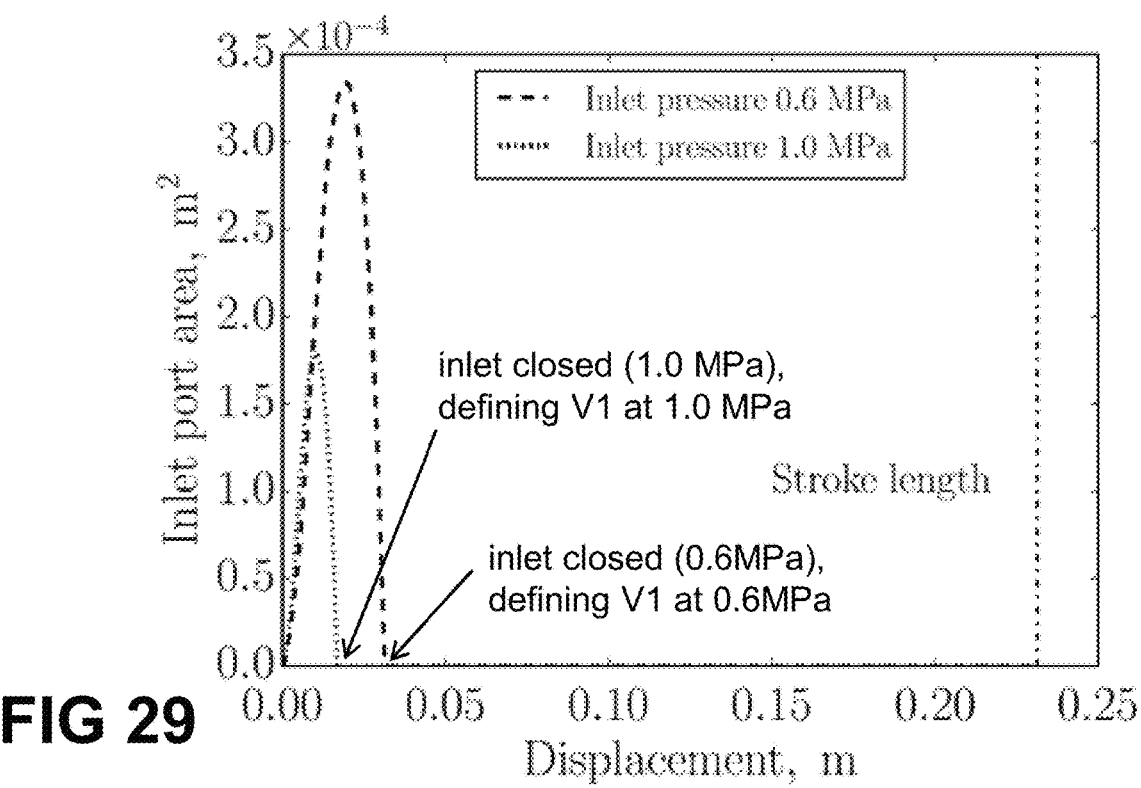
FIG. 29 to FIG. 37 show exemplary simulated plots of the behavior of a device according to the present invention, when operating in a system having 6 bar pressure difference, and in a system having 10 bar pressure difference. Only one half of the reciprocal movement is shown.

FIG. 26 shows an example of how the angular and/or axial movement of the piston may be adjusted over time, in several steps, in the example, in five steps:

Curve portion "a": Assume time t=0.00 at the angular position Φ=0, and intake starts. No angular control is applied, The angular speed is the same as the piston already had at the end of the previous reciprocating movement;

Curve portion "b": angular deceleration is applied in order to allow the skirt opening to "follow" the inlet port, this ensure that enough high pressure fluid can enter the working chamber at the lowest possible pressure drop. This is illustrated in FIG. 29.

Curve portion "c": angular acceleration is applied to close the port as fast as possible, e.g. corresponding to a predefined volumetric ratio.

Curve portion "d": an estimation or prediction of the axial speed is made, and the rotation speed is adjusted so that the skirt opening will reach the angular position of the discharge port at the end of the expansion phase. If the piston rotates too fast, the virtual outlet valve will open too soon. If the piston rotates too slow, the virtual outlet valve opens too late. But at the end of the stroke, when the fluid in the first chamber has almost completely expanded, it is far more important to control the piston 150 for "correct" or "appropriate" opening of the inlet valve of the second skirt, rather than optimizing optimal opening of the valve of the first skirt.

Curve portion "e": the rotation speed is kept constant (active control to compensate friction).

Of course, many variants of this scheme are possible.

FIG. 27 show a possible way of measuring and controlling the trajectory described in FIG. 25 and FIG. 26.

In the example shown, the controller monitors the following parameters:
i) pressure inside the working chamber,
ii) angular position Φ of the piston, and
iii) axial position of the piston, but other parameters and/or sensors may also be used (for example temperature sensors). To this end, the device may comprise for example a pressure sensor mounted on the stator, an angular position sensor and an axial position sensor.

A first test TT1 is performed to verify whether the pressure in the working chamber is smaller than the discharge pressure plus a first predefined constant value, e.g. 10%.

As long as the outcome of the first test is "yes", the piston 150 is forced (by the linear motor/generator) to move until the inlet valve opens and the pressure inside the working chamber starts to increase (in the example: 10% above the discharge pressure), for example by exerting an electromagnetic force F_em on the piston equal to 75% of the nominal force F_nom during the inlet phase, (F_nom is a characteristic of the linear motor/generator, as can be found in the datasheet).

When the outcome of the first test is "no", a second test TT2 is performed to verify whether the angular position of the piston is less than 30°, which (in this example) means that the inlet valve is still open.

As long as the outcome of the second test is "yes", the angular piston speed is kept constant by only applying sufficient electrical power to compensate friction forces, for as long as the inlet valve is open.

When the outcome of the second test is "no", this means that the inlet valve is closed, and the piston is accelerating further to the right position, and a third, optional test TT3 is performed to verify whether the axial speed of the piston is larger than a predefined maximum axial speed v_vmax (e.g. to avoid excessive speeds that would harm the device).

If the outcome of the third test is "yes", it means that the axial speed of the piston does not exceed the maximum allowed speed, and the electromagnetic force F_em is equal to the nominal force F_nom, meaning that electrical power is extracted from the mechanical movement.

If the outcome of the third test is "no", it means the piston is moving too fast, and the axial movement is decelerated by applying a higher electromagnetic force to induce braking.

This algorithm can be "tuned" by choosing appropriate values for the predefined constants shown in FIG. 27, in particular the values 1.1, 0.75, pi/6 and v_max. The skilled person can find suitable values by simulation and/or by routine experiments.

FIG. 28(a) illustrates that the first test TT1 is related to the moment at which the pressure in the working chamber starts to increase (after opening of the inlet valve), the second test TT2 is related to the moment at which the pressure in the working chamber starts to decrease (after closing of the inlet valve). By changing the predefined threshold values, the curves can be modified, or "tuned".

FIG. 28(b) shows that the third, optional test TT3 is related to the maximum axial speed of the piston.

FIG. 29 to FIG. 37 show that it is possible to use this simple algorithm (or another suitable algorithm) to implement an expander with a variable volumetric ratio as would be required to cope with variable loading conditions represented by the occurrence of different pressure differences. To this end a situation of 6 bar (0.6 MPa) and 10 bar (1 MPa) has been simulated.

The following simulations show two examples of simulated behavior of the device and the algorithm described in FIG. 25 to FIG. 28 when operating in a system having 6 bar (=0.6 MPa) and 10 bar (=1.0 MPa) pressure difference between the inlet port 131 and outlet port 132, respectively.

FIG. 29 shows an example of area of the inlet opening versus axial displacement. With "inlet port area" is meant the area of overlap between the skirt opening 153 on the one hand, and the inlet port 131 on the other hand. This value is zero in case of no overlap (valve is closed), increases as the skirt opening 153 moves over the inlet port 131 until it reaches a maximum, and then decreases again. If the size of the skirt opening 153 would be smaller than the width of the inlet port 131, the curve would also have a constant portion, but in the example shown that is not the case. As can be seen, the "inlet port area" is non-zero over a longer axial distance in case of 6 bar than in case of 10 bar. This corresponds with the fact that at lower pressures it is required to give the inlet port more time to adequately fill the working chamber.

It is noted that the volume of the chamber at which the valve closes is different depending on the pressure. This illustrates how the volumetric ratio VR=V2/V1 (as was described in relation to FIG. 13) can be chosen differently for the example of 0.6 MPa and 1.0 MPa in this example, or as a function of the inlet pressure in general.

Figure 30:
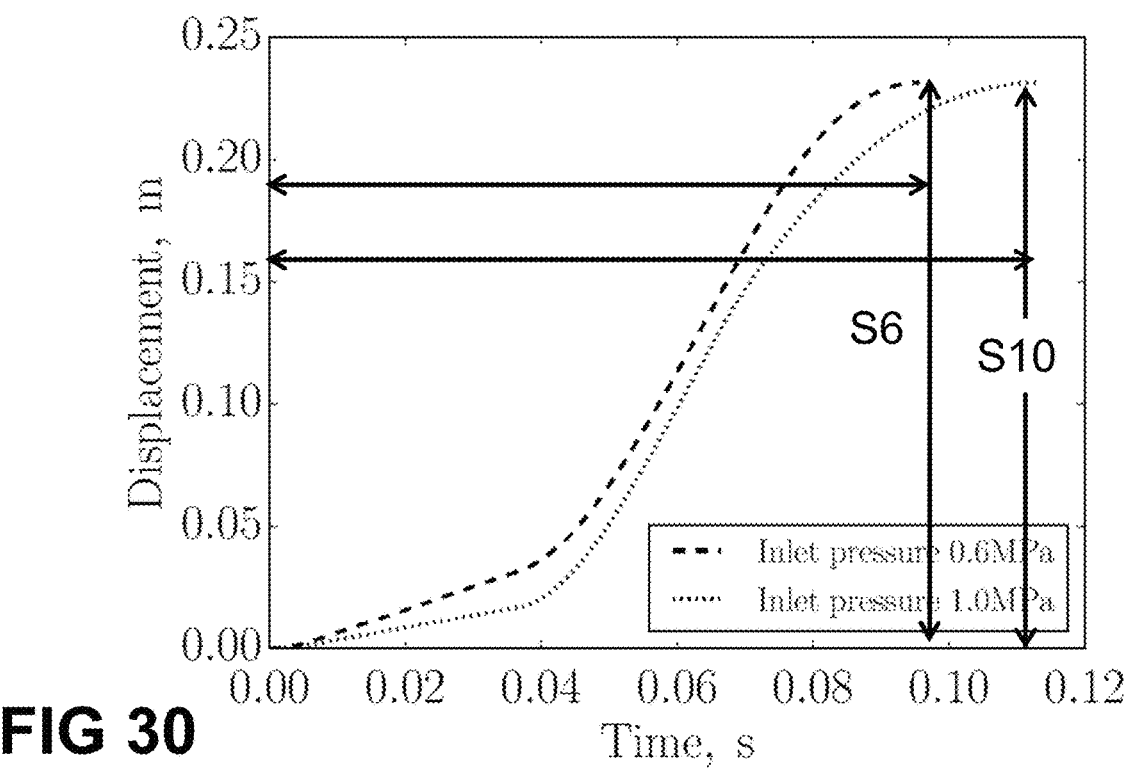

FIG. 30 shows an example of axial displacement versus time. In the example shown, the stroke S6, S10 is the same for the case of 6 bar and the case of 10 bar, but the time required for reaching "the opposite side" is longer in case of 10 bar. In other words, the resonance frequency would be chosen smaller in case of 10 bar than in case of 6 bar.

Figure 37:
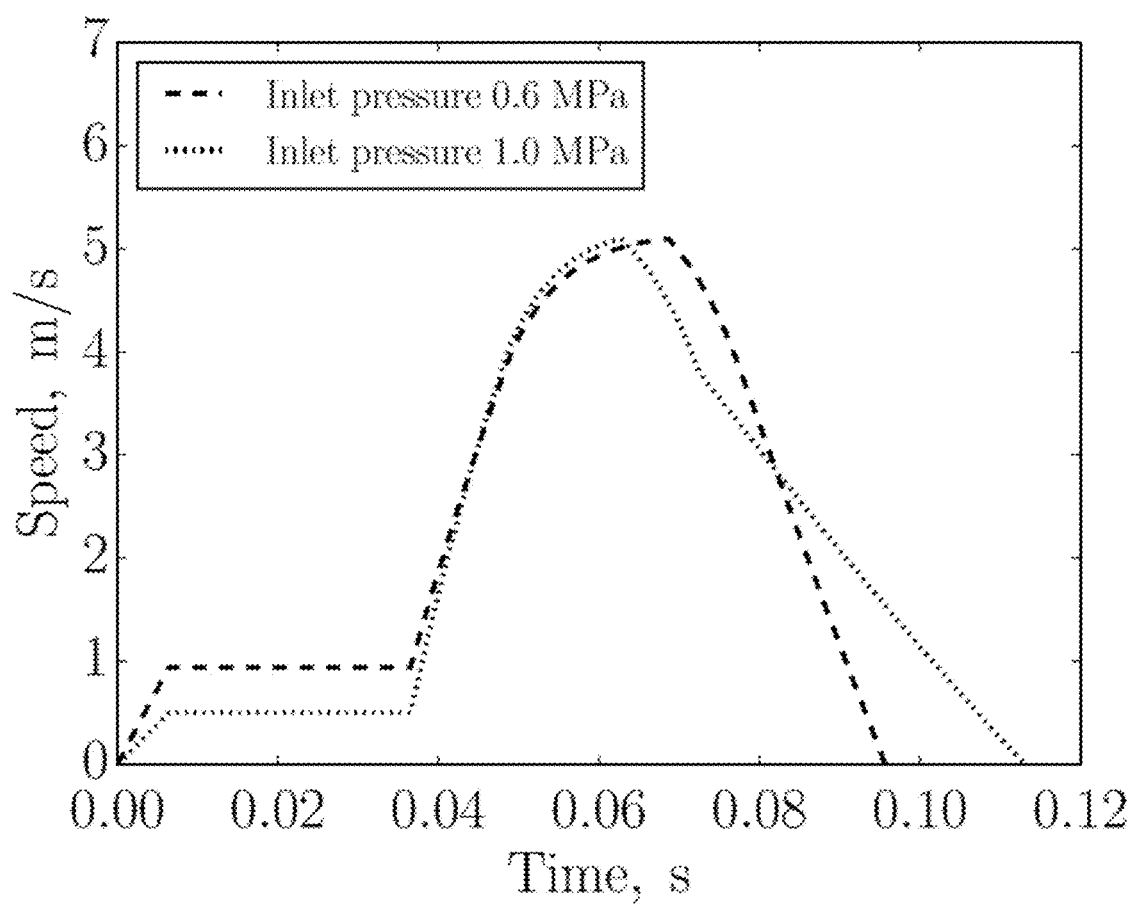

The reader wondering why it took longer (according to this simulation) for the piston to reach its maximum displacement under 10 bar than under 6 bar, may see in FIG. 37 that more braking was applied during the inlet phase in case of 10 bar.

Figure 31:
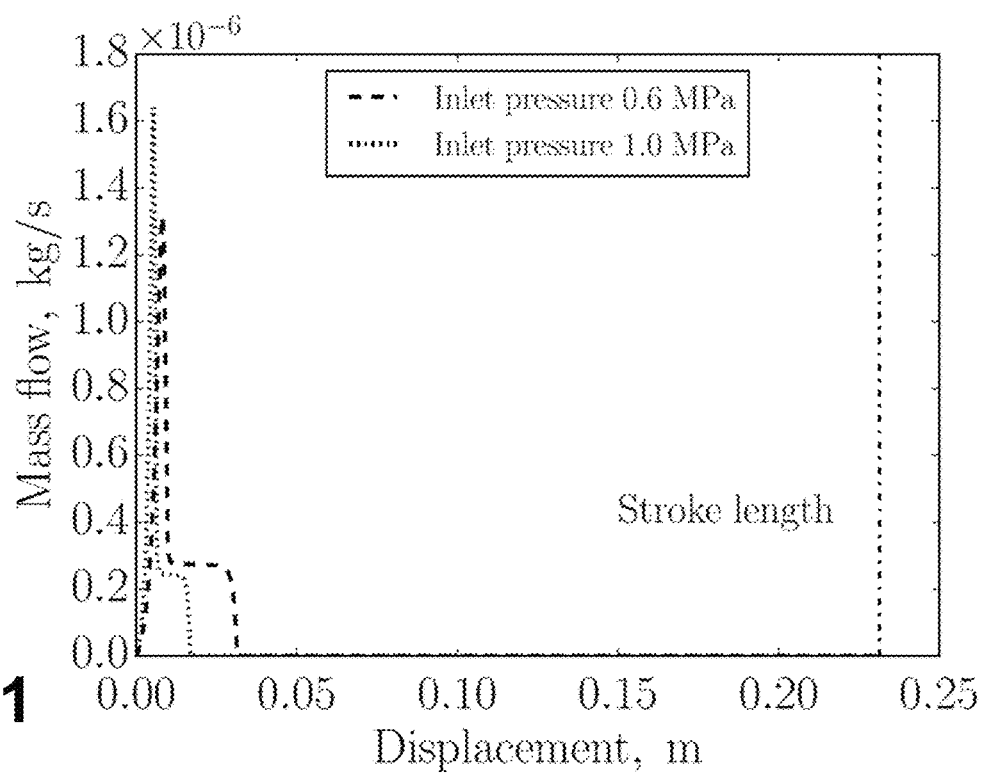

FIG. 31 shows an example of mass flow of the working fluid versus axial displacement for a given shape of the inlet opening and inlet/outlet port of the housing. Mass flow rate is a function of (inter alia) port area, pressure difference and flow resistance. This behavior can be understood by taking into account that the port area changes over time as illustrated in FIG. 29, and the pressure difference is the difference between the actual pressure in the (expanding) working chamber and a fixed pressure of 6 bar or 10 bar, and the flow resistance is negligible, as explained in FIG. 24. Of course, once the virtual valve is closed, the mass flow is zero.

Figure 32:
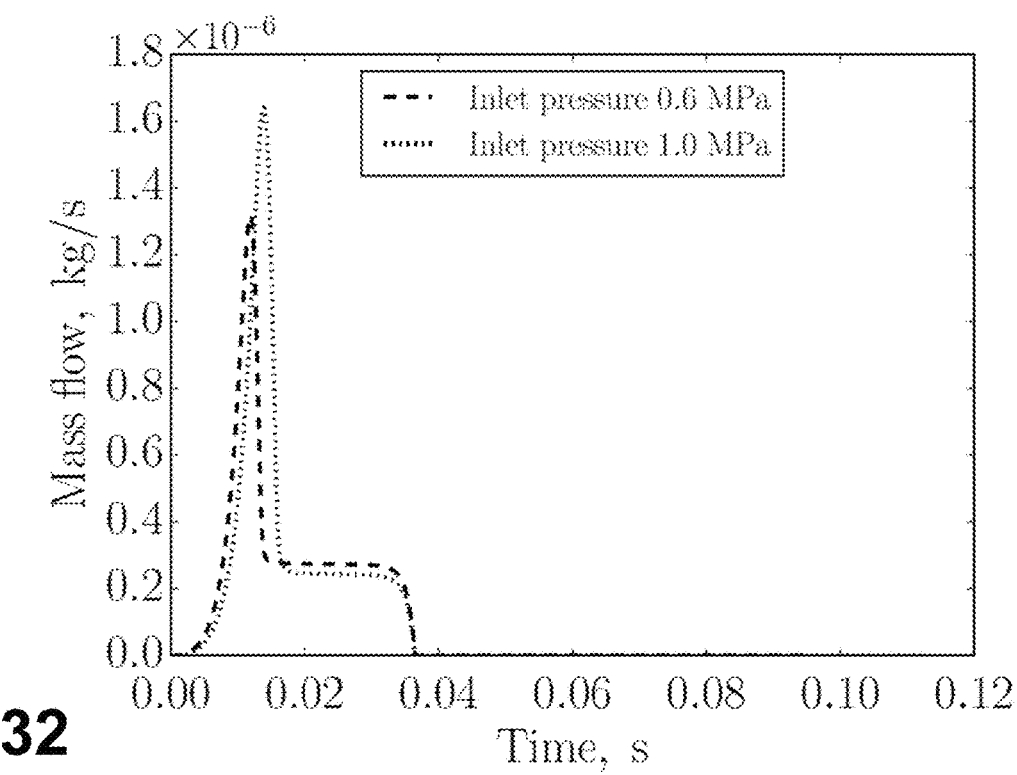

FIG. 32 is a variant of FIG. 31, showing the mass flow of the working fluid versus time rather than versus axial displacement. The waveforms resemble those of FIG. 31, but are stretched in time, because the axial speed of the piston is not constant, but increases during the inlet phase.

Figure 33:
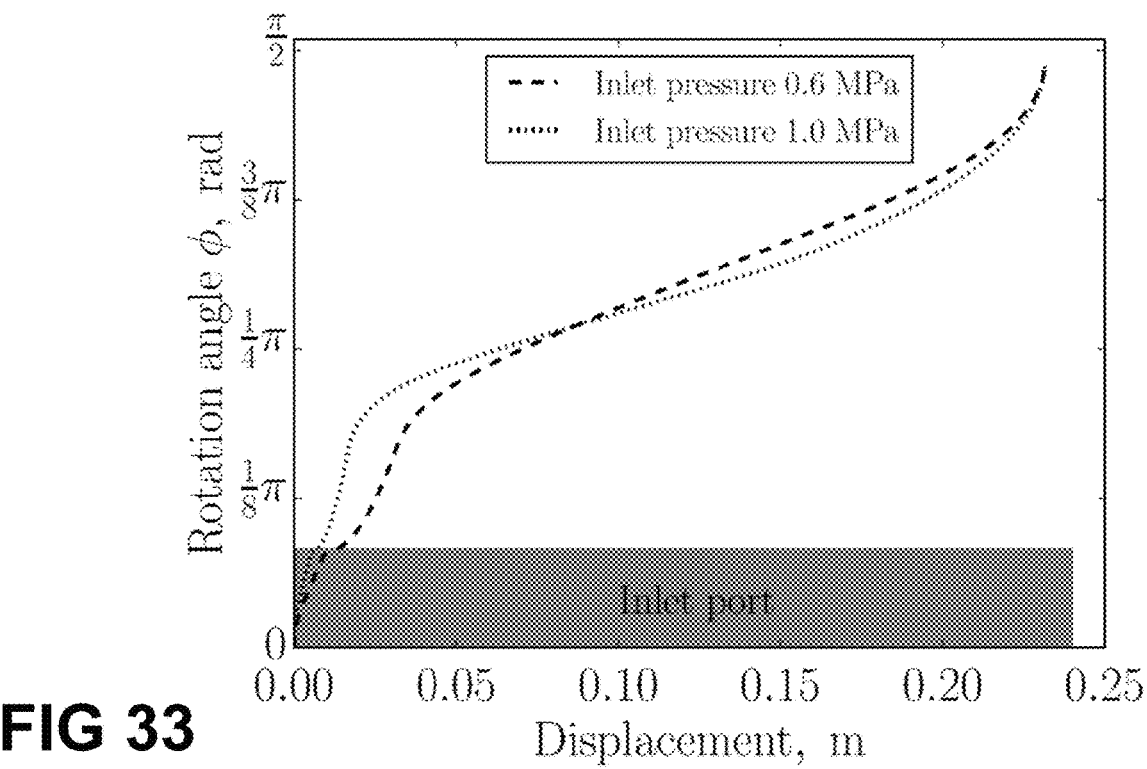

FIG. 33 shows an example of rotation angle of the piston (e.g. expressed as the angular position of the inlet opening) versus axial displacement, or in other words, of possible trajectories the piston opening can follow.

Figure 34:
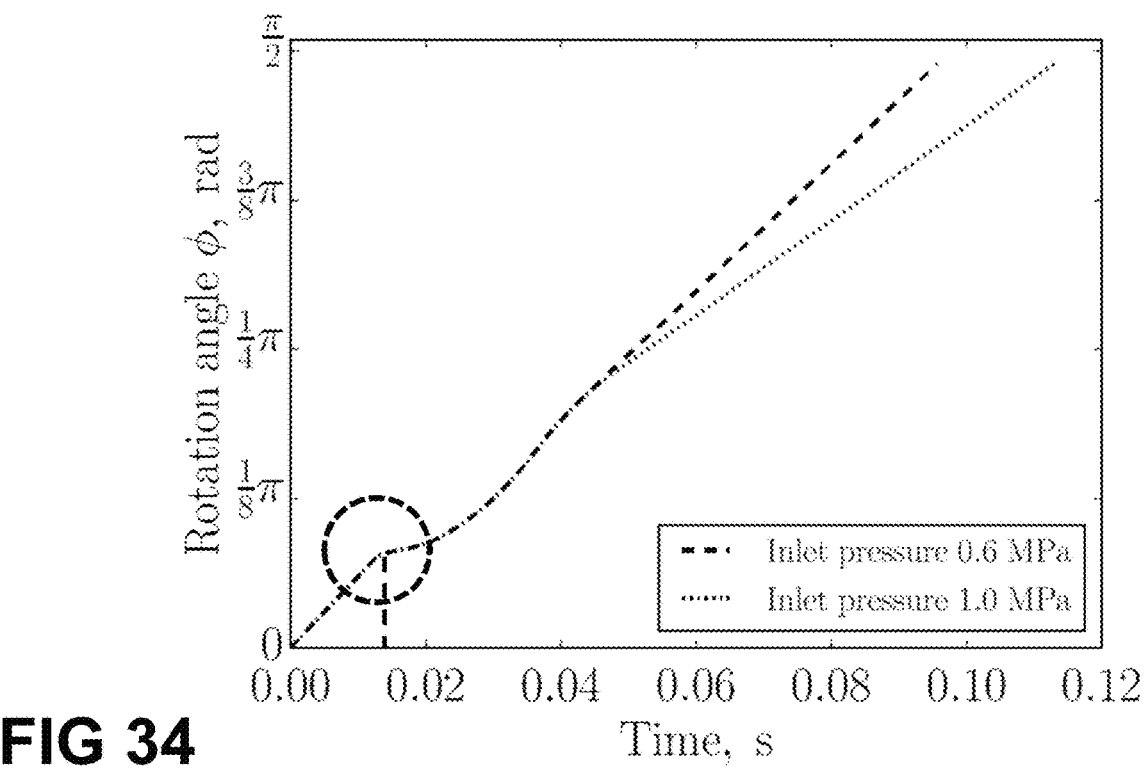

FIG. 34 is a variant of FIG. 33, showing the angular position of the piston versus time rather than versus axial displacement. It is noted that the slope of this curve (in each point) represents the angular acceleration or deceleration at each moment in time. In the example shown, the angular movement is suddenly slowed down around 0.015 s and then gradually accelerated again. This is believed to be an important aspect of the algorithm.

Figure 35:
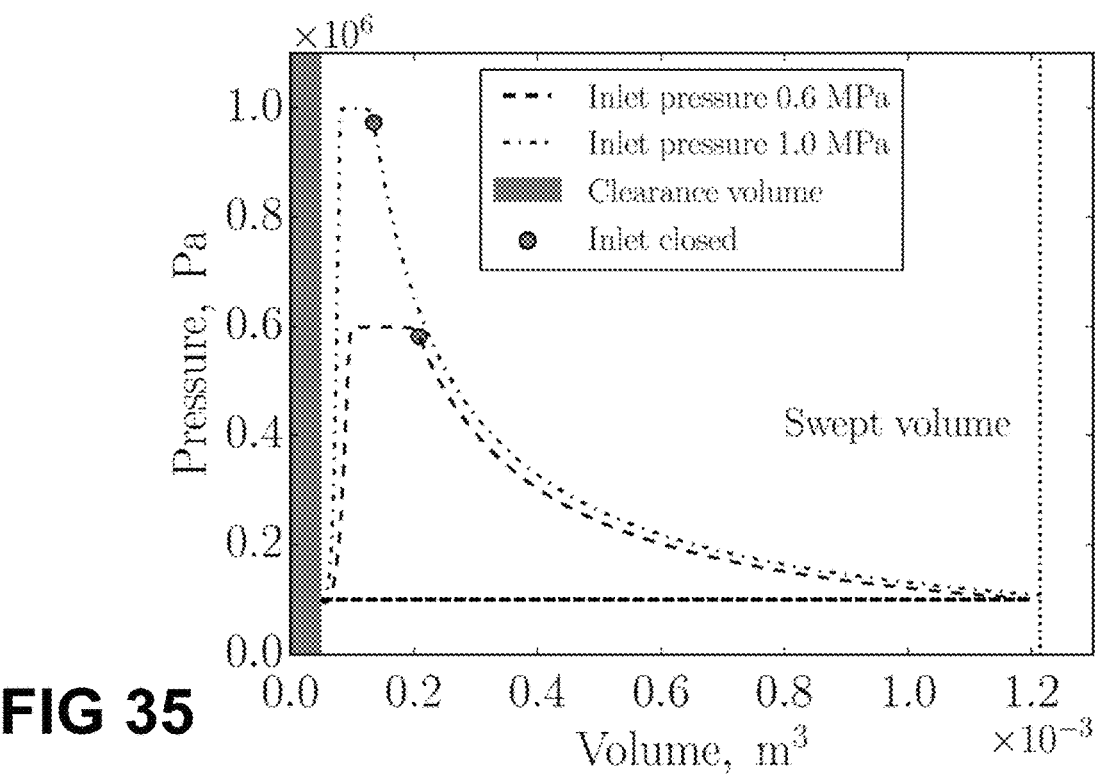

FIG. 35 shows an example of a PV-diagram, showing pressure in the working chamber 171 versus volume of the chamber. Since the cross sectional of the working chamber is substantially constant, this graph is also indicative for pressure in the working chamber versus axial displacement. The volume under the PV-curve is the energy provided by the fluid expansion. As shown in FIG. 12(e), the "virtual valve" of the first skirt is "open" during its return, while expansion of the working fluid is occurring in the second skirt. Therefore the entire area under the PV-curve is energy provided by the working fluid during the expansion. In order to obtain the net energy, the energy provided to the piston for controlling its axial and/or axial movement need to be subtracted, as well as friction losses, electrical losses in the coils, etc.).

Figure 36:
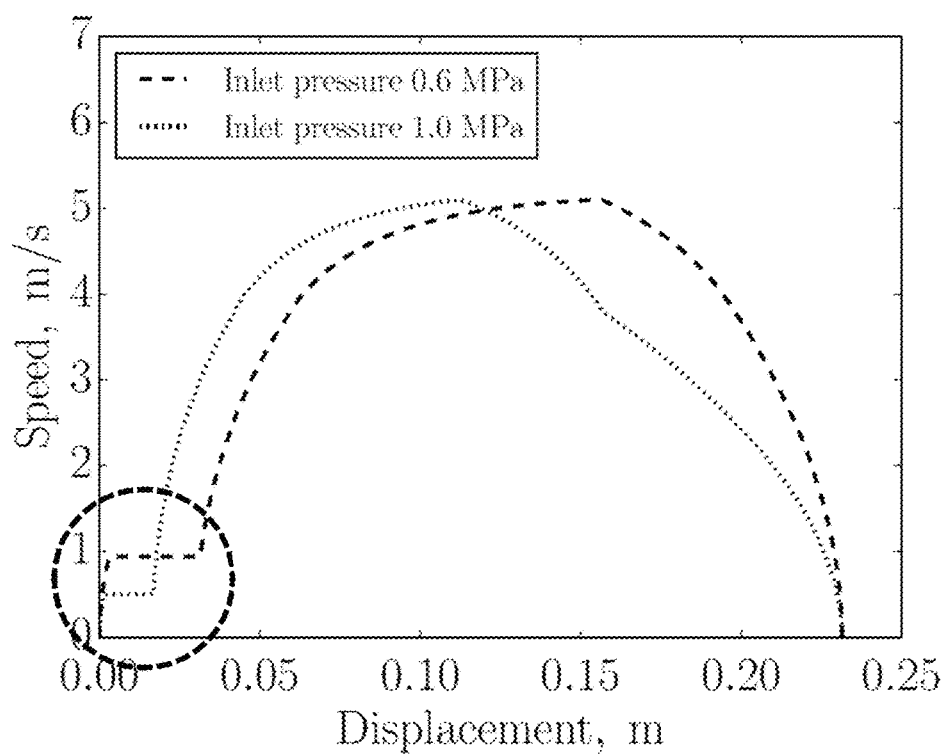

FIG. 36 shows an example of axial speed versus axial position. As could be expected, it has mainly a sinusoidal behavior (the return speed is not shown). The speed becomes zero in the outer positions, where the piston changes direction. Noteworthy is that the piston is preferably "braked" during part of the inlet phase, as can be seen by the horizontal portions in FIG. 36.

FIG. 37 is a variant of FIG. 36, showing the axial piston speed versus time rather than versus axial displacement. The slope of the curves in each point are representative for the axial acceleration, and hence the axial force exerted upon the piston at each moment in time.

Figure 38:
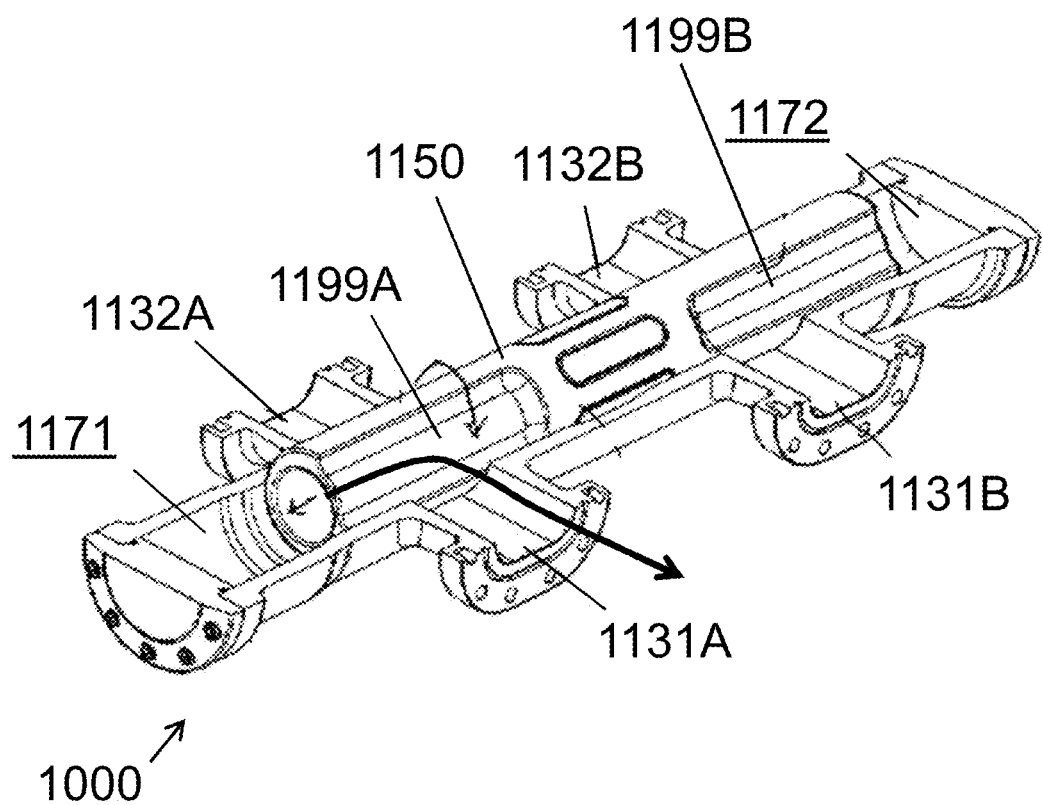
FIG. 38 is a replica of FIG. 11 from WO2008154730A1.

FIG. 38 is a replica of FIG. 11 from WO2008154730A1, and was discussed in the background section.

Figure 39:
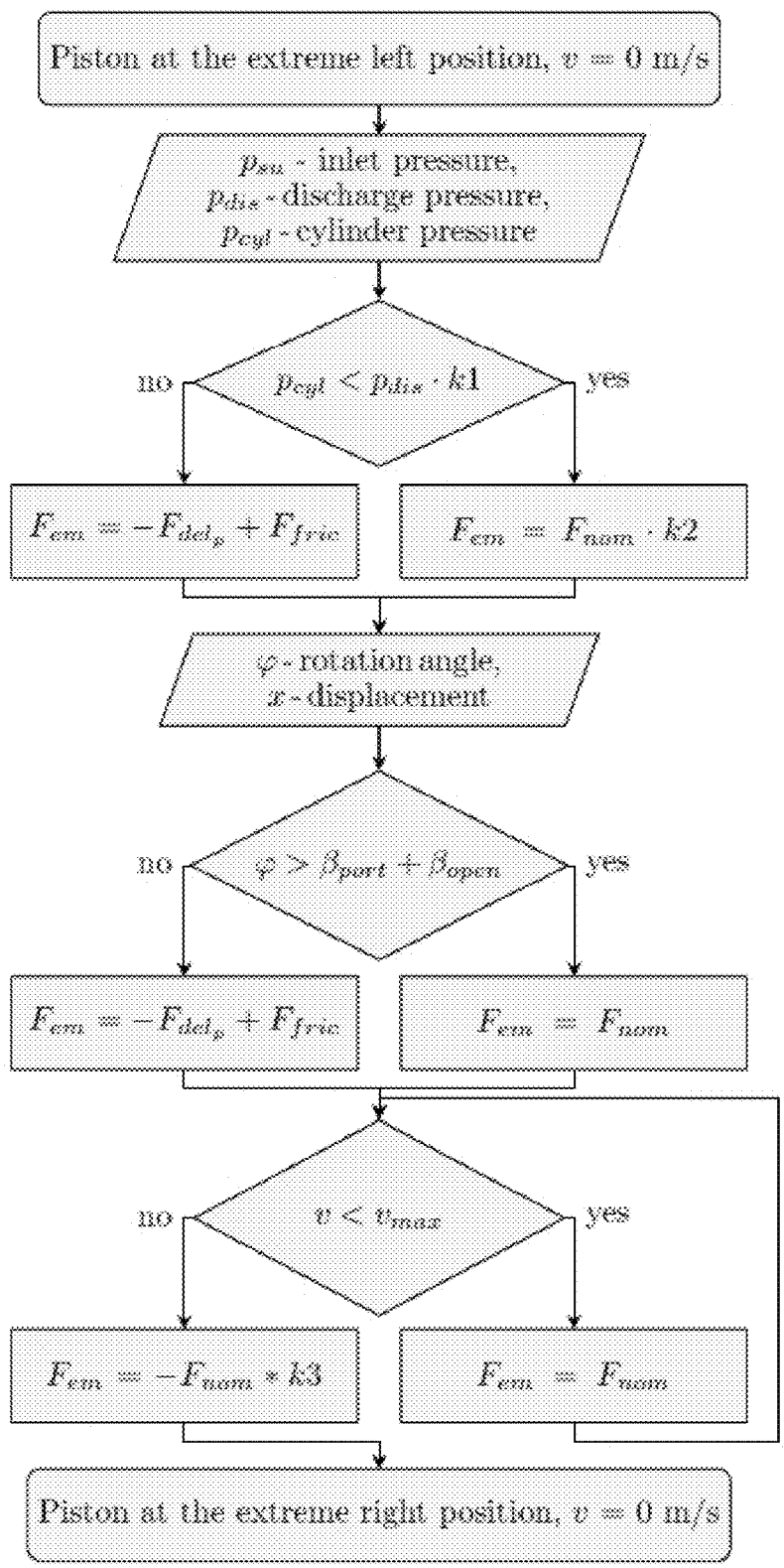
FIG. 39 shows a possible piston linear movement algorithm in more detail.

FIG. 39 shows a possible piston linear movement algorithm in more detail.

Figure 40:
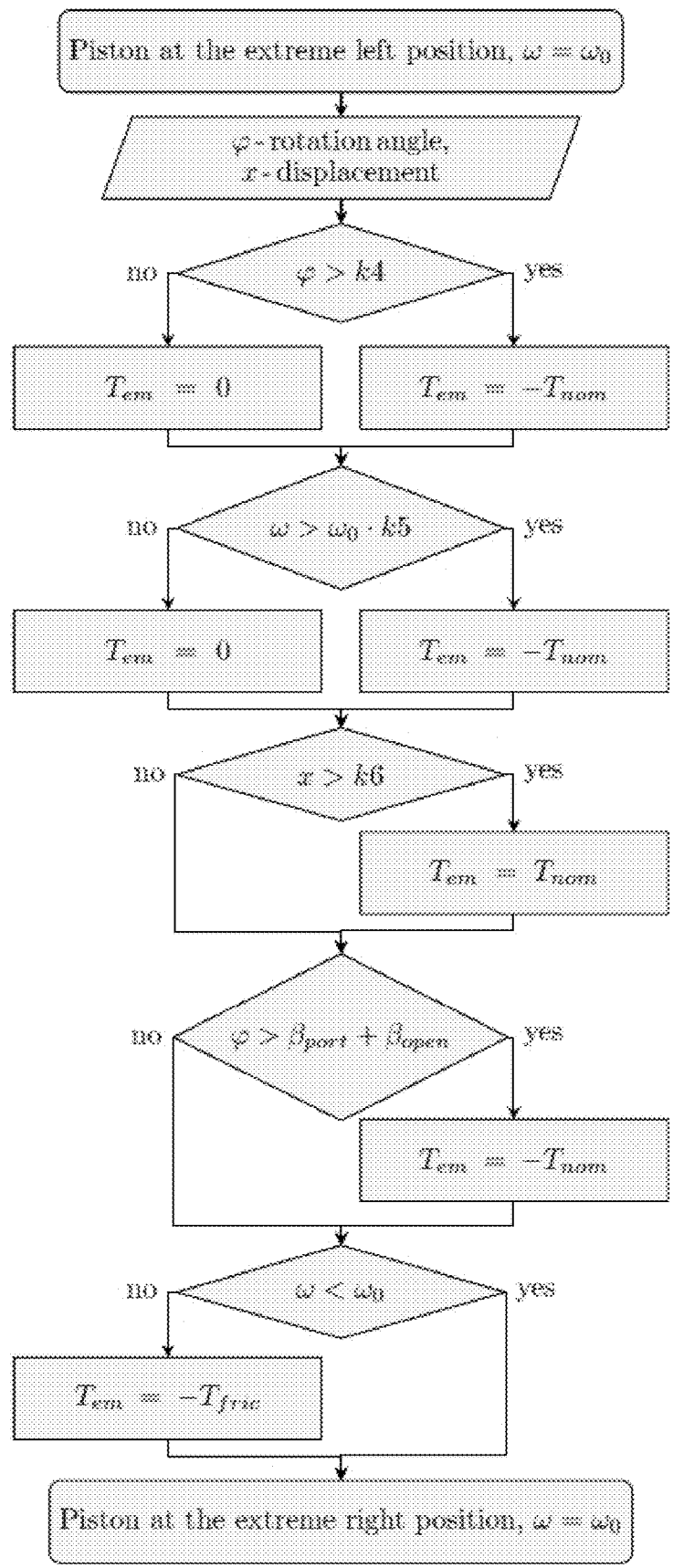
FIG. 40 shows a possible piston rotation algorithm in more detail.

FIG. 40 shows a possible piston rotation algorithm in more detail.

Although the present invention has been described by means of particular embodiments, the present invention is not limited to the embodiments shown in the Figures, but only to the claims. Several variations are possible without departing from the spirit of the invention. For example:

in the examples shown, the housing 110 is represented as a pure cylinder (for illustrative purposes), but that is not absolutely required, and the outer shape of the housing does not really matter, as long as the housing has a cylindrical cavity;

in several of the examples shown, the first wall opening 131 and second wall opening 132 of the housing 110 are substantially rectangular (after being unfolded) with edges parallel to the longitudinal axis L of the device, but that is not absolutely necessary, and other shapes and/or orientations may also be used, e.g. elliptical, rectangular with rounded edges, etc.;

in the examples shown (e.g. in FIG. 3 and FIG. 4), the first wall opening 131 and the second wall opening 132 of the housing are positioned at multiples of 30° angular distance, and the size of the second wall opening 132 is a factor of 2.0 larger than that of the inlet opening 131, but that is not absolutely necessary, and other relative positions, and/or other relative dimensions may also be used;

in the examples shown, the openings 153, 154 of the first skirt and of the second skirt are substantially square (after being unfolded) with edges parallel with the longitudinal axis L of the device 100, but that is not absolutely necessary, and other shapes may also be used, e.g. rectangular, circular, elliptical, rectangular with rounded edges, diamond, triangular, etc;

in the examples shown (e.g. FIG. 16 to FIG. 20), the number of stator windings and the number of permanent magnets is an integer multiple of 12, but that is not absolutely required, and other suitable rotor and stator assemblies may also be used;

although the piston shown above has two skirts 151, 152, a piston 150 having only a single skirt 151, and means for moving the piston back in axial direction (towards the transverse wall section 111), such as a mechanical spring or a gas spring or the like, may also be used;

although the permanent magnets 183 are shown mounted to the inside of the skirt, they could also be mounted on the outside of the skirt, or on the central part 160 (if this would be given a smaller diameter).

It should also be clear that any values mentioned in or in relation to the drawings, (e.g. the volumetric ratio of 2.6 or 5) are only used to explain the working principles, and should not be interpreted as to limit the present invention.

The specific geometry and/or mass and/or moment of inertia and/or chemical properties of a device 100 according to the present invention may be selected depending on the application, e.g. depending on particular parameters of the inlet channel and outlet channel (e.g. temperature, pressure), characteristics (e.g. chemical properties) of the working fluid, and for example depending on the envisioned power efficiency and/or output power. Once a certain geometry, etc. is chosen, the device may be operated at constant angular velocity, or at a variable angular velocity, whereby the latter may be used to further optimize for example the power efficiency or the absolute value of the output power.

In summary, the present invention relates to a free piston device 100, in particular a free piston expander and a free piston compressor, whereby a cylindrical piston 150 is movable in axial direction "p" within a cylindrical cavity of a housing 110, but also in angular position "φ" around its longitudinal axis L. The device 100 does not have moving parts other than the piston 150 itself. The piston has two skirts 151, 152, each skirt has one or more openings 153, 154, acting as (virtual) inlet valve and outlet valve depending on whether the opening is facing (overlapping with) a first wall opening 131 (acting as "inlet port" in case of an expander) or second wall opening 132 (acting as "outlet port" in case on an expander) of the housing 110, which in turn depends on the angular position of the piston φ (and optionally also on the axial position of the piston if the openings are not linearly aligned parallel with the axis L). The wall openings 131, 132 of the housing are connectable (or connected) to an external inlet channel 141 and an external outlet channel 142. In operation, the piston 150 makes a reciprocating movement in axial direction, and an angular movement around its longitudinal axis. The angular movement of the piston 150 is to be "synchronized" with the axial movement, especially during the "inlet phase", but there is some flexibility in this synchronization in that the timing of when the (virtual) valves are opened or closed can be slightly shifted forward or backward in time. The device may be used as a component in an ORC system for recuperation of waste heat energy. By shifting the timing of the valve openings and closings, i.e. by having decelerations and accelerations within one angular period, a variable volumetric ratio VR can be realized. The housing 110 may have a stator assembly 182 comprising a plurality of phase windings 184. The piston 150 may have a rotor assembly 181 comprising a plurality of permanent magnets 183. Part of the windings 184 and magnets 183 can be arranged and operated to function as a linear generator (or linear motor), in order to convert axial movement into electrical energy (or vice versa). Part of the windings and magnets can be arranged and operated to function as a BLDC motor, in order to control the angular movement φ(t) or φ(p) of the piston 150. The device may have a controller with PWM-modules and a power stage to drive the windings 184. The controller may be programmed with a control loop. The control loop may be implemented as a closed loop system. The device may have dedicated axial and/or angular position sensing means, (or sensing means from which an axial and/or angular position can be derived), or alternatively axial and/or angular position information may be obtained from the drive circuit and the rotor and stator assembly without dedicated sensing means (e.g. based on a back EMF signal of an undriven winding).

| REFERENCE NUMBERS | |
|---|---|
| 100 free piston device | 110 housing |
| 111 first transverse wall section | 112 second transverse wall section |
| 113 cylindrical cavity | 114 cylindrical wall |
| 121 first end (of cylindrical cavity) | 122 second end (of cylindrical cavity) |
| 131 first wall opening (of housing), also referred to as "inlet port" | |
| 132 second wall opening (of housing), also referred to as "outlet port" | |
| 141 first channel | 142 second channel |
| 150 piston | 151 first skirt |
| 152 second skirt | 153 opening of first skirt |
| 154 opening of second skirt | 160 central element of piston |
| 161 first face (of piston end wall) | 162 second face (of piston end wall) |
| 171 (first) working chamber (inside first skirt) | |
| 172 second working chamber (inside second skirt) | |
| 173 first bouncing chamber | 174 second bouncing chamber |
| 181 rotor assembly | 182 stator assembly |
| 183 permanent magnets | 184 stator winding |
| ep1 first end position | ep2 second end position |
| X longitudinal axis | p axial position |
| TT1, TT2, TT3: first, second, third test | |

The invention claimed is:

1. A free piston device comprising:
a housing having a cylindrical inner wall defining a cylindrical cavity, the cylindrical inner wall having a first wall opening connectable to a first channel and a second wall opening connectable to a second channel;
a cylindrical piston arranged in said cylindrical cavity and being movable in axial direction and being rotatable around its longitudinal axis;
the cylindrical piston comprising a central element, and a first skirt having a cylindrical wall defining a first cylindrical space closed at one end by a first face of said central element,
the first face, and at least part of the cylindrical wall of the first skirt, and a transverse wall section of an element mounted inside the housing or a transverse wall section being part of the housing forming a first chamber inside said first skirt, said transverse wall section being positioned inside the cylindrical space of the first skirt, said first skirt having at least a first skirt opening in the form of a first hole through the cylindrical wall of the first skirt for allowing passage of a fluid directly into or out of said first chamber;

first control means for controlling movement of said piston in axial direction along its longitudinal axis;

second control means for controlling movement of the piston in angular direction around its longitudinal axis;

sensing means adapted for providing a first signal related to the axial position and a second signal related to the angular position of the piston relative to the housing;

a digital control unit for controlling the first and/or the second control means or rotating the piston around its longitudinal axis and/or for moving the piston along its longitudinal axis, based on at least the first and the second signal, in a manner wherein the axial movement is synchronized with the longitudinal movement such that the first skirt opening is in fluid connection with the first wall opening at a first moment in time when the piston is in a first axial position, and such that the first skirt opening is in fluid connection with the second wall opening at a second moment in time when the piston is in a second axial position different from the first axial position.

2. The free piston device according to claim 1, wherein the sensing means further comprises a first pressure sensor arranged for measuring a pressure inside the first chamber and wherein the digital control unit is further adapted for controlling the first and/or second control means by also taking into account a signal obtained from the first pressure sensor.

3. The free piston device according to claim 1, wherein the first and second control means comprise at least one electromagnetic rotor assembly mounted to the piston and at least one electromagnetic stator assembly mounted to the housing.

4. The free piston device according to claim 3, wherein:
the free piston device is a free piston expander;
the first channel is configured for providing a fluid having a first pressure to the first chamber;
the free piston device is adapted for allowing the fluid in the first chamber to expand during a first time period, by allowing the piston to move away from the first transverse wall section, thereby increasing the volume in the first chamber;
the second channel is configured for receiving a fluid having a second pressure lower than the first pressure, from the first chamber;
the rotor assembly and stator assembly being configured for functioning as a linear generator for converting the axial movement of the piston due to the fluid expansion into electrical power.

5. The free piston device according to claim 1, wherein the element comprising the transverse wall section is mounted inside the housing.

6. The free piston device according to claim 1, wherein the element is the stator assembly, having an outer diameter corresponding to an inner diameter of the cylindrical wall of the first skirt.

7. The free piston device according to claim 1, wherein the piston further comprises a second skirt having a cylindrical wall defining a second cylindrical space closed at one end by a second face of the central element,
the second face of said central element, and at least part of the cylindrical wall of the second skirt, and a second transverse wall section of an element mounted inside the housing or a transverse wall section being part of the housing forming a second chamber inside said second skirt, said second transverse wall section being positioned inside the cylindrical space of the second skirt, said second skirt having at least a first skirt opening in the form of a second hole through the cylindrical wall of the second skirt for allowing passage of a fluid directly into or out of said second chamber;

wherein the digital control unit is adapted for controlling the first and/or the second control means for rotating the piston around its longitudinal axis and/or for moving the piston along its longitudinal axis, based on at least the first and the second signal, in a manner wherein the axial movement is synchronized with the longitudinal movement, such that the first skirt opening is in fluid connection with the first wall opening of the housing and the second skirt opening is in fluid connection with the second wall opening of the housing at a first moment in time when the piston is in a first axial position, and such that the first skirt opening is in fluid connection with the second wall opening of the housing and the second skirt opening is in fluid connection with the first wall opening of the housing at a second moment in time when the piston is in a second axial position different from the first axial position.

8. The free piston device according to claim 1, further comprising a means for moving the piston in an axial direction towards the first transverse wall section, said means comprising at least one of the following components: a gas spring, a mechanical spring.

9. The free piston device according to claim 4, wherein:
the piston further comprising a second skirt having a cylindrical wall closed at one end by said center element,
a second face of the center element, and at least part of the cylindrical wall of the second skirt, and a second transverse wall section of a second element mounted inside the housing or a second transverse wall section being part of the housing forming a second chamber inside the second skirt, said second transverse wall section being positioned inside the cylindrical space of the second skirt,
said second skirt having at least a first opening in the form of a first hole through the cylindrical wall of the second skirt for allowing passage of a fluid directly into or out of said second chamber;
the free piston device is adapted for allowing the fluid in the second chamber to expand during a second time period, by allowing the piston to move away from the second transverse wall section, thereby increasing the volume in the second chamber;
the digital control unit being further configured for controlling the first and/or the second control means for rotating the piston around its longitudinal axis and/or for moving the piston along its longitudinal axis, based on at least the first and second signal and optionally also based on the signal from the first pressure sensor and/or the signal from the second pressure sensor, in a manner wherein the axial movement is synchronized with the longitudinal movement such that the opening of the second skirt is in fluid connection with the first wall opening at a third moment in time when the piston is in a third axial position, and such that the opening of the second skirt is in fluid connection with the second wall at a fourth moment in time when the piston is in a fourth axial position different from the third axial position.

10. The free piston device according to claim 9, the sensing means further comprising a second pressure sensor arranged for measuring a pressure in the second chamber, and the digital control unit being further adapted for controlling the first and/or second control means by also taking into account a signal obtained from the second pressure sensor.

11. The free piston device according to claim 4, being a variable volumetric ratio expander, wherein the momentary volumetric ratio is defined by the ratio of the maximum volume and the minimum volume of the first chamber over one reciprocating period, and wherein the digital control unit is configured for controlling the first and second control means for selectively accelerating and/or decelerating the piston around its longitudinal axis and/or along its longitudinal axis for obtaining a predefined volumetric ratio, by influencing a first timing at which the opening of the first skirt is in fluid connection with the first wall opening for intake of fluid from the first channel into the first chamber, and by influencing a second timing at which the opening of the first skirt is in fluid connection with the second wall opening for removal of fluid from the first chamber into the second channel.

12. The free piston device according to claim 11, wherein the control unit is further adapted for obtaining said predefined volumetric ratio by phase shifting the second timing such that the opening of the first skirt is brought in fluid connection with the second wall opening for allowing the fluid in the first chamber to leave the first chamber before the volume of the first chamber reaches a momentary maximum volume.

13. The free piston device according to claim 2, wherein:
the free piston device is a free piston compressor,
the second channel is configured for providing a fluid having a first pressure to the first chamber;
the fluid in the first chamber is compressed during a first time period, by moving the piston towards the first transverse wall section, thereby decreasing the volume in the first chamber;
the first channel is configured for receiving a fluid having a second pressure higher than the second pressure, from the first chamber;
the rotor assembly and stator assembly are configured for functioning as a linear motor for converting electrical power into axial movement of the piston for compressing the fluid.

14. A method of controlling the free piston device according to claim 1, comprising the step of: converting waste heat of exhaust gases of a combustion engine into electrical power.

15. A waste heat recovery system comprising a free piston device according to claim 1.

16. A method of controlling the free piston device according to claim 1, comprising the step of:

energizing the first control means for increasing an axial velocity of the piston during at least a fraction of the time period during which the first skirt opening is in fluid connection with the first wall opening, or energizing the second control means for decreasing an angular velocity of the piston during at least a fraction of the time period during which the first skirt opening is in fluid connection with the first wall opening, or energizing the first control means for increasing an axial velocity of the piston during at least a first fraction of the time period during which the first skirt opening is in fluid connection with the first wall opening and energizing the second control means for decreasing an angular velocity of the piston during at least a second fraction of the time period during which the first skirt opening is in fluid connection with the first wall opening.

* * * * *